United States Patent
Mizuhashi et al.

(10) Patent No.: US 10,606,404 B2
(45) Date of Patent: Mar. 31, 2020

(54) TOUCH DETECTION APPARATUS AND DISPLAY APPARATUS WITH TOUCH DETECTION FUNCTION

(71) Applicant: Japan Display Inc., Tokyo (JP)

(72) Inventors: Hiroshi Mizuhashi, Tokyo (JP); Koji Noguchi, Tokyo (JP)

(73) Assignee: Japan Display Inc., Tokyo (JP)

(*) Notice: Subject to any disclaimer, the term of this patent is extended or adjusted under 35 U.S.C. 154(b) by 0 days.

(21) Appl. No.: 16/393,300

(22) Filed: Apr. 24, 2019

(65) Prior Publication Data

US 2019/0369796 A1 Dec. 5, 2019

Related U.S. Application Data

(63) Continuation of application No. 15/470,266, filed on Mar. 27, 2017, now Pat. No. 10,353,513.

(30) Foreign Application Priority Data

Mar. 29, 2016 (JP) .................................. 2016-066802

(51) Int. Cl.
*G06F 3/041* (2006.01)
*G06F 3/044* (2006.01)

(52) U.S. Cl.
CPC ............ *G06F 3/0416* (2013.01); *G06F 3/044* (2013.01); *G06F 3/0412* (2013.01)

(58) Field of Classification Search
CPC ....... G06F 3/0412; G06F 3/0416; G06F 3/044
See application file for complete search history.

(56) References Cited

U.S. PATENT DOCUMENTS

| 6,476,797 B1 | 11/2002 | Kurihara |
| 8,564,314 B2 | 10/2013 | Shaikh |

(Continued)

FOREIGN PATENT DOCUMENTS

| CN | 104050405 A | 9/2014 |
| CN | 204480195 U | 7/2015 |

(Continued)

OTHER PUBLICATIONS

Chinese Office Action dated Mar. 25, 2019 for Chinese Patent Application No. 201610950594.1, which corresponds to U.S. Appl. No. 15/288,393.

(Continued)

*Primary Examiner* — Ryan A Lubit
(74) *Attorney, Agent, or Firm* — Michael Best & Friedrich LLP

(57) ABSTRACT

According to an aspect, a touch detection apparatus includes: a plurality of drive electrodes, wherein at least one of the drive electrodes includes a plurality of subdivided electrodes; a plurality of first touch detection electrodes; a second touch detection electrode; a first shift register circuit in which a plurality of first shift signal output circuits are sequentially coupled to one another; a second shift register circuit in which a plurality of second shift signal output circuits are sequentially coupled to one another; and a selection circuit that supplies a signal of the first shift register circuit to the drive electrode in a first mode, and supplies a signal of the second shift register circuit to the subdivided electrode in a second mode.

18 Claims, 31 Drawing Sheets

(56) References Cited

U.S. PATENT DOCUMENTS

| | | |
|---|---|---|
| 8,638,305 B2 | 1/2014 | Inami |
| 8,786,557 B2 | 7/2014 | Noguchi et al. |
| 9,007,329 B2 | 4/2015 | Lee et al. |
| 9,513,749 B2 | 12/2016 | Suzuki |
| 9,639,733 B2 | 5/2017 | Kremin |
| 9,773,148 B2 | 9/2017 | Mo et al. |
| 9,798,917 B2 | 10/2017 | Benkley, III |
| 9,851,836 B2 | 12/2017 | Lin |
| 9,921,705 B2 | 3/2018 | Shibata |
| 10,002,278 B2 | 6/2018 | Song et al. |
| 10,042,467 B2 | 8/2018 | Schwartz et al. |
| 10,055,054 B2 | 8/2018 | Lin et al. |
| 10,083,336 B2 | 9/2018 | Han et al. |
| 10,101,851 B2 | 10/2018 | Benkley, III et al. |
| 10,203,795 B2 | 2/2019 | Liu et al. |
| 10,203,816 B2 | 2/2019 | Nelson et al. |
| 10,203,826 B2 | 2/2019 | Nelson et al. |
| 10,203,827 B2 | 2/2019 | Nelson et al. |
| 10,203,828 B2 | 2/2019 | Nelson et al. |
| 10,353,513 B2 | 7/2019 | Mizuhashi et al. |
| 10,360,427 B2 | 7/2019 | Lee et al. |
| 2003/0016024 A1 | 1/2003 | Teranuma et al. |
| 2004/0247163 A1 | 12/2004 | Hara |
| 2006/0012570 A1 | 1/2006 | Yumoto et al. |
| 2010/0066650 A1 | 3/2010 | Lee |
| 2010/0182125 A1 | 7/2010 | Abdallah |
| 2010/0182273 A1 | 7/2010 | Noguchi et al. |
| 2010/0328291 A1 | 12/2010 | Ishizaki et al. |
| 2011/0025626 A1 | 2/2011 | Inami |
| 2012/0105081 A1 | 5/2012 | Shaikh et al. |
| 2013/0069894 A1 | 3/2013 | Chen |
| 2013/0135247 A1* | 5/2013 | Na .................... G06F 21/32 345/174 |
| 2014/0253498 A1 | 9/2014 | Suzuki et al. |
| 2014/0333328 A1 | 11/2014 | Nelson |
| 2015/0254491 A1 | 9/2015 | Mo et al. |
| 2015/0378481 A1 | 12/2015 | Cok |
| 2015/0378494 A1* | 12/2015 | Cok .................... G06F 3/0416 345/174 |
| 2016/0054844 A1 | 2/2016 | Lin |
| 2016/0148034 A1 | 5/2016 | Kremin |
| 2016/0224818 A1 | 8/2016 | Song |
| 2016/0283019 A1 | 9/2016 | Shang |
| 2016/0350570 A1 | 12/2016 | Han |
| 2016/0350571 A1* | 12/2016 | Han .................... G06K 9/0002 |
| 2016/0364050 A1 | 12/2016 | Shibata |
| 2016/0364591 A1 | 12/2016 | El-Khoury |
| 2016/0364593 A1 | 12/2016 | Lee |
| 2017/0017340 A1 | 1/2017 | Liu |
| 2017/0123555 A1* | 5/2017 | Kim .................... G06F 3/0412 |
| 2017/0123566 A1 | 5/2017 | Noguchi |
| 2017/0153742 A1* | 6/2017 | Pang .................... G06F 3/0416 |
| 2017/0169277 A1 | 6/2017 | Benkley |
| 2017/0193265 A1* | 7/2017 | Chan .................... G06F 3/044 |
| 2017/0220182 A1 | 8/2017 | Schwartz |
| 2017/0285846 A1 | 10/2017 | Mizuhashi |
| 2017/0308228 A1 | 10/2017 | Benkley |
| 2017/0315640 A1 | 11/2017 | Nelson |
| 2017/0336894 A1 | 11/2017 | Nelson |
| 2017/0351897 A1 | 12/2017 | Kremin |
| 2017/0364178 A1 | 12/2017 | Nelson |
| 2018/0012054 A1 | 1/2018 | Apostolos |
| 2018/0032206 A1* | 2/2018 | Lin .................... G06F 3/0416 |

FOREIGN PATENT DOCUMENTS

| | | |
|---|---|---|
| JP | 2003-090703 A | 3/2003 |
| JP | 2004-317353 A | 11/2004 |
| JP | 2006-024177 A | 1/2006 |
| JP | 2008-009616 A | 1/2008 |
| JP | 2009-244958 A | 10/2009 |
| JP | 2015179486 A | 10/2015 |

OTHER PUBLICATIONS

Non-Final Office Action of U.S. Appl. No. 15/288,393 dated May 31, 2018.
Final Office Action of U.S. Appl. No. 15/288,393 dated Nov. 7, 2018.
Japanese Office Action of Japanese Patent Application No. 2015-212381 dated Jan. 8, 2019, corresponding to U.S. Appl. No. 15/288,393.
Advisory Action of U.S. Appl. No. 15/288,393 dated Jan. 17, 2019.
U.S. Office Action dated May 13, 2019 for U.S. Appl. No. 15/288,393.
Japanese Office Action dated May 21, 2019, corresponding to Japanese Patent Application No. 2015-212381, which corresponds to U.S. Appl. No. 15/288,393.
U.S. Office Action dated Aug. 23, 2019, corresponding to U.S. Appl. No. 15/288,393.
Chinese Office Action dated Oct. 22, 2019, corresponding to related Chinese Patent Application No. 201610950594.1.
Chinese Office Action dated Sep. 23, 2019, corresponding to Chinese Patent Application No. 201710192069.2.

* cited by examiner

TOUCH DETECTION APPARATUS AND DISPLAY APPARATUS WITH TOUCH DETECTION FUNCTION

CROSS-REFERENCE TO RELATED APPLICATIONS

This application is a Continuation of application Ser. No. 15/470,266, filed Mar. 27, 2017, and claims priority from Japanese Application No. 2016-066802, filed on Mar. 29, 2016, the contents of which are incorporated by reference herein in its entirety.

BACKGROUND

1. Technical Field

The present invention relates to a touch detection apparatus and a display apparatus with a touch detection function.

2. Description of the Related Art

In recent years, a touch detection apparatus that can detect an external proximity object, what is called a touch panel, has been paid attention. The touch panel is, for example, mounted on or integrated with a display device such as a liquid crystal display device, which is used as a display apparatus with a touch detection function. A display apparatus with a touch detection function disclosed in Japanese Patent Application Laid-open Publication No. 2004-317353 causes various button images and the like to be displayed on the display device to enable users to input information using the touch panel in place of a typical mechanical button.

A fingerprint sensor is included in an electronic apparatus with the display apparatus described above in some cases. A fingerprint sensor disclosed in Japanese Patent Application Laid-open Publication No. 2003-90703 detects roughness of a fingerprint of a human finger in a contact state to detect its fingerprint pattern. A detection result of the fingerprint sensor is used for personal identification, for example.

An electronic apparatus in the related art includes a touch panel and a fingerprint sensor that are separately arranged. Thus, as a configuration of the fingerprint sensor, a region to be touched with a human finger needs to be arranged separately from a region for detecting a touch operation through the touch panel.

For the foregoing reasons, there is a need for a touch detection apparatus and a display apparatus with a touch detection function in which a detection region having higher resolution used for detecting a fingerprint and the like can also be used as a detection region for a touch operation.

SUMMARY

According to an aspect, a touch detection apparatus includes: a plurality of drive electrodes arranged in parallel in a detection region, wherein at least one of the drive electrodes includes a plurality of subdivided electrodes arranged at a finer pitch than an arrangement pitch of the drive electrodes; a plurality of first touch detection electrodes arranged in parallel in the detection region, wherein each of the first touch detection electrodes outputs a first touch detection signal indicating an electrical change in the first touch detection electrode generated when the touch operation is performed in the detection region at a timing when a drive signal is output to the drive electrodes; a second touch detection electrode that is arranged along a direction intersecting with the subdivided electrodes and outputs a second touch detection signal; a first shift register circuit in which a plurality of first shift signal output circuits are sequentially coupled to one another, wherein the first shift signal output circuits each generate a signal for sequentially driving the drive electrodes; a second shift register circuit in which a plurality of second shift signal output circuits are sequentially coupled to one another, wherein the second shift signal output circuits each generate a signal for sequentially driving the subdivided electrodes; and a selection circuit that supplies the signal of the first shift register circuit to the drive electrode in a first mode in which the drive electrodes are sequentially driven, and supplies the signal of the second shift register circuit to the subdivided electrode in a second mode in which the subdivided electrodes are sequentially driven.

According to another aspect, a display apparatus with a touch detection function, the display apparatus includes: a display device that displays an image; a plurality of drive electrodes arranged in parallel along a display surface on which the image is displayed by the display device, wherein at least one of the drive electrodes includes a plurality of subdivided electrodes arranged at a finer pitch than an arrangement pitch of the drive electrodes; a plurality of first touch detection electrodes arranged in parallel along the display surface, wherein each of the first touch detection electrodes outputs a first touch detection signal indicating an electrical change in the first touch detection electrode generated when the touch operation is performed on the display surface at a timing when a drive signal is output to the drive electrodes; a second touch detection electrode arranged along a direction intersecting with the subdivided electrode; a first shift register circuit in which a plurality of first shift signal output circuits are sequentially coupled to one another, wherein the first shift signal output circuits each generate a signal for sequentially driving the drive electrodes; a second shift register circuit in which a plurality of second shift signal output circuits are sequentially coupled to one another, wherein the second shift signal output circuits each generate a signal for sequentially driving the subdivided electrodes; and a selection circuit that supplies the signal of the first shift register circuit to the drive electrode in a first mode in which the drive electrodes are sequentially driven, and supplies the signal of the second shift register circuit to the subdivided electrode in a second mode in which the subdivided electrodes are sequentially driven.

DETAILED DESCRIPTION

Figure 1:
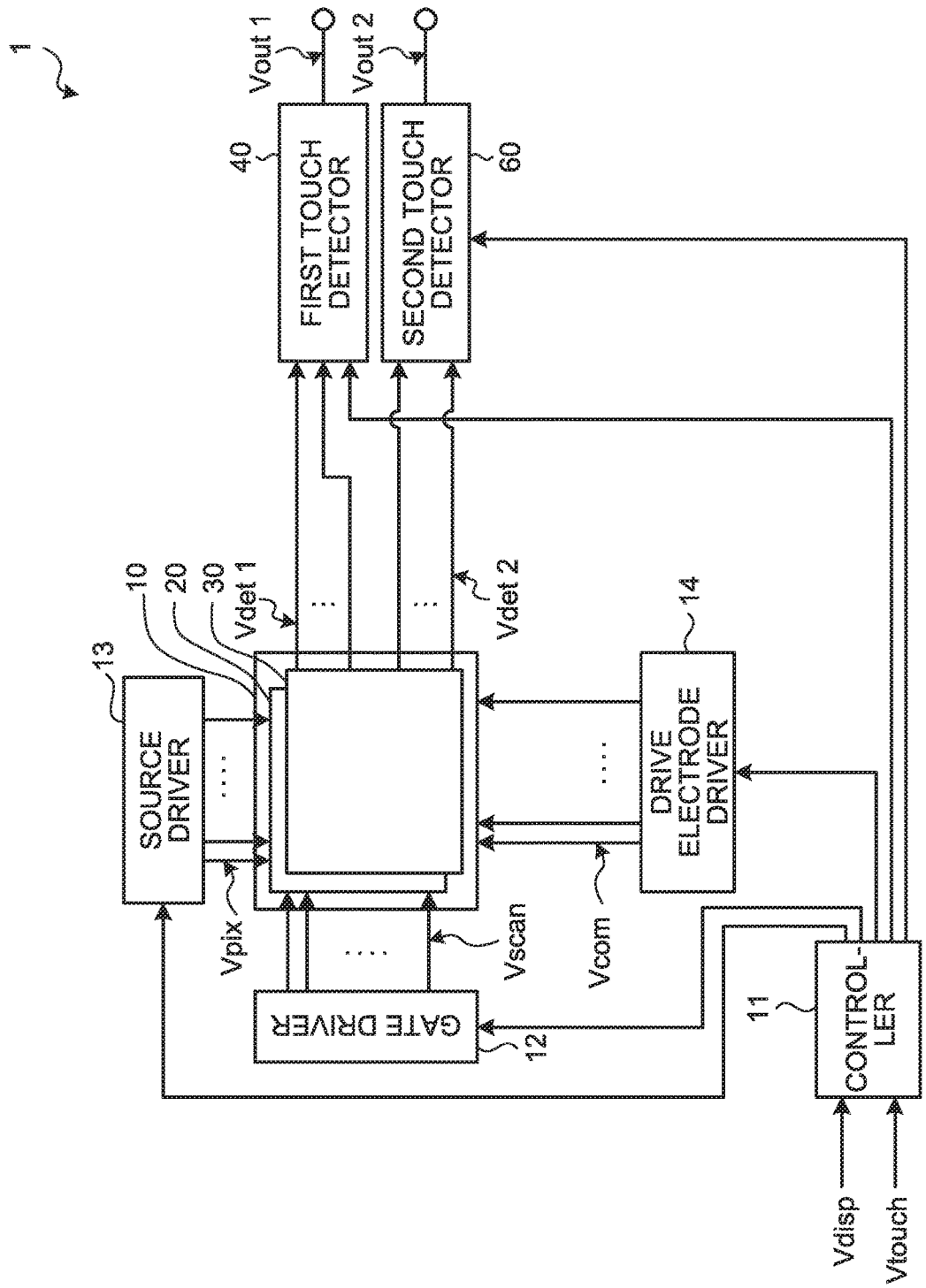
FIG. 1 is a block diagram illustrating a configuration example of a display apparatus with a touch detection function according to an embodiment.

The following describes a mode for carrying out the invention (embodiments) in detail with reference to the drawings. The present invention is not limited to the embodiments described below. Components described below include a component that is easily conceivable by those skilled in the art and components that are substantially the same. The components described below can be appropriately combined. The disclosure is merely an example, and the present invention naturally encompasses an appropriate modification maintaining the gist of the invention that is easily conceivable by those skilled in the art. To further clarify the description, the width, the thickness, the shape, and the like of each component may be schematically illustrated in the drawings as compared with an actual aspect. However, the drawings merely provide examples, and are not intended to limit interpretation of the invention. The same element as that described in the drawing already discussed is denoted by the same reference numeral throughout the description and the drawings, and detailed description thereof will not be repeated in some cases.

In this disclosure, when an element is described as being "on" another element, the element can be directly on the other element, or there can be one or more elements between the element and the other element.

First Embodiment

FIG. 1 is a block diagram illustrating a configuration example of a display apparatus 1 with a touch detection function according to an embodiment. As illustrated in FIG. 1, the display apparatus 1 with a touch detection function includes a display device 10 with a touch detection function, a controller 11, a gate driver 12, a source driver 13, a drive electrode driver 14, a first touch detector 40, and a second touch detector 60. In the display apparatus 1 with a touch detection function, a touch detection function is incorporated in the display device 10 with a touch detection function. The display device 10 with a touch detection function is a device in which a display panel 20 including a liquid crystal display element as a display element is integrated with a touch panel 30 serving as a touch detection apparatus for detecting a touch operation. The display device 10 with a touch detection function may be what is called an on-cell device in which the touch panel 30 is mounted on the display panel 20. In a case where the display device 10 with a touch detection function is the on-cell device, the touch panel 30 functions as a touch detection apparatus. The configuration of the display panel 20 is not limited to the configuration of including a liquid crystal display element as a display element. For example, the display panel 20 may be an organic electroluminescent (EL) display panel.

As described later, the display panel 20 is an element that sequentially performs scanning for each horizontal line to perform display in accordance with a scanning signal Vscan supplied from the gate driver 12. The controller 11 is a circuit that supplies a control signal to each of the gate driver 12, the source driver 13, the drive electrode driver 14, and the first touch detector 40 based on a video signal Vdisp supplied from the outside to control these components to operate in synchronization with each other.

The gate driver 12 has a function of sequentially selecting one horizontal line to be a display driving target of the display device 10 with a touch detection function based on the control signal supplied from the controller 11.

The source driver 13 is a circuit that supplies a pixel signal Vpix to each sub-pixel SPix (described later) in the display device 10 with a touch detection function based on the control signal supplied from the controller 11.

The drive electrode driver 14 is a circuit that supplies a drive signal Vcom to a drive electrode COML (described later) in the display device 10 with a touch detection function based on the control signal supplied from the controller 11.

Figure 10:
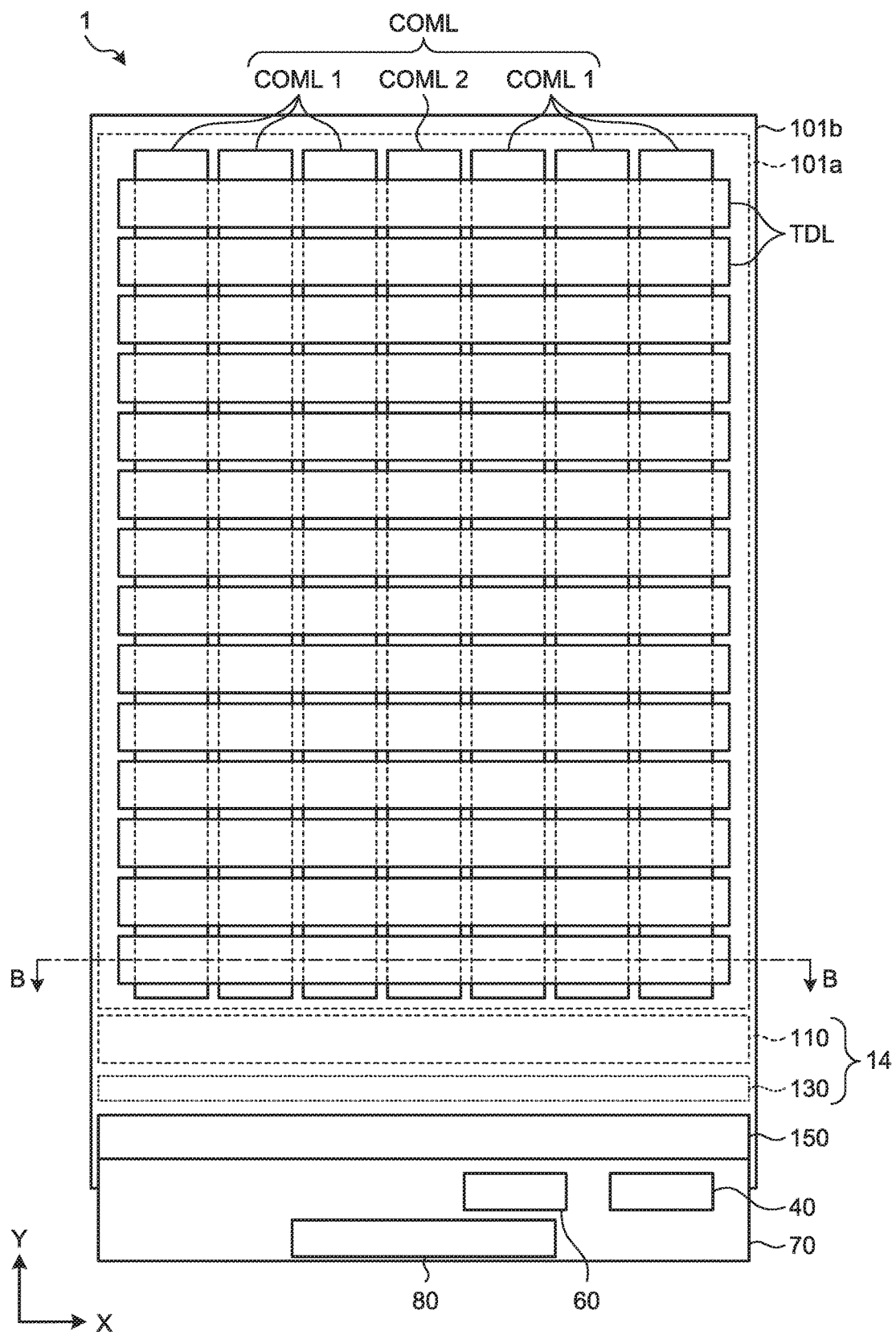
FIG. 10 is a plan view schematically illustrating a configuration especially related to touch detection in the display apparatus with a touch detection function.

The touch panel 30 operates based on a basic principle of capacitance touch detection, and performs a touch detection operation using a mutual capacitance system to detect contact or proximity of an external conductor with or to a detection region including a display region 101a (refer to FIG. 10, for example). The touch panel 30 may perform the touch detection operation using a self capacitance system. Hereinafter, an operation related to "proximity or contact of an object to or with a detection region" may be referred to as a "touch operation". "Detection of proximity or contact of an object" may be referred to as "touch detection".

Figure 2:
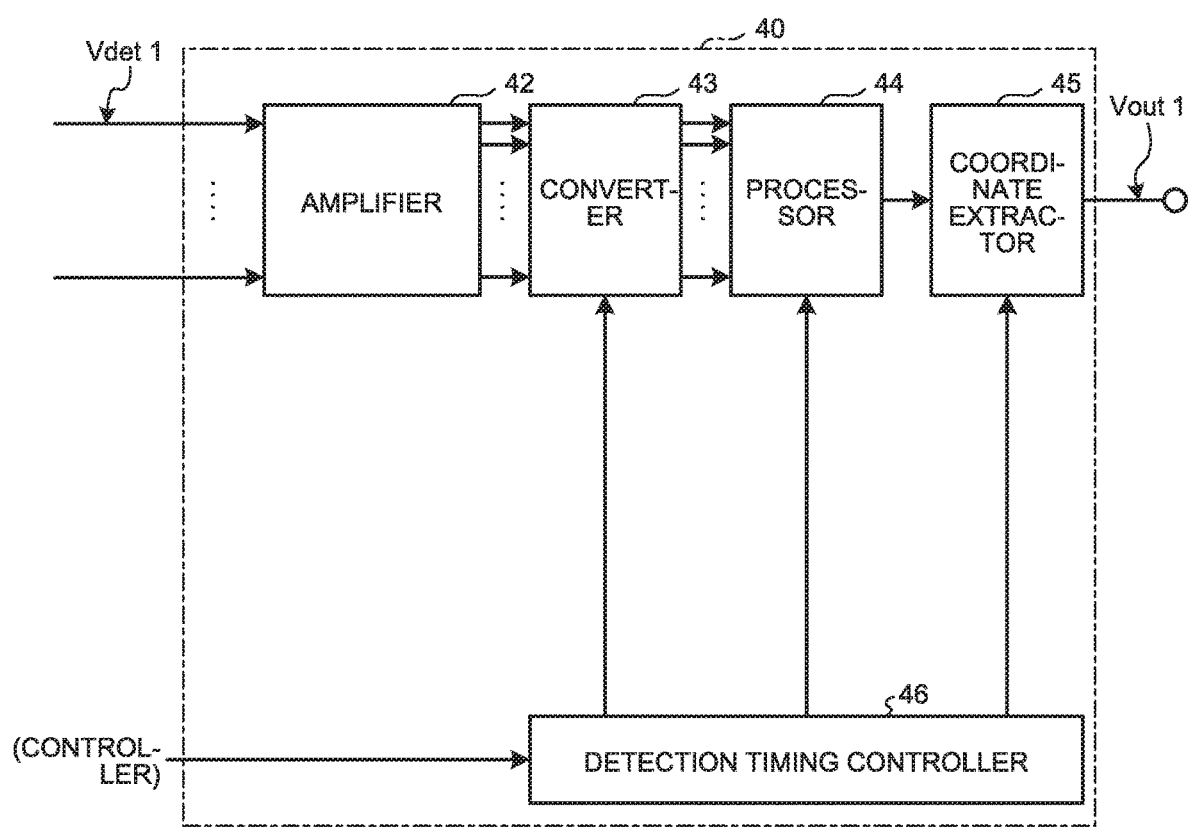
FIG. 2 is a block diagram illustrating a principal function configuration of a first touch detector.

FIG. 2 is a block diagram illustrating a principal function configuration of the first touch detector 40. The first touch detector 40 is a circuit that detects a touch operation performed on the touch panel 30 based on the control signal such as a clock signal supplied from the controller 11 and a first touch detection signal Vdet1 supplied from the touch panel 30. The first touch detector 40 obtains coordinates at which a touch operation is performed when a touch operation is detected. The first touch detector 40 includes an amplifier 42, an A/D converter 43, a signal processor 44, and a coordinate extractor 45. A detection timing controller 46 controls the A/D converter 43, the signal processor 44, and the coordinate extractor 45 based on the control signal supplied from the controller 11 such that the A/D converter 43, the signal processor 44, and the coordinate extractor 45 operate in synchronization with each other.

Figure 3:
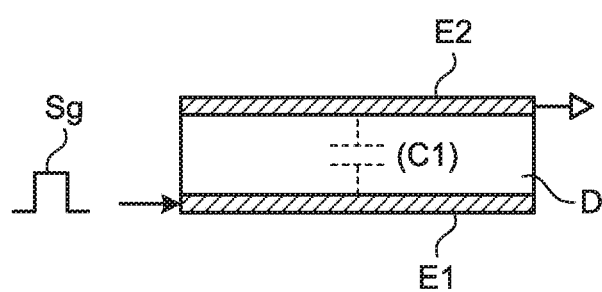
FIG. 3 is an explanatory diagram for explaining a basic principle of mutual capacitance touch detection and illustrates a state in which a finger is in a non-contact state or a non-proximate state.
Figure 4:
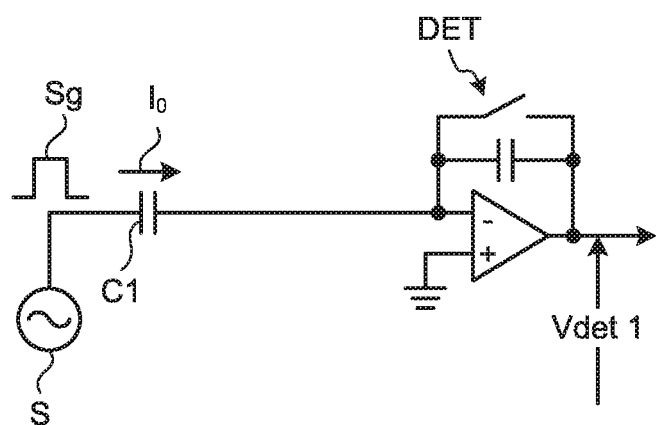
FIG. 4 is an explanatory diagram illustrating an example of an equivalent circuit of a state in which a finger is in a non-contact state or a non-proximate state illustrated in FIG. 3.
Figure 5:
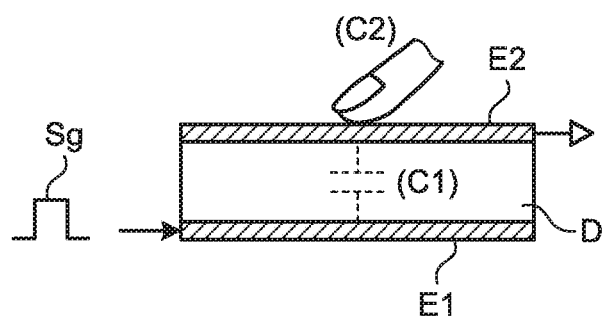
FIG. 5 is an explanatory diagram for explaining the basic principle of mutual capacitance touch detection and illustrates a state in which a finger is in a contact state or a proximate state.
Figure 6:
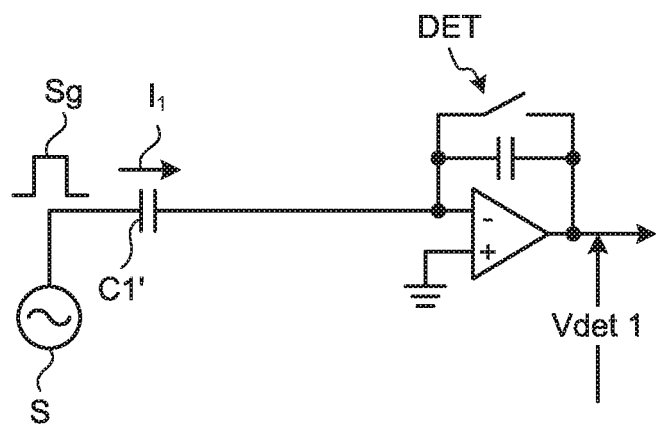
FIG. 6 is an explanatory diagram illustrating an example of an equivalent circuit of a state in which a finger is in a contact state or a proximate state illustrated in FIG. 5.
Figure 7:
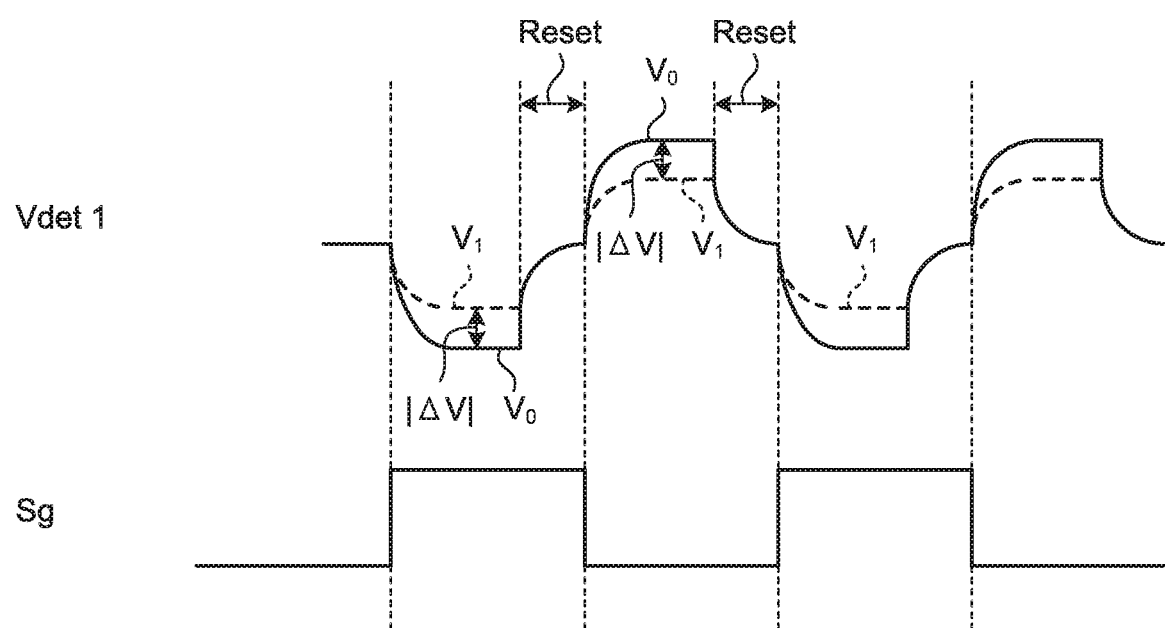
FIG. 7 is a diagram illustrating an example of waveforms of a drive signal and a touch detection signal in mutual capacitance touch detection.

As described above, the touch panel 30 operates based on the basic principle of capacitance touch detection. With reference to FIGS. 3 to 7, the following describes the basic principle of mutual capacitance touch detection performed with the touch panel 30 according to the present embodiment. FIG. 3 is an explanatory diagram for explaining the basic principle of mutual capacitance touch detection and illustrates a state in which a finger is in a non-contact state or a non-proximate state. FIG. 4 is an explanatory diagram illustrating an example of an equivalent circuit of the state in which the finger is in a non-contact state or a non-proximate state as illustrated in FIG. 3. FIG. 5 is an explanatory diagram for explaining the basic principle of mutual capacitance touch detection and illustrates a state in which the finger is in a contact state or a proximate state. FIG. 6 is an explanatory diagram illustrating an example of an equivalent circuit of the state in which the finger is in a contact state or a proximate state as illustrated in FIG. 5. FIG. 7 is a diagram illustrating an example of waveforms of the drive signal Vcom and the first touch detection signal Vdet1. The following describes a case in which a finger as an external proximity object is brought into contact with or proximate to the touch panel. Alternatively, for example, the external proximity object is not limited to the finger and may be an object including a conductor such as a stylus pen. The drive signal Vcom represents a signal output to the drive electrode COML, and does not represent a signal based on a specific voltage.

For example, as illustrated in FIG. 3, a capacitive element C1 includes a pair of electrodes arranged to be opposed to each other with a dielectric D interposed therebetween, the pair of electrodes being a drive electrode E1 and a touch detection electrode E2. As illustrated in FIG. 4, one end of the capacitive element C1 is coupled to an alternating current (AC) signal source (driving signal source) S, and the other end thereof is coupled to a voltage detector DET. The voltage detector DET is, for example, an integrating circuit included in the amplifier 42 illustrated in FIG. 2.

When an AC rectangular wave Sg having a predetermined frequency (for example, a frequency on the order of several kHz to several hundred kilohertz) is applied to the drive electrode E1 (one end of the capacitive element C1) from the AC signal source S, an output waveform (first touch detection signal Vdet1) as illustrated in FIG. 7 appears via the voltage detector DET coupled to the touch detection electrode E2 (the other end of the capacitive element C1). The AC rectangular wave Sg corresponds to the drive signal Vcom input from the drive electrode driver 14, for example.

In a state in which the finger is not in contact with or proximate to the touch panel (non-contact state), as illustrated in FIGS. 3 and 4, a current $I_0$ corresponding to a capacitance value of the capacitive element C1 flows with charge and discharge of the capacitive element C1. The voltage detector DET illustrated in FIG. 4 converts change in the current $I_0$ according to the AC rectangular wave Sg into change in voltage (a waveform $V_0$ of a solid line (refer to FIG. 7)).

In a state in which the finger is in contact with or proximate to the touch panel (contact state), as illustrated in FIG. 5, capacitance C2 formed by the finger is in contact with or proximate to the touch detection electrode E2, so that capacitance corresponding to a fringe between the drive electrode E1 and the touch detection electrode E2 is shielded. Due to this, as illustrated in FIG. 6, the capacitive element C1 functions as a capacitive element C1' having a capacitance value smaller than the capacitance value in a non-contact state. With reference to the equivalent circuit illustrated in FIG. 6, a current $I_1$ flows through the capacitive element C1'. As illustrated in FIG. 7, the voltage detector DET converts change in the current $I_1$ according to the AC rectangular wave Sg into change in voltage (a waveform $V_1$ of a dotted line). In this case, amplitude of the waveform $V_1$ is smaller than that of the waveform $V_0$ described above. Accordingly, an absolute value $|\Delta V|$ of a voltage difference between the waveform $V_0$ and the waveform $V_1$ varies depending on influence of an external conductor such as a finger that is brought into contact with or proximate to the touch panel. To accurately detect the absolute value $|\Delta V|$ of the voltage difference between the waveform $V_0$ and the waveform $V_1$, it is more preferable to provide, for an operation of the voltage detector DET, a period Reset for resetting charge and discharge of a capacitor in accordance with a frequency of the AC rectangular wave Sg through switching in the circuit.

The touch panel 30 illustrated in FIG. 1 sequentially performs scanning for each detection block in accordance with the drive signal Vcom supplied from the drive electrode driver 14 to perform mutual capacitance touch detection.

The touch panel 30 includes a plurality of first touch detection electrodes TDL, which will be described later, and the first touch detection electrodes TDL output the first touch detection signal Vdet1 for each detection block via the voltage detector DET illustrated in FIG. 4 or FIG. 6. The first touch detection signal Vdet1 is supplied to the amplifier 42 of the first touch detector 40.

The amplifier 42 amplifies the first touch detection signal Vdet1 supplied from the touch panel 30. The amplifier 42 may include an analog low pass filter (LPF) that removes a high frequency component (noise component) from the first touch detection signal Vdet1 and outputs the remaining component.

The A/D converter 43 samples each analog signal output from the amplifier 42 at a timing synchronized with the drive signal Vcom, and converts the analog signal into a digital signal.

The signal processor 44 includes a digital filter that reduces a frequency component (noise component) included in the output signal of the A/D converter 43, the noise component having a frequency other than a frequency at which the drive signal Vcom is sampled. The signal processor 44 is a logic circuit that detects a touch operation performed on the touch panel 30 based on the output signal of the A/D converter 43. The signal processor 44 performs processing of extracting only a difference of the detection signal caused by the finger. The signal of the difference caused by the finger has the absolute value $|\Delta V|$ of the difference between the waveform $V_0$ and the waveform $V_1$ described above. The signal processor 44 may perform an arithmetic operation for averaging the absolute values $|\Delta V|$ on a detection block basis to obtain an average value of the absolute values $|\Delta V|$. Due to this, the signal processor 44 can suppress influence of the noise. The signal processor 44 compares the detected signal of the difference caused by the finger with a predetermined threshold voltage. If the signal of the difference is smaller than the threshold voltage, the signal processor 44 determines that an external proximity object is in a non-contact state. If the signal of the difference is equal to or larger than the threshold voltage, the signal processor 44 determines that the external proximity object is in a contact state. In this way, the first touch detector 40 can perform touch detection. In this way, the first touch detector 40 detects the touch operation based on change in capacitance in the first touch detection electrode TDL. Hereinafter, touch detection using the drive electrode COML and the first touch detection electrode TDL may be referred to as first touch detection.

The coordinate extractor 45 is a logic circuit that obtains, when a touch operation is detected by the signal processor 44, touch panel coordinates at which the touch is detected. The coordinate extractor 45 outputs a detection signal output Vout1 indicating the touch panel coordinates. As described above, the touch panel 30 according to the present embodiment can detect the touch panel coordinates of the position where a conductor such as a finger is in contact with or proximate to, based on the basic principle of mutual capacitance touch detection.

Figure 8:
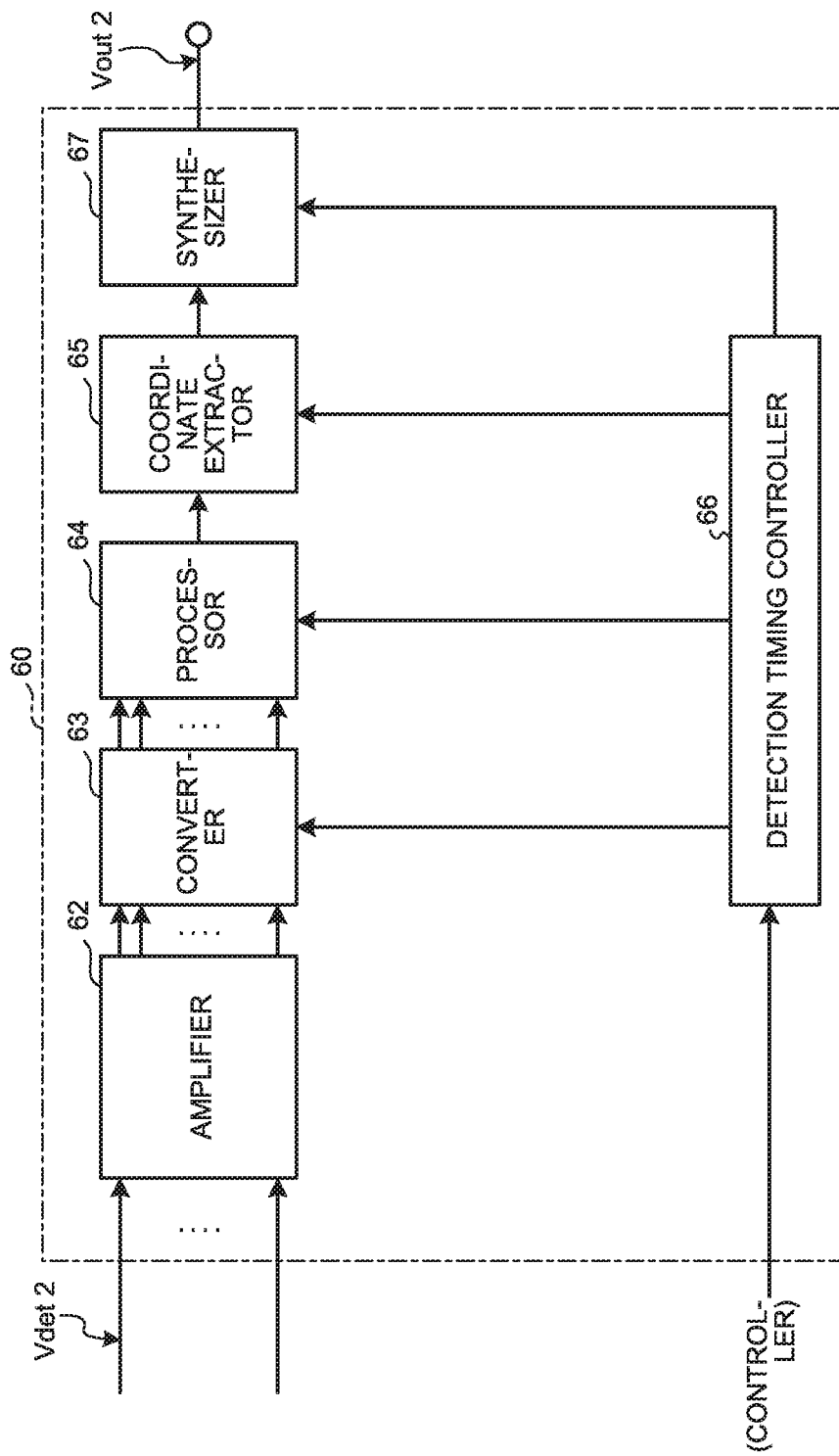
FIG. 8 is a block diagram illustrating a principal function configuration of a second touch detector.

FIG. 8 is a block diagram illustrating a principal function configuration of the second touch detector 60. The second touch detector 60 is a circuit that detects a touch operation at a finer pitch than the first touch detector 40 based on a control signal such as a clock signal supplied from the controller 11 and a second touch detection signal Vdet2 supplied from the touch panel 30. The second touch detector 60 includes, for example, an amplifier 62, an A/D converter 63, a signal processor 64, a coordinate extractor 65, a detection timing controller 66, and a synthesizer 67. Functions of the amplifier 62, the A/D converter 63, the signal processor 64, the coordinate extractor 65, and the detection timing controller 66 are similar to the functions of the amplifier 42, the A/D converter 43, the signal processor 44, the coordinate extractor 45, and the detection timing controller 46. The second touch detector 60 is coupled to a second touch detection electrode STDL (refer to FIG. 14, for example) in a similar manner to the first touch detector 40 being coupled to the first touch detection electrode TDL. The second touch detection signal Vdet2 from the second touch detection electrode STDL is supplied to the amplifier 62 of the second touch detector 60.

Figure 9:
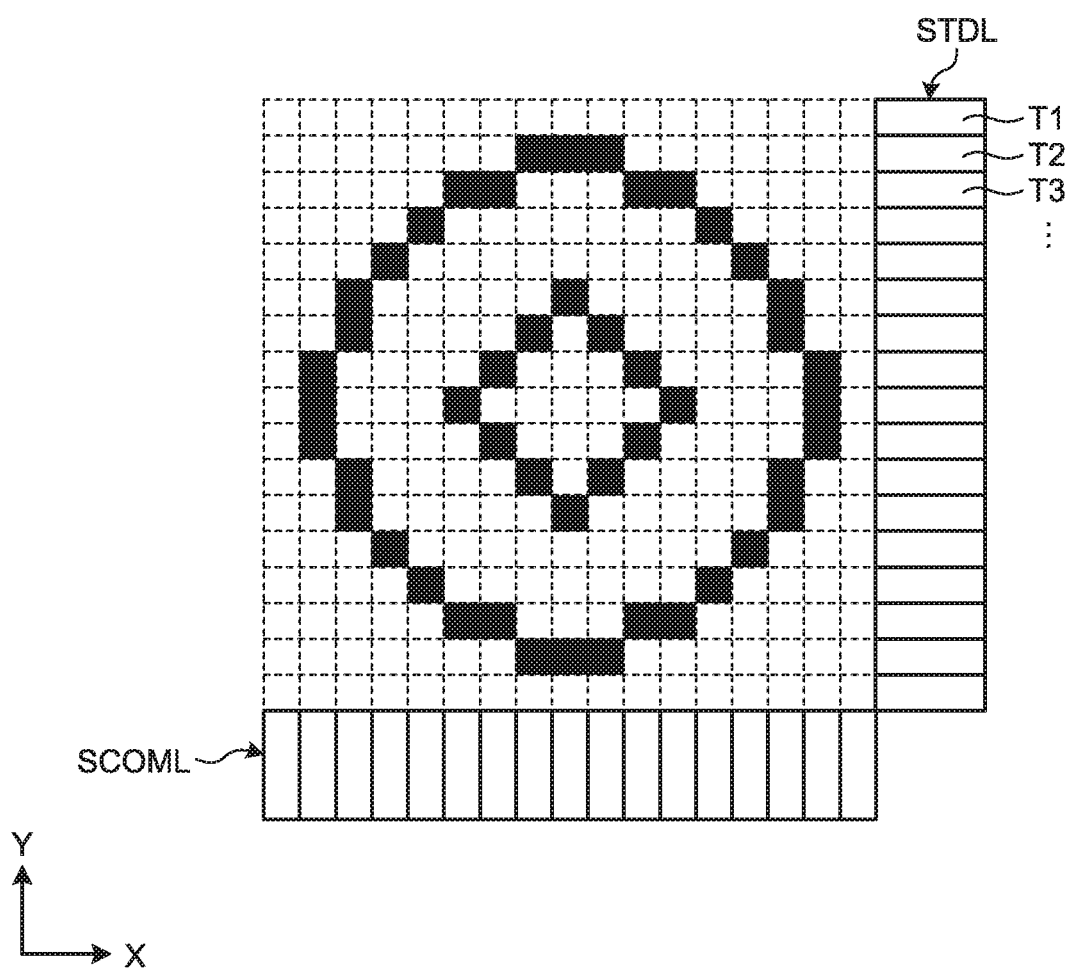
FIG. 9 is a schematic diagram illustrating a mechanism of fingerprint detection performed by the second touch detector.

FIG. 9 is a schematic diagram illustrating a mechanism of fingerprint detection performed by the second touch detector 60. The synthesizer 67 combines, for example, a plurality of second touch detection signals Vdet2 obtained through a plurality of times of touch detection using the second touch detection electrode STDL to generate two-dimensional information indicating a shape of the external proximity object performing a touch operation on the second touch detection electrodes STDL. Specifically, the synthesizer 67 generates a two-dimensional image representing, in terms of a shade of color (for example, a gray scale), a difference in detected intensity corresponding to a difference in a degree of contact with a covering member 5 (refer to FIG. 11) caused by roughness of the external proximity object (for example, a human finger). An output Vout2 of the second touch detector 60 including the synthesizer 67 is, for example, an output of the two-dimensional information described above.

In the present embodiment, assumption is made that a sweep operation is performed. The sweep operation is an operation such that a human finger relatively moves in a direction intersecting with an extending direction of one second touch detection electrode STDL. When the sweep operation is performed, as illustrated in FIG. 9, each of intersecting points of a plurality of subdivided electrodes SCOML (described later) and one second touch detection electrode STDL functions as an individual detection block to output a detection result corresponding to roughness of a fingerprint of the finger. A position of the finger in proximity to the second touch detection electrode STDL is changed at each time (reference numerals T1, T2, T3, . . . illustrated in FIG. 9) due to the movement of the finger performing the sweep operation, so that the finger can be two-dimensionally scanned by one second touch detection electrode STDL. The synthesizer 67 arranges such one-dimensional detection results in a time series manner (reference numerals T1, T2, T3, . . . in FIG. 9) and combines them to obtain a two-dimensional image.

For ease of understanding, FIG. 9 exemplifies two-gradation detection indicating only whether there is a touch operation. However, the touch detection result in each block may actually have multi-gradation. In FIG. 9, a detected external proximity object is an object having a double-circled projection. Alternatively, when the external proximity object is a human finger having fingerprints, the fingerprints appear as two-dimensional information. The function of the synthesizer 67 may be included in a configuration other than the second touch detector 60. For example, the output Vout2 of the second touch detector 60 may be an output of the coordinate extractor 65, and the two-dimensional information may be generated by an external configuration based on the output Vout2. The configuration related to generation of the two-dimensional information may be implemented as hardware such as a circuit, or may be made through what is called software processing.

Figure 11:
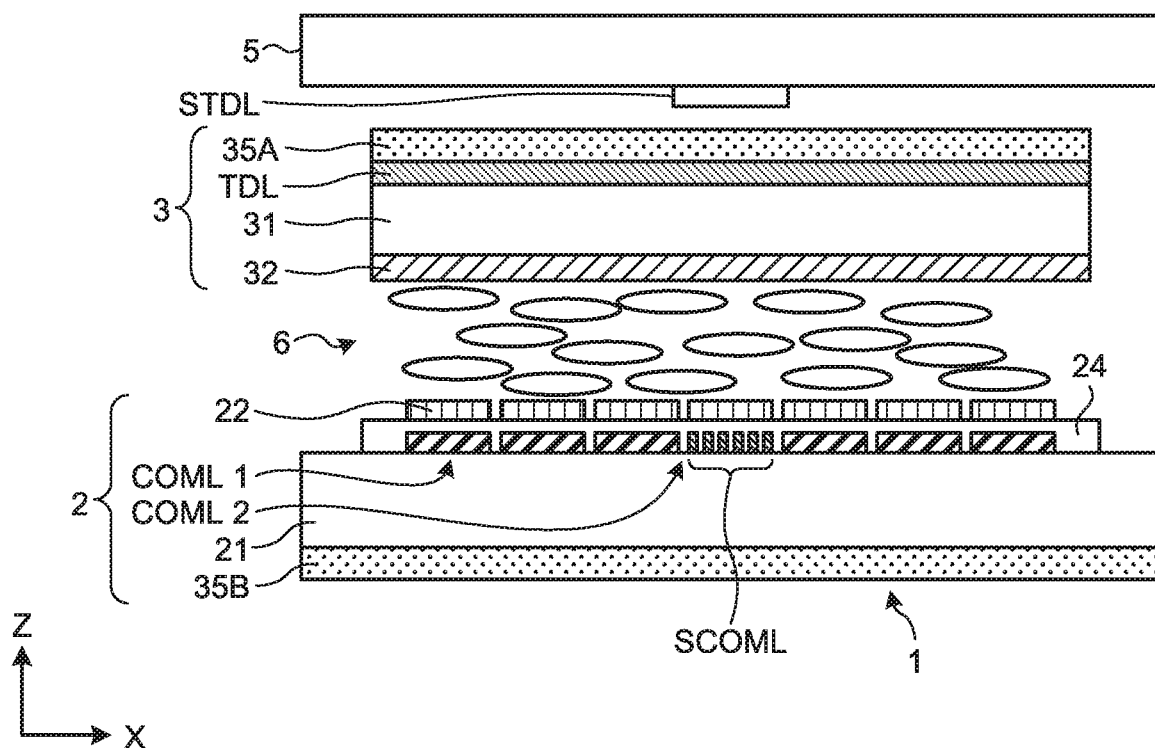
FIG. 11 is a B-B cross-sectional view representing a schematic structure of the display apparatus with a touch detection function according to the embodiment.
Figure 12:
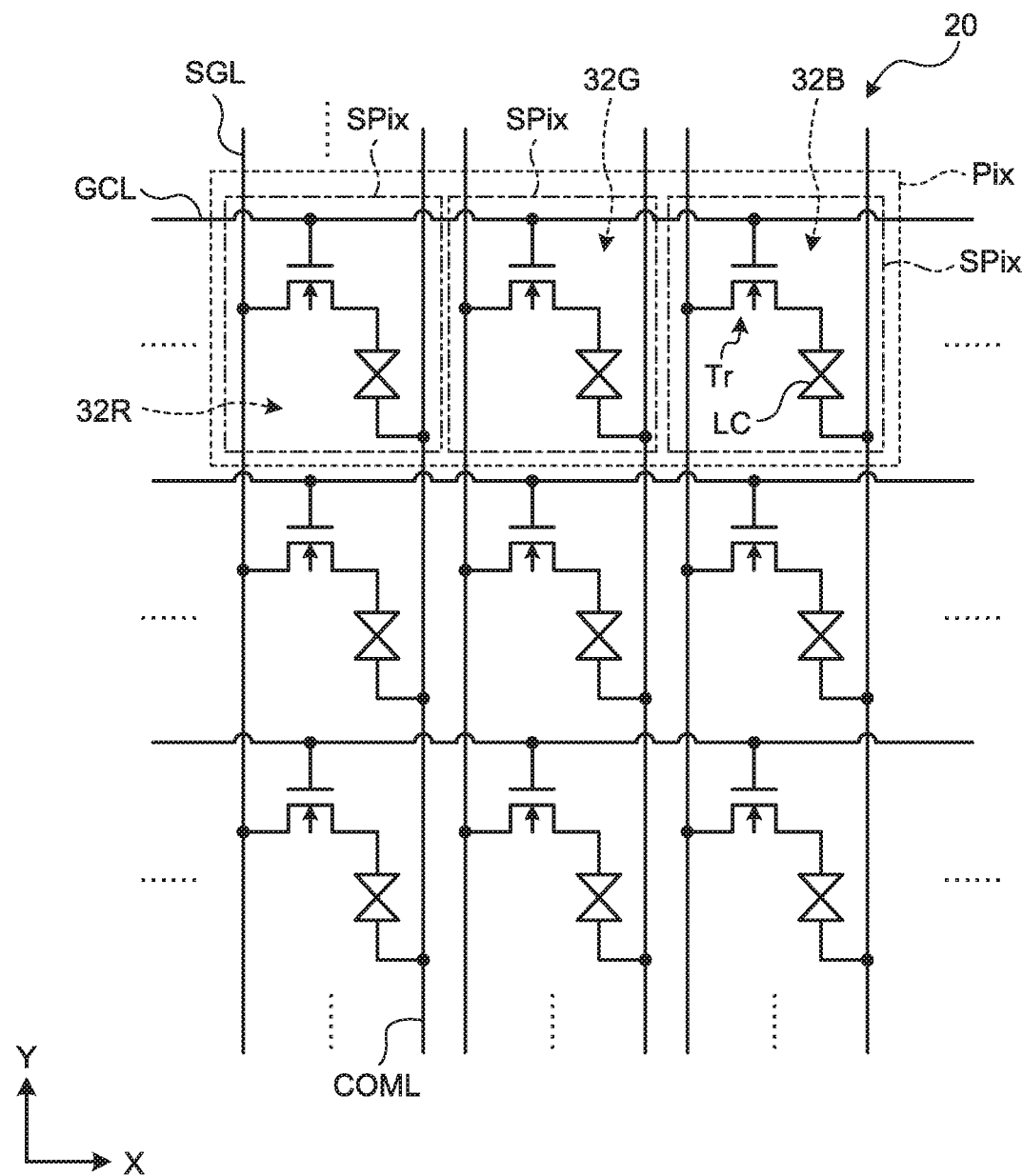
FIG. 12 is a circuit diagram of a pixel array of a display device with a touch detection function according to the embodiment.

Next, the following describes a configuration example of the display apparatus 1 with a touch detection function in detail. FIG. 10 is a plan view schematically illustrating a configuration especially related to touch detection in the display apparatus 1 with a touch detection function. FIG. 11 is a B-B cross-sectional view representing a schematic structure of the display apparatus 1 with a touch detection function. FIG. 12 is a circuit diagram of a pixel array of the display device 10 with a touch detection function according to the embodiment. In FIG. 10, the subdivided electrode SCOML and the second touch detection electrode STDL are not illustrated. A drive electrode COML1 is a drive electrode not including the subdivided electrode SCOML, and a drive electrode COML2 is a drive electrode including the subdivided electrode SCOML. Hereinafter, the drive electrode COML1 and the drive electrode COML2 may be collectively referred to as the drive electrode COML.

As illustrated in FIG. 11, the display apparatus 1 with a touch detection function includes a pixel substrate 2 and a counter substrate 3. The pixel substrate 2 and the counter substrate 3 are arranged to be opposed to each other. The display apparatus 1 with a touch detection function includes, for example, the display region 101a for displaying an image, and a frame region 101b outside the display region 101a as illustrated in FIG. 10. For example, the display region 101a has a rectangular shape having a long side and a short side, but the shape of the display region 101a can be appropriately changed. The frame region 101b has a frame shape surrounding part of or the entire edge of the display region 101a.

A plurality of drive electrodes COML and a plurality of first touch detection electrodes TDL are arranged in the display region 101a. The drive electrodes COML extend in a predetermined direction of the display region 101a, and are arranged in parallel with each other in a direction orthogonal to the predetermined direction. Specifically, for example, the drive electrodes COML extend in a direction along one side of the display region 101a having a rectangular shape, and are arranged in parallel with each other in a direction along the other side thereof orthogonal to the one side. The first touch detection electrodes TDL extend, for example, in a direction orthogonal to the predetermined direction in which the drive electrodes COML extend, and are arranged in parallel with each other in the predetermined direction. The extending direction of the first touch detection electrode TDL is assumed to be the X-direction. The extending direction of the drive electrodes COML is assumed to be the Y-direction. The direction orthogonal to the X-direction and the Y-direction is assumed to be the Z-direction.

The pixel substrate 2 includes a TFT substrate 21 serving as a circuit board, a plurality of pixel electrodes 22 arranged in a matrix on the upper side of the TFT substrate 21, the drive electrodes COML arranged between the TFT substrate 21 and the pixel electrode 22, and an insulating layer 24 that insulates the pixel electrode 22 from the drive electrode COML. A polarizing plate 35B may be arranged on the lower side of the TFT substrate 21 via a bonding layer.

The counter substrate 3 includes a glass substrate 31 and a color filter 32 formed on one surface of the glass substrate 31. The first touch detection electrode TDL serving as a detection electrode of the touch panel 30 is arranged on the other surface of the glass substrate 31. A polarizing plate 35A is arranged on the upper side of the first touch detection electrode TDL.

The TFT substrate 21 and the glass substrate 31 are arranged to be opposed to each other with a predetermined gap therebetween via a spacer (not illustrated). A liquid crystal layer 6 is arranged in a space between the TFT substrate 21 and the glass substrate 31. The liquid crystal layer 6 modulates light passing therethrough depending on a state of an electric field. For example, used are liquid crystals of lateral electric-field mode such as in-plane switching (IPS) including fringe field switching (FFS). An orientation film may be arranged between the liquid crystal layer 6 and the pixel substrate 2, and between the liquid crystal layer 6 and the counter substrate 3 illustrated in FIG. 11.

A thin film transistor element (hereinafter, referred to as a TFT element) Tr of each sub-pixel SPix illustrated in FIG. 12, and wiring such as pixel signal lines SGL and scanning signal lines GCL are provided at the TFT substrate 21. The pixel signal line SGL supplies the pixel signal Vpix to the pixel electrode 22, and the scanning signal line GCL supplies the drive signal Vcom for driving the TFT element Tr. The pixel signal line SGL and the scanning signal line GCL extend along a plane parallel to the surface of the TFT substrate 21.

The display panel 20 illustrated in FIG. 12 includes a plurality of sub-pixels SPix arranged in a matrix. Each sub-pixel SPix includes the TFT element Tr and a liquid crystal element LC. The TFT element Tr includes a thin film transistor. In this example, the TFT element Tr includes an n-channel metal oxide semiconductor (MOS) TFT. A source of the TFT element Tr is coupled to the pixel signal line SGL, a gate thereof is coupled to the scanning signal line GCL, and a drain thereof is coupled to one end of the liquid crystal element LC. One end of the liquid crystal element LC is coupled to the drain of the TFT element Tr, and the other end thereof is coupled to the drive electrode COML.

The sub-pixel SPix is coupled to the other sub-pixel SPix belonging to the same row in the display panel 20 via the scanning signal line GCL. The scanning signal line GCL is coupled to the gate driver 12 (refer to FIG. 1), and receives the scanning signal Vscan supplied from the gate driver 12. The sub-pixel SPix is coupled to the other sub-pixel SPix belonging to the same column in the display panel 20 via the pixel signal line SGL. The pixel signal line SGL is coupled to the source driver 13 (refer to FIG. 1), and receives the pixel signal Vpix supplied from the source driver 13. The sub-pixel SPix is further coupled to the other sub-pixel SPix belonging to the same column via the drive electrode COML. The drive electrode COML is coupled to the drive electrode driver 14 (refer to FIG. 1), and receives the drive signal Vcom supplied from the drive electrode driver 14. That is, in this example, a plurality of sub-pixels SPix belonging to the same column share one drive electrode COML. The drive electrode COML according to the present embodiment extends in parallel with an extending direction of the pixel signal line SGL, and extends in a direction intersecting with an extending direction of the scanning signal line GCL. The extending direction of the drive electrode COML is not limited thereto. For example, the drive electrode COML may extend in a direction parallel to the scanning signal line GCL.

The gate driver 12 illustrated in FIG. 1 drives the scanning signal lines GCL to scan each scanning signal line GCL sequentially. The gate driver 12 applies the scanning signal Vscan (refer to FIG. 1) to the gate of the TFT element Tr of the sub-pixel SPix via the scanning signal line GCL to sequentially select one line (one horizontal line) of the sub-pixels SPix as the display driving target. In the display apparatus 1 with a touch detection function, the source driver 13 supplies the pixel signal Vpix to each of the sub-pixels SPix belonging to the selected one horizontal line via a corresponding pixel signal line SGL illustrated in FIG. 12. The sub-pixels SPix perform display in units of horizontal lines in accordance with the pixel signals Vpix to be supplied. In performing this display operation, the drive electrode driver 14 supplies common potential for pixel driving to the drive electrodes COML.

In the color filter 32 illustrated in FIG. 11, for example, color regions of color filters 32R, 32G, and 32B colored in three colors of red (R), green (G), and blue (B) may be periodically arranged. Color regions of three colors R, G, and B are associated, as one set, with each of the sub-pixels SPix illustrated in FIG. 12, and a pixel Pix is constituted of a set of sub-pixels SPix corresponding to the color regions of three colors. As illustrated in FIG. 11, the color filter 32 is opposed to the liquid crystal layer 6 in a direction perpendicular to the TFT substrate 21. Another combination of colors may be used for the color filter 32 so long as the colors are different from each other. The combination of colors for the color filter 32 is not limited to three colors. Alternatively, four or more colors may be combined.

The drive electrode COML functions as a common electrode that gives common potential to the pixel electrodes 22 of the display panel 20, and also functions as an electrode to which the drive signal is output in performing mutual capacitance touch detection of the touch panel 30. The drive electrode COML may also function as a detection electrode for performing self capacitance touch detection of the touch panel 30.

Figure 13:
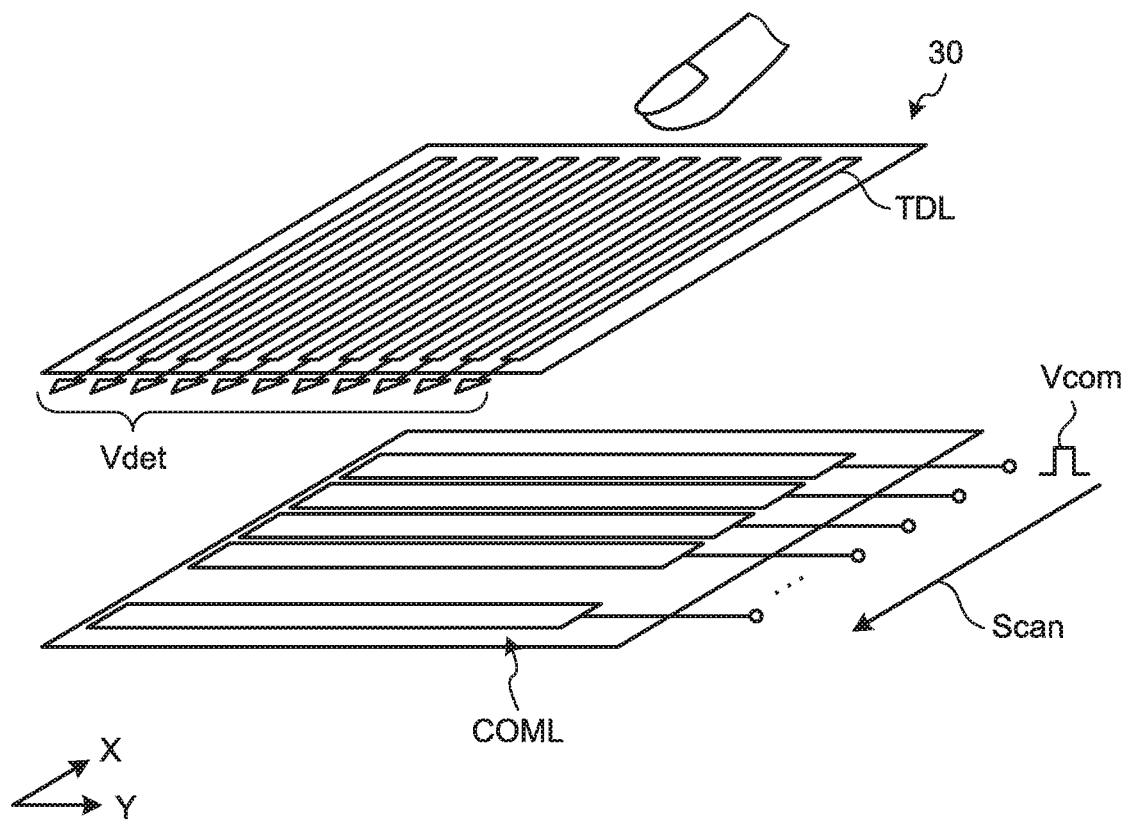
FIG. 13 is a perspective view illustrating a configuration example of a drive electrode and a touch detection electrode of the display device with a touch detection function according to the embodiment.

FIG. 13 is a perspective view illustrating a configuration example of the drive electrode COML and the touch detection electrode TDL of the display device 10 with a touch detection function according to the present embodiment. The touch panel 30 includes the drive electrode COML provided at the pixel substrate 2 and the first touch detection electrode TDL provided at the counter substrate 3. The drive electrodes COML include a plurality of stripe electrode patterns extending along the X-direction in FIG. 13. The first touch detection electrodes TDL include a plurality of electrode patterns extending in a direction intersecting with the extending direction of the electrode patterns of the drive electrode COML. The first touch detection electrodes TDL are opposed to the drive electrodes COML in a direction perpendicular to the surface of the TFT substrate 21. Each electrode pattern of the first touch detection electrodes TDL is coupled to an input side of the amplifier 42 in the first touch detector 40. Capacitance is formed at each intersecting portion between each electrode pattern of the drive electrodes COML and each electrode pattern of the first touch detection electrodes TDL.

A translucent conductive material such as indium tin oxide (ITO) is used to make the first touch detection electrode TDL, the drive electrode COML, and the second touch detection electrode STDL, for example. The shape of the electrodes used for touch detection such as the first touch detection electrodes TDL and the drive electrodes COML is not limited to a striped shape. For example, the first touch detection electrodes TDL and the drive electrodes COML may have a comb-teeth shape. Alternatively, it is sufficient that the first touch detection electrodes TDL and the drive electrodes COML are separated from each other such that a plurality of parts are arranged separately, and a slit that separates the drive electrodes COML may have a linear shape or a curved shape. The same applies to the shape of the second touch detection electrode STDL and the subdivided electrode SCOML described later. At least one second touch detection electrode is arranged in a direction intersecting with the subdivided electrode SCOML.

When the touch panel 30 performs a mutual capacitance touch detection operation, the drive electrode driver 14 drives the drive electrodes COML as a drive electrode block to sequentially scanning the drive electrodes COML in a time division manner, so that one detection block of the drive electrodes COML is sequentially selected. When the first touch detection signal Vdet1 is output from the first touch detection electrode TDL, touch detection for one detection block is performed. That is, the drive electrode block corresponds to the drive electrode E1 in the basic principle of mutual capacitance touch detection described above, the first touch detection electrode TDL corresponds to the touch detection electrode E2, and the touch panel 30 detects a touch operation in accordance with the basic principle. As illustrated in FIG. 13, in the touch panel 30, the first touch detection electrodes TDL and the drive electrodes COML intersecting with each other form a capacitance touch sensor in a matrix. Thus, by scanning across the entire touch detection surface of the touch panel 30, a position where an external conductor is brought into contact with or proximate to the touch panel 30 can be detected.

The touch detection surface of the touch panel 30 also functions as a display surface on which a display output is performed by the display panel 20. The touch detection surface is, for example, a surface of the translucent covering member 5 serving as a cover member, the surface being on a side opposite to the counter substrate 3 side. Thus, the display region 101a on which a display output is performed by the display panel 20 overlaps with a detection region on which touch detection is performed by the touch panel 30. A degree of overlapping between the display region 101a and the detection region is freely predetermined. For example, the detection region preferably covers the entire display region 101a.

In this way, the touch panel 30 includes a plurality of drive electrodes COML and a plurality of first touch detection electrodes TDL arranged in parallel in the detection region, and functions as a touch detection apparatus that detects a touch operation in the detection region based on the first touch detection signal Vdet1 indicating an electrical change in the first touch detection electrode TDL caused by the touch operation in the detection region performed at the timing when the drive signal Vcom is output to the drive electrodes COML. The first touch detection electrode TDL and the second touch detection electrode STDL are arranged at positions not in contact with the drive electrode COML and the subdivided electrode SCOML. The first touch detection signal Vdet1 is a signal based on capacitance generated between the drive electrode COML to which the drive signal Vcom is transmitted and the first touch detection electrode TDL. The second touch detection signal Vdet2 is a signal based on capacitance generated between the subdivided electrode SCOML to which the drive signal Vcom is transmitted and the second touch detection electrode STDL.

The second touch detection electrode STDL is arranged, for example, on a surface of the covering member 5 facing the counter substrate 3. However, this is merely an example of arrangement of the second touch detection electrode STDL, and the embodiment is not limited thereto. The arrangement of the second touch detection electrode STDL can be appropriately modified within a range in which capacitance can be formed between the second touch detection electrode STDL and the subdivided electrode SCOML in the detection region.

Figure 14:
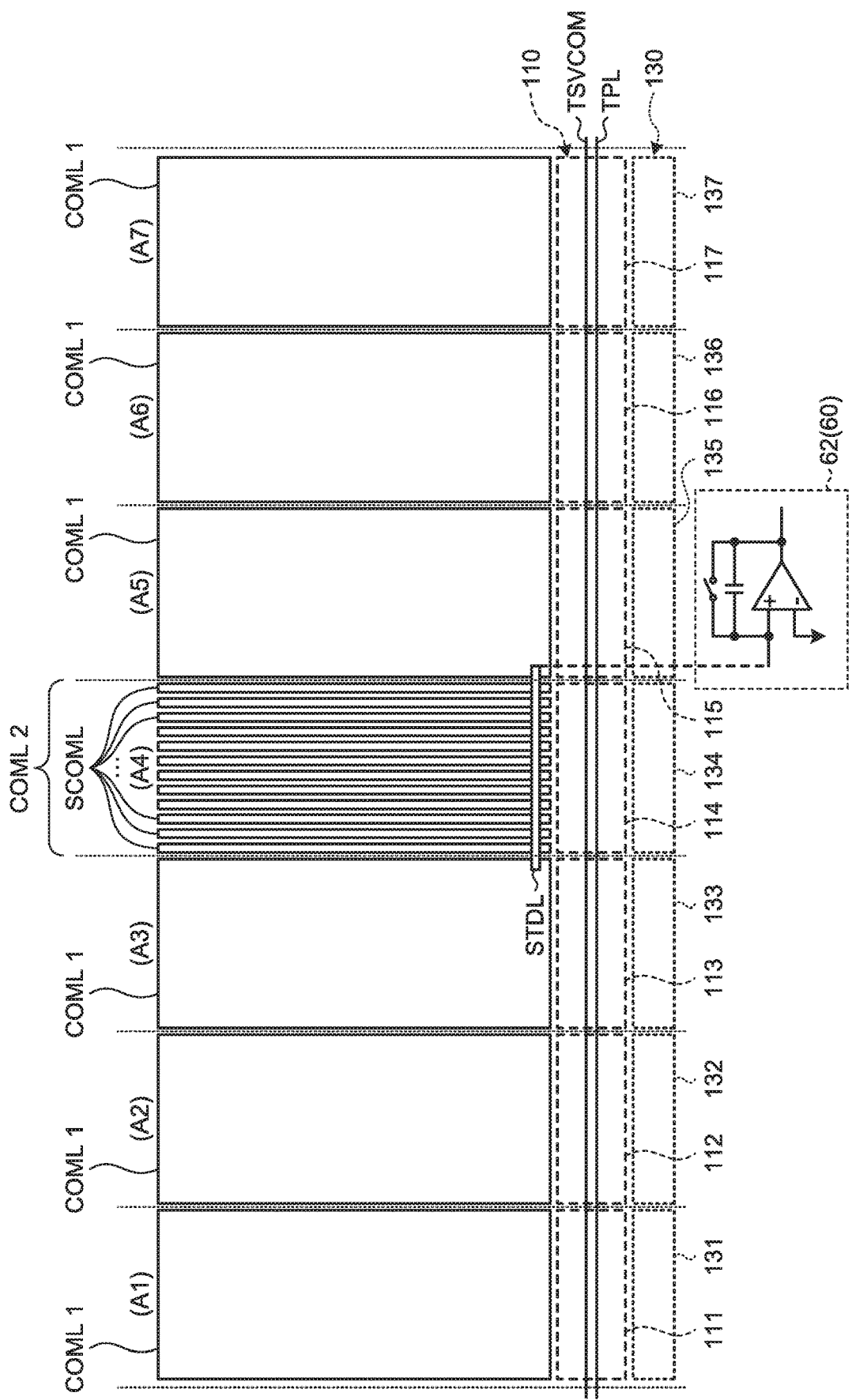
FIG. 14 is a schematic diagram illustrating a relation between the drive electrode and a subdivided electrode, and a configuration related to touch detection.

FIG. 14 is a schematic diagram illustrating a relation between the drive electrode COML and the subdivided electrode SCOML, and a configuration related to touch detection. In the present embodiment, at least one of the drive electrodes COML include a plurality of subdivided electrodes SCOML. Specifically, as illustrated in FIGS. 11 and 14, at least one (drive electrode COML2) of the drive electrodes COML include a plurality of subdivided electrodes SCOML. In this way, at least one of the drive electrodes COML is divided into a plurality of subdivided electrodes SCOML that are arranged at a finer pitch than the arrangement pitch of the drive electrodes COML. The drive electrode COML1 does not include the subdivided electrode SCOML.

As illustrated in FIGS. 11 and 14, in the display apparatus 1 with a touch detection function, the second touch detection electrode STDL is arranged at a position overlapping with the subdivided electrodes SCOML in a plan view as the configuration of the touch panel 30. The second touch detection electrode STDL extends along a direction orthogonal to a predetermined direction in which the drive electrode COML extends. The extending length and the extending range of the second touch detection electrode STDL covers a range in which the subdivided electrodes SCOML are arranged.

According to the present embodiment, the following describes seven drive electrodes COML schematically exemplified in FIGS. 10, 11, and 14, for example. In the description, as illustrated in FIG. 14 and the other drawings, regions along a predetermined direction in which the seven drive electrodes COML are arranged may be distinguished from each other as regions A1, A2, ..., and A7 from the left in this order.

According to the first embodiment, the drive electrodes COML are driven at different timings. Specifically, as illustrated in FIG. 10 for example, the pixel substrate 2 includes a transmission switching circuit 110 and a shift drive circuit 130 as the configuration of the drive electrode driver 14. The function of the drive electrode driver 14 according to the present embodiment is implemented by the configuration of the transmission switching circuit 110 and the shift drive circuit 130, and a display driver integrated circuit (DDIC) 80 that outputs various signals for controlling the operation of the shift drive circuit 130. The transmission switching circuit 110 is a circuit coupled to a driving potential line TSVCOM and a potential line TPL, for example. The electric potential of the driving potential line TSVCOM is a potential corresponding to the drive signal Vcom in performing touch detection in accordance with a digital signal transmitted under control of the DDIC 80. The electric potential of the potential line TPL is a potential indicating low-level electric potential. When the driving potential line TSVCOM is in a state of indicating high-level electric potential in accordance with the digital signal, the driving potential line TSVCOM functions as a driving potential section indicating electric potential that functions as the drive signal Vcom applied to the drive electrode COML (and the subdivided electrode SCOML). The drive electrode COML is coupled to the potential line TPL during a period in which touch detection is not performed, for example (refer to FIG. 16). The shift drive circuit 130 shifts the drive electrode COML to which the driving potential line TSVCOM is coupled in accordance with an input timing of one signal (signal ST illustrated in FIG. 15).

Figure 15:
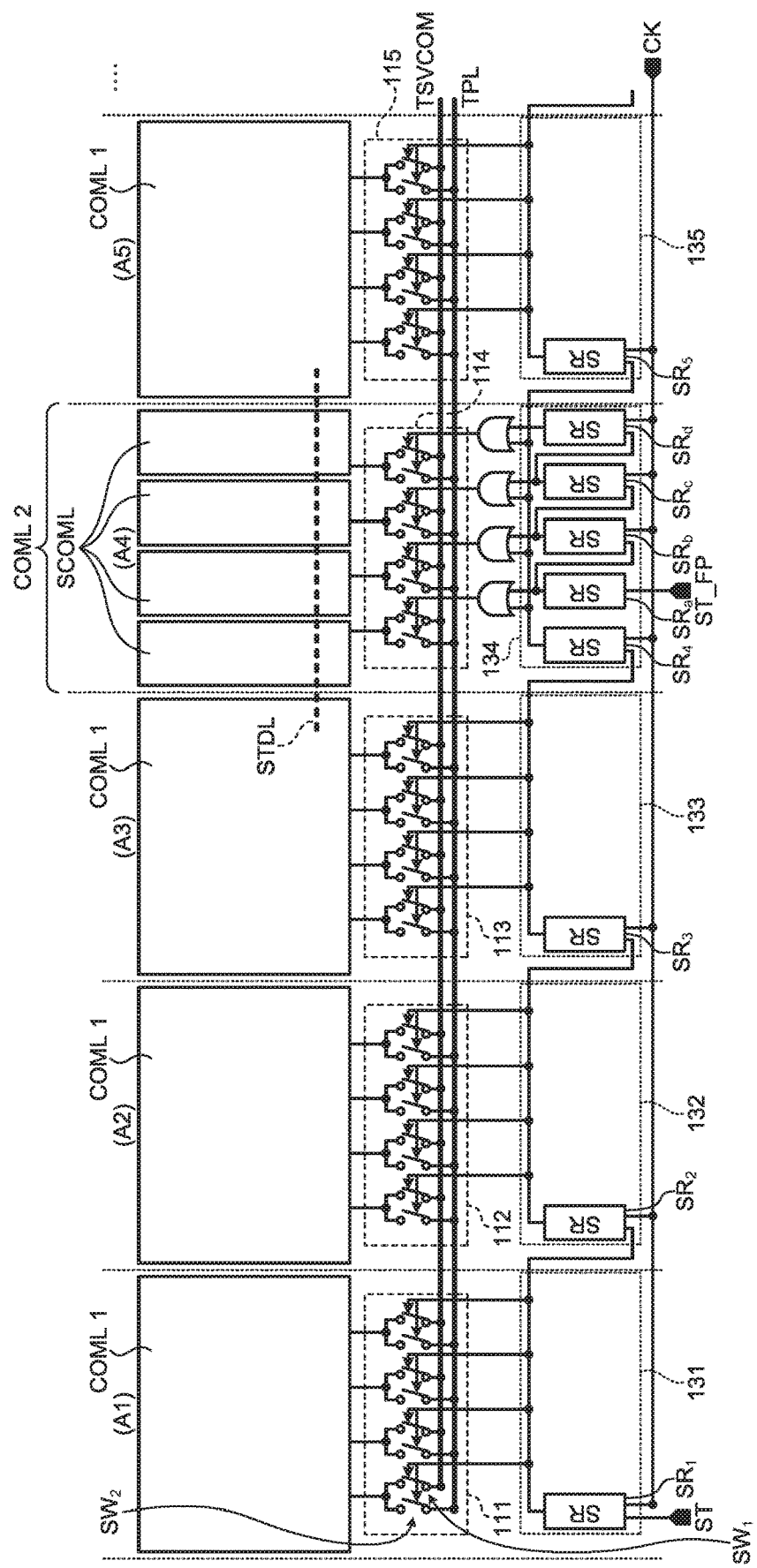
FIG. 15 is a schematic diagram illustrating an example of a coupling relation between the drive electrode, a transmission switching circuit, and a shift drive circuit.
Figure 16:
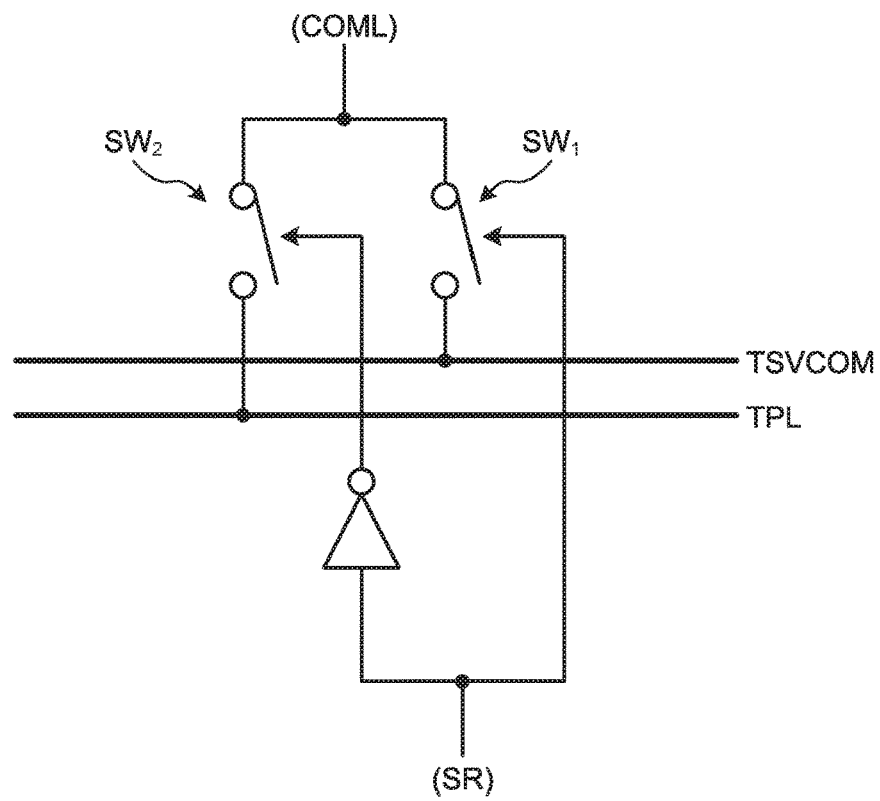
FIG. 16 is a diagram illustrating a configuration example of a set of a first switch and a second switch included in an individual switching circuit.

FIG. 15 is a schematic diagram illustrating an example of a coupling relation between the drive electrode COML, the transmission switching circuit 110, and the shift drive circuit 130. FIG. 16 is a diagram illustrating a configuration example of a set of a first switch $SW_1$ and a second switch $SW_2$ included in each of individual switching circuits 111, 112, 113, 114, 115, 116, and 117. As illustrated in FIG. 14, the transmission switching circuit 110 includes the individual switching circuits 111 to 117 arranged in the respective regions A1 to A7. The individual switching circuits 111 to 117 share the driving potential line TSVCOM and the potential line TPL.

As illustrated in FIG. 15, the shift drive circuit 130 includes a plurality of shift signal output circuits SR. The shift signal output circuit SR is, for example, a flip-flop circuit. Each of the individual switching circuits 111 to 117 is coupled to at least one shift signal output circuit SR, and operates to switch ON and OFF of the coupling of the drive electrode COML (the subdivided electrode SCOML) with the driving potential line TSVCOM and the potential line TPL depending on whether there is a signal from the shift signal output circuit SR. In the present embodiment, each of the individual switching circuits 111 to 117 couples the drive electrode COML (the subdivided electrode SCOML) to the driving potential line TSVCOM (ON), and decouple it from the potential line TPL (OFF) when there is an output from the shift signal output circuit SR. On the other hand, each of the individual switching circuits 111 to 117 couples the drive electrode COML (the subdivided electrode SCOML) to the potential line TPL (ON), and decouple it from the driving potential line TSVCOM (OFF) when there is no output from the shift signal output circuit SR. In FIGS. 14 and 15, for example, each of reference numerals 131, 132, ..., and 137 denotes a region in which at least one shift signal output circuit SR is arranged, each of the shift signal output circuits SR being individually coupled to a corresponding one of the individual switching circuits 111, 112, ..., and 117, each of the individual switching circuits 111, 112, ..., and 117 being coupled to a corresponding one of the drive electrodes COML (the drive electrodes COML1 or the drive electrode COML2) in the regions A1, A2, ..., and A7.

The number of shift signal output circuits SR provided for the drive electrode COML1 not including the subdivided electrode SCOML is different from the number of shift signal output circuits SR provided for the drive electrode COML2 including the subdivided electrode SCOML. Specifically, one shift signal output circuit SR is arranged in each of the regions A1 to A3 and A5 to A7 in which the drive electrode COML1 is arranged. In the region A4 in which the drive electrode COML2 is arranged, a plurality of shift signal output circuits SR are arranged, the number thereof is a number obtained by adding 1 to the number of the subdivided electrodes SCOML.

As illustrated in FIG. 15, the individual switching circuit 114 coupled to the drive electrode COML2 includes switches the number of which is sufficient for individually switching ON and OFF of a coupling of the subdivided electrode SCOML with the driving potential line TSVCOM and the potential line TPL. Specifically, as illustrated in FIG. 16, one subdivided electrode SCOML is coupled to the driving potential line TSVCOM via the first switch $SW_1$ and is coupled to the potential line TPL via the second switch $SW_2$. That is, the first switch $SW_1$ switches the coupling of the subdivided electrode SCOML with the driving potential line TSVCOM ON and OFF. The second switch $SW_2$ switches the coupling of the subdivided electrode SCOML with the potential line TPL ON and OFF. The first switch $SW_1$ is turned ON when there is an output from the shift signal output circuit SR, and is turned OFF when there is no output from the shift signal output circuit SR. The second switch $SW_2$ is turned ON when there is no output from the shift signal output circuit SR, and is turned OFF when there is an output from the shift signal output circuit SR. The number of the first switches $SW_1$ and the second switches $SW_2$ arranged for one drive electrode COML2 is a number corresponding to the number of the subdivided electrodes SCOML included in one drive electrode COML2, or a number corresponding to the number of the shift signal output circuits SR arranged for driving one drive electrode COML2. The width in the X-direction in which the first switches $SW_1$ and the second switches $SW_2$ are arranged for one drive electrode COML2 preferably corresponds to the width in the X-direction of one drive electrode COML2.

The first switch $SW_1$ and the second switch $SW_2$ included in the individual switching circuit 114 that is coupled to the drive electrode COML2 are coupled to two shift signal output circuits SR via OR circuits the number of which corresponds to the number of the subdivided electrodes SCOML. The first switch $SW_1$ is turned ON when there is an output from any one of the two shift signal output circuits SR, and the second switch $SW_2$ is turned ON when there is no output from the two shift signal output circuits SR.

In the present embodiment, each of the individual switching circuits 111, 112, 113, 115, 116, and 117 coupled to the drive electrode COML1 not including the subdivided electrode SCOML includes the first switches $SW_1$ and the second switches $SW_2$ the number of which is the same as that of the first switches $SW_1$ and the second switches $SW_2$ included in the individual switching circuit 114 coupled to the drive electrode COML2 including the subdivided electrode SCOML. However, this is merely an example, and the embodiment is not limited thereto and can be appropriately modified. It is sufficient that each of the individual switching circuits 111, 112, 113, 115, 116, and 117 includes at least one first switch $SW_1$ and at least one second switch $SW_2$.

Figure 17:
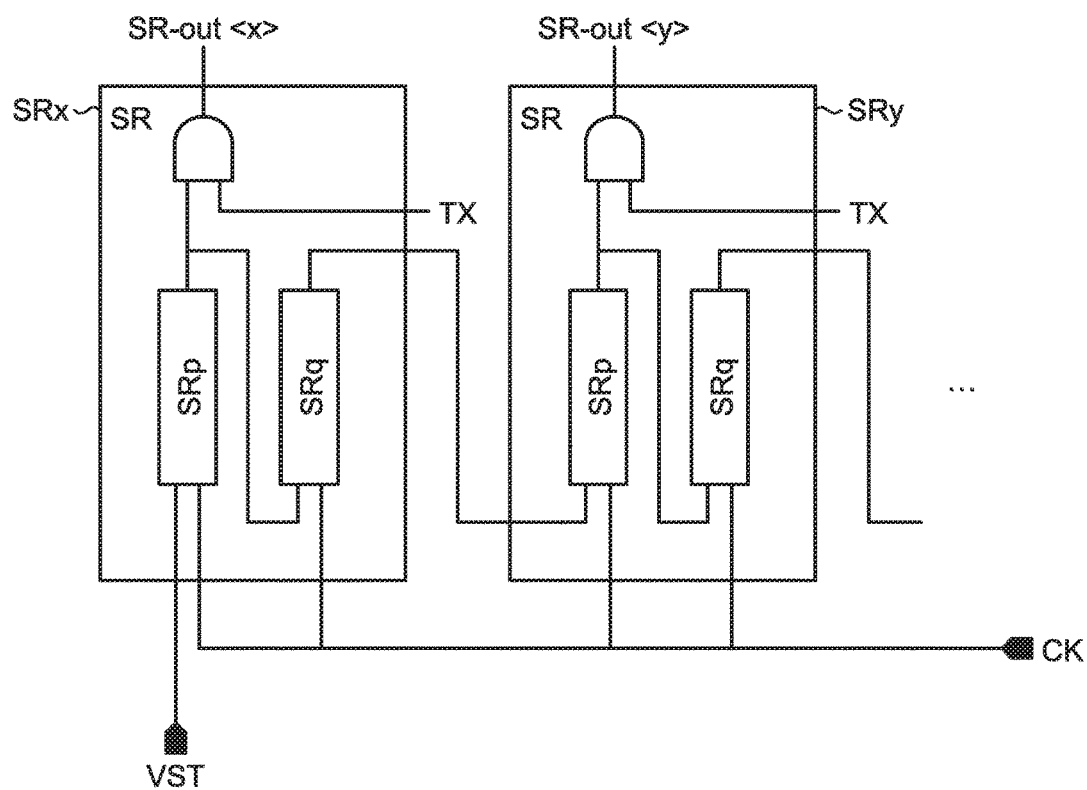
FIG. 17 is a schematic configuration diagram of two shift signal output circuits coupled with each other.
Figure 18:
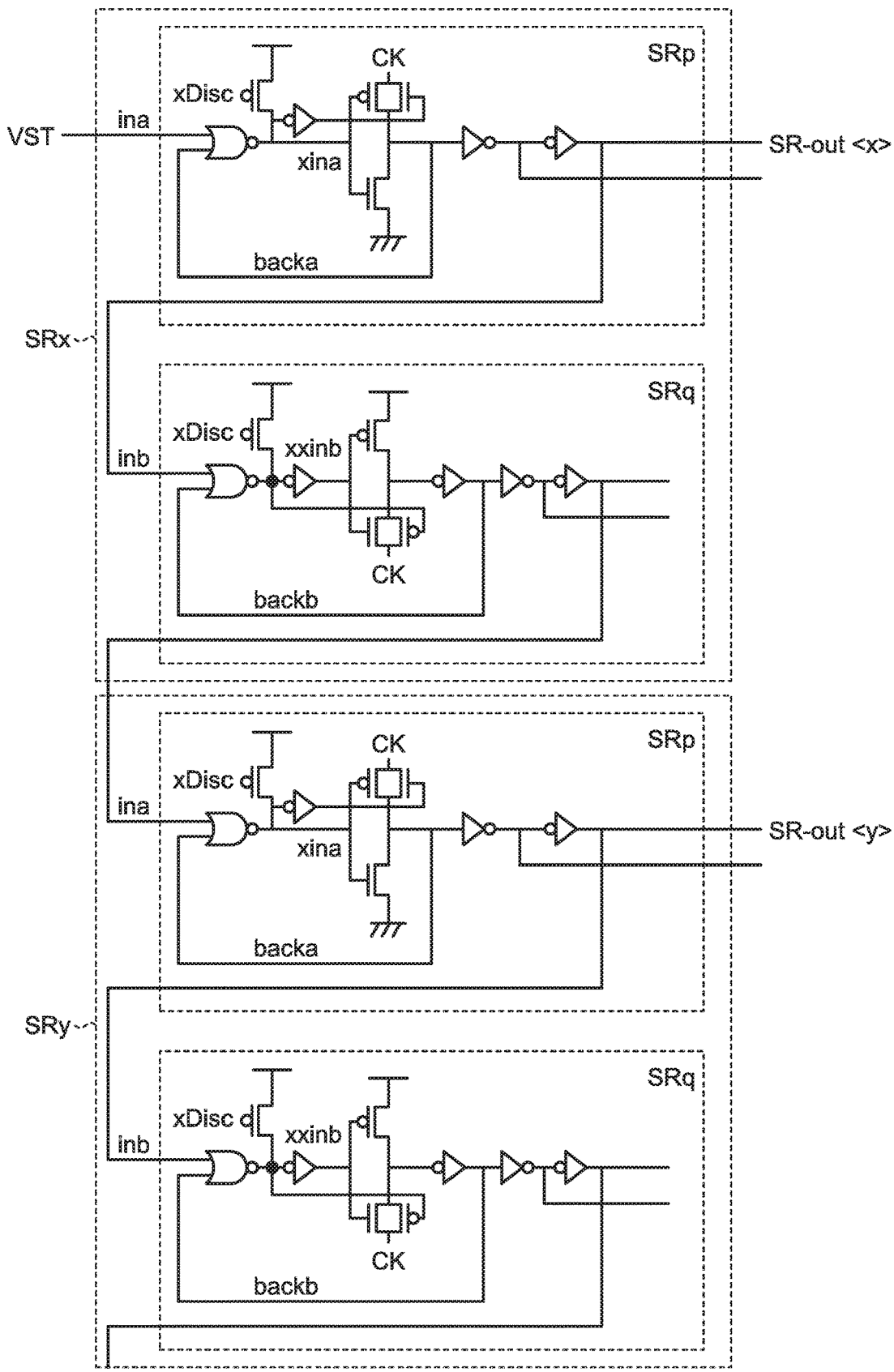
FIG. 18 is a diagram illustrating an example of a specific circuit configuration of two shift signal output circuits coupled with each other.
Figure 19:
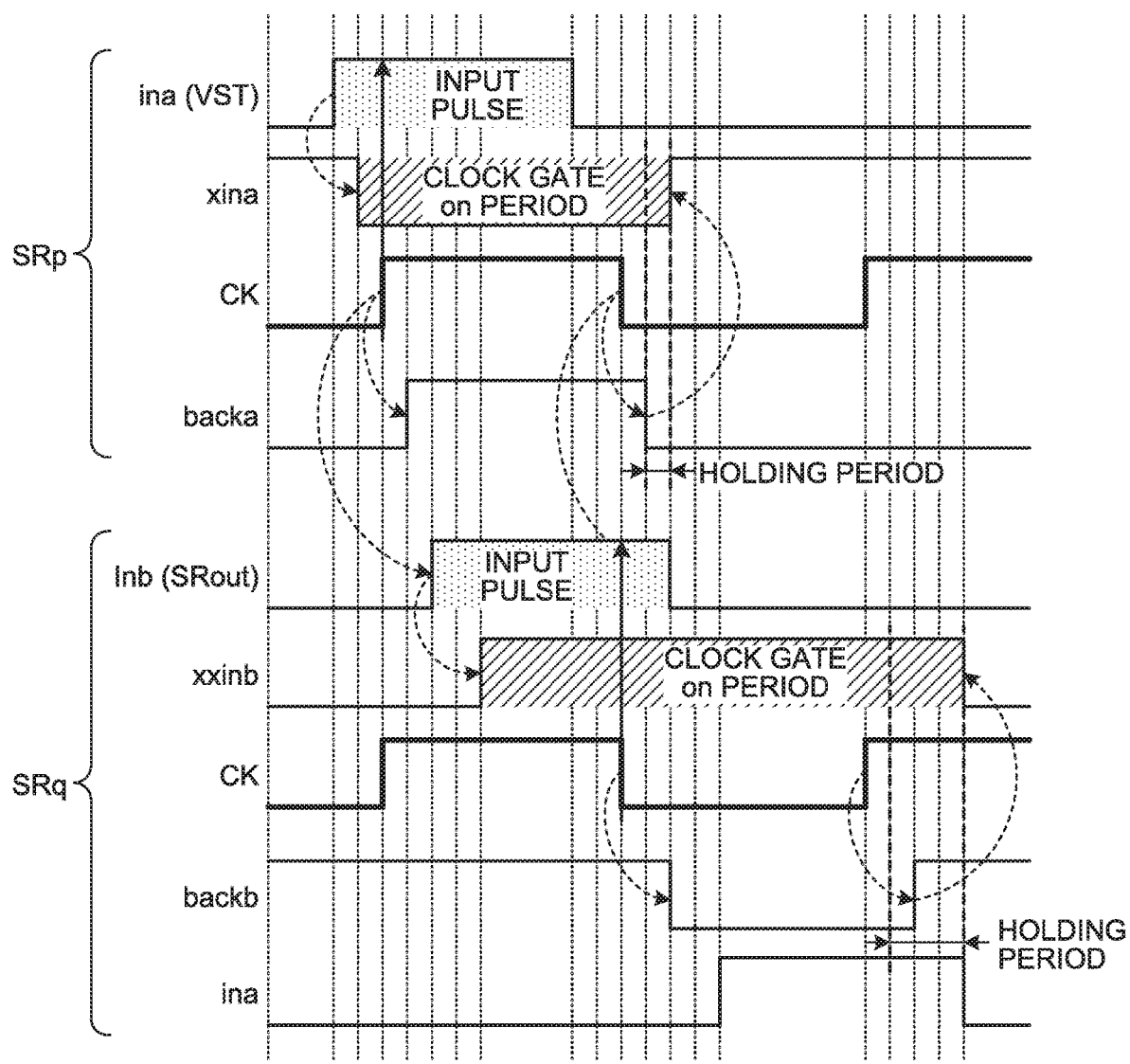
FIG. 19 is a timing chart illustrating a time-series relation between various signals related to an operation of the shift signal output circuit illustrated in FIG. 18.

FIG. 17 is a schematic configuration diagram of two shift signal output circuits SR coupled with each other. FIG. 18 is a diagram illustrating an example of a specific circuit configuration of two shift signal output circuits SR coupled with each other. FIG. 19 is a timing chart illustrating a time-series relation between various signals related to the operation of the shift signal output circuit SR illustrated in FIG. 18. As illustrated in FIG. 17 for example, the shift signal output circuit SR includes an AND circuit, an output logic circuit SRp, and a relay logic circuit SRq. The output logic circuit SRp is a circuit an output line of which is coupled to one of two input ends of the AND circuit. The relay logic circuit SRq is a circuit that receives a branch output from the output line of the output logic circuit SRp as an input (inb), and shifts an output timing with respect to an input timing of the input. Hereinafter, when a signal output timing is shifted by the shift signal output circuit SR, a circuit in which an output is performed earlier may be assumed to be an upstream circuit, and a circuit in which an output is performed later may be assumed to be a downstream circuit. In FIG. 17, of the two shift signal output circuits SR coupled with each other, the shift signal output circuit SR on the upstream side is denoted by the reference sign SRx, and the shift signal output circuit SR on the downstream side is denoted by the reference sign SRy.

In performing touch detection, a signal TX is input to the AND circuit via a signal line coupled to the other one of the two input ends of the AND circuit. The signal TX is output, for example, by the DDIC 80 described later. However, the configuration of outputting the signal TX is optional, and can be appropriately modified.

When a start signal (VST illustrated in FIG. 18) is input to the output logic circuit SRp included in the shift signal output circuit SRx on the most upstream side at a timing when touch detection is started, the output logic circuit SRp generates a line output (SR-out) at a timing when a first delay period has elapsed from the timing when the start signal is input. The line output (SR-out) also functions as an operation start signal (inb) that causes an operation of the relay logic circuit SRq to be started.

When the operation start signal (inb) is input, the relay logic circuit SRq generates an output (ina) at a timing when a second delay period has elapsed from the timing when the operation start signal (inb) is input. The output (ina) functions as a trigger signal that starts an operation of the output logic circuit SRp of the shift signal output circuit SRy arranged on the downstream side. In the present embodiment, the first delay period and the second delay period are different periods, and the second delay period is longer than the first delay period. However, these delay periods are merely specific examples of delay periods set for shifting the signal output timing of the shift signal output circuit SR, and can be appropriately modified.

More specifically, the start signal (VST) is input to one of two input ends of a NOR circuit of the output logic circuit SRp, and shifted from a low state to a high state as an input pulse to cause an output (xina) from the NOR circuit to be shifted from a high state to a low state. The output (xina) from the NOR circuit in a low state opens an input gate switch of a clock signal (CK) of the output logic circuit SRp, and causes the clock signal (CK) to be started to be input to the output logic circuit SRp. The clock signal (CK) input to the output logic circuit SRp becomes a line output (SR-out<x>) through timing adjustment using a relay circuit such as a NOT circuit. The clock signal (CK) is input to the other one of the two input ends of the NOR circuit as a feedback signal (backa) to the NOR circuit. After a period in which the input pulse of the start signal (VST) is high is ended and the input pulse becomes low, the feedback signal (backa) causes the output (xina) from the NOR circuit to be continued for a holding period. The line output (SR-out<x>) branches off to one of the two input ends of the NOR circuit of the relay logic circuit SRq as the operation start signal (inb) of the relay logic circuit SRq. When the input of the NOR circuit is shifted from a low state to a high state in accordance with the input pulse of the operation start signal (inb), an output (xxinb) from the NOR circuit is shifted from a high state to a low state. The output (xxinb) from the NOR circuit in a low state opens the input gate switch of the clock signal (CK) of the relay logic circuit SRq, and causes the clock signal (CK) to be started to be input to the relay logic circuit SRq. The clock signal (CK) input to the relay logic circuit SRq becomes the output (ina) of the relay logic circuit SRq through timing adjustment using a relay circuit such as the NOT circuit. The output (ina) functions as a trigger signal that starts the operation of the output logic circuit SRp included in the shift signal output circuit SRy on the downstream side. That is, the output (ina) functions in the same manner as the start signal (VST), causes the output logic circuit SRp included in the shift signal output circuit SRy on the downstream side to be operated, and generates a line output (SR-out<y>) in accordance with a period in which the input pulse is in a high state. Subsequently, a plurality of shift signal output circuits SR coupled to each other operate while shifting the operation timing with the same mechanism.

The start signal (VST) is any of a start signal (ST) of a first system and a start signal (ST_FP) of a second system described later. The relay logic circuit SRq includes a larger number of relay circuits than that of the output logic circuit SRp, so that the holding period thereof is longer. In this way, the shift signal output circuit SR can adjust the output timing and the operation timing. The P channel of "xDisc" illustrated in FIG. 18 is turned ON only at the beginning to cause the output (xina) from the NOR circuit to be more stable in a period before the start signal (VST) is input. For the same purpose, a configuration of performing pull-up with high resistance may be provided in place of the P channel.

When the line output (SR-out) and the signal TX are input to the input side of the AND circuit, the shift signal output circuit SR generates an output from an output side of the AND circuit. In this way, in the present embodiment, whether there is an output from the shift signal output circuit SR corresponds to a high/low state of the output from the AND circuit, for example. Specifically, a case in which there is an output from the shift signal output circuit SR is a case in which the output of the AND circuit is in a high state. In the present embodiment, a case in which there is no output from the shift signal output circuit SR is a case in which the output of the AND circuit is in a low state. The signal TX is output as a pulse in accordance with a timing at which the line output (SR-out) is in a high state under control of the DDIC 80, for example. The shift signal output circuit SR generates an output in accordance with a timing at which both of the signal from the output line (SR-out) and the signal TX are input.

As illustrated in FIG. 15, the individual switching circuits 111, 112, 113, . . . coupled to the drive electrode COML1 not including the subdivided electrode SCOML are respectively coupled to shift signal output circuits (first shift signal output circuits) $SR_1$, $SR_2$, $SR_3$, . . . . As described above with reference to FIGS. 18 and 19, the output (ina) of the relay logic circuit included in the shift signal output circuit SRx on the upstream side functions as a trigger signal that causes the operation of the output logic circuit included in the shift signal output circuit SRy on the downstream side to be started. That is, the shift signal output circuit SRx on the upstream side of the two shift signal output circuits SR turns ON the first switch $SW_1$ and turns OFF the second switch $SW_2$ in the individual switching circuits 111 to 117 coupled thereto, and also outputs the trigger signal for causing the shift signal output circuit SRy on the downstream side to be operated at a later timing. Hereinafter, for convenience, "a state in which the first switch $SW_1$ is ON and the second switch $SW_2$ is OFF in the individual switching circuit (for example, the individual switching circuits 111 to 117)" may be referred to as an "operating state", and "a state in which the first switch $SW_1$ is OFF and the second switch $SW_2$ is ON in the individual switching circuit (for example, the individual switching circuits 111 to 117)" may be referred to as a "non-operating state".

Specifically, the shift signal output circuit $SR_1$ in the region A1 on the most upstream side in FIG. 15 operates assuming that the input of the start signal (ST) is a trigger signal for starting operation, and generates an output to cause the individual switching circuit 111 in the region A1 to be in the operating state. The period in which there is an output from the shift signal output circuit $SR_1$ corresponds to a pulse period of the start signal (ST) that functions as the start signal (VST) (refer to FIGS. 18 and 19). The shift signal output circuit $SR_2$ in the region A2 on the downstream side of the region A1 operates in accordance with the trigger signal from the shift signal output circuit $SR_1$, and generates an output at a later timing than the output timing of the shift signal output circuit $SR_1$ to cause the individual switching circuit 112 in the region A2 to be in the operating state. The shift signal output circuit $SR_3$ in the region A3 on the downstream side of the region A2 operates in accordance with the trigger signal from the shift signal output circuit $SR_2$, and generates an output at a later timing than the output timing of the shift signal output circuit $SR_2$ to cause the individual switching circuit 113 in the region A3 to be in the operating state. In this way, a timing at which the drive signal Vcom is transmitted from the driving potential line TSVCOM is sequentially shifted during a touch detection period. A period in which there is an output from each of the shift signal output circuit $SR_2$, the shift signal output circuit $SR_3$, . . . on the downstream side of the shift signal output circuit $SR_1$ corresponds to a pulse period of the output (ina) of the relay logic circuit SRq included in the shift signal output circuit SR on the upstream side. The pulse period of the output (ina) of the relay logic circuit SRq is shifted in accordance with the pulse period of the start signal (ST) for determining an operation start timing of the shift signal output circuit $SR_1$ on the most upstream side.

In a region (for example, the region A4) of COML2 including the subdivided electrode SCOML, as described above, a plurality of shift signal output circuits are arranged, the number of shift signal output circuits being obtained by adding 1 to the number of the subdivided electrodes SCOML. One of the shift signal output circuits, that is, the shift signal output circuit $SR_4$ is coupled to the shift signal output circuit in a region on the upstream side and a region on the downstream side in the same manner as the shift signal output circuit in the region of the COML1 not including the subdivided electrode SCOML (for example, the regions A1 to A3) except that OR circuits are arranged between the shift signal output circuit $SR_4$ and the individual switching circuit 114, the number of the OR circuits corresponding to the number of the subdivided electrodes SCOML. That is, the shift signal output circuit $SR_4$ operates in accordance with the trigger signal from the shift signal output circuit $SR_3$, and generates an output at a later timing than the output timing of the shift signal output circuit $SR_3$. In this case, there is the OR circuit between the shift signal output circuit $SR_4$ and the individual switching circuit 114, so that all the first switches $SW_1$ in the individual switching circuit 114 are turned ON and all the second switches $SW_2$ therein are turned OFF with an output only from the shift signal output circuit $SR_4$. That is, the individual switching circuit 114 in the region A4 is caused to be in the operating state with the output from the shift signal output circuit $SR_4$, and the drive signal Vcom is transmitted to all the subdivided electrodes SCOML included in the drive electrode COML2. When the drive signal Vcom is transmitted to all the subdivided electrodes SCOML, a state in which the drive signal Vcom is transmitted to an electrode in a region similar to that of the drive electrode COML1 is substantially obtained, so that the drive electrode COML2 functions as one of the drive electrodes COML in a similar manner to the drive electrode COML1, and can detect whether there is a touch operation. The shift signal output circuit arranged on the downstream side of the shift signal output circuit $SR_4$ also operates with a mechanism similar to that of the shift signal output circuits $SR_2$ and $SR_3$.

Among the shift signal output circuits in the region of the COML2 including the subdivided electrode SCOML, each of shift signal output circuits (second shift signal output circuits) $SR_a$, $SR_b$, $SR_c$, and $SR_d$ except the shift signal output circuit $SR_4$ is a circuit of an independent system that does not input and output the trigger signal from and to the shift signal output circuits in the regions (for example, the regions A1 to A3) of COML1 not including the subdivided electrode SCOML. The shift signal output circuits $SR_a$, $SR_b$, $SR_c$, and $SR_d$ are used for transmitting the drive signal Vcom to the subdivided electrode SCOML.

Specifically, the shift signal output circuits $SR_a$, $SR_b$, $SR_c$, and $SR_d$ in the region A4 in FIG. 15 are coupled to one another in this order from the upstream side toward the downstream side. Among these circuits, the shift signal output circuit $SR_a$ in a region on the most upstream side operates in accordance with the input of the start signal (ST_FP) as the trigger signal for starting operation, and generates an output. The output causes the first switch $SW_1$ arranged on the most upstream side in the region A4 to be turned ON via one OR circuit.

The shift signal output circuit $SR_b$ arranged on the downstream side of the shift signal output circuit $SR_a$ operates in accordance with the trigger signal from the shift signal output circuit $SR_a$, and generates an output at a later timing than the output timing of the shift signal output circuit $SR_a$ to cause the first switch $SW_1$ arranged at the second position from the upstream side in the region A4 to be turned ON. Subsequently, the shift signal output circuits $SR_c$ and $SR_d$ operate in this order with a similar mechanism.

In this way, in the present embodiment, the drive electrode COML1 to which the drive signal is transmitted is shifted one by one from one end toward the other end of an arrangement direction of the drive electrodes COML in the first mode. In the present embodiment, the subdivided electrode SCOML to which the drive signal Vcom is transmitted is shifted one by one from one end toward the other end of the arrangement direction of the subdivided electrodes SCOML in the second mode.

In the region A4, the drive signal Vcom is sequentially transmitted to the subdivided electrodes SCOML included in the drive electrode COML2 at timings when the first switches $SW_1$ are sequentially turned ON in accordance with the outputs from the shift signal output circuits $SR_a$, $SR_b$, $SR_c$, and $SR_d$. The second touch detector 60 coupled to the second touch detection electrode STDL outputs the second touch detection signal Vdet2 corresponding to capacitance between the second touch detection electrode STDL and the subdivided electrode SCOML to which the drive signal Vcom is transmitted. The second touch detector 60 performs touch detection (such as fingerprint detection) based on the second touch detection signal Vdet2. The touch detection using the subdivided electrode SCOML and the second touch detection electrode STDL illustrated in FIG. 15 is performed in this way. Hereinafter, the touch detection using the subdivided electrode SCOML and the second touch detection electrode STDL may be referred to as second touch detection.

As described above, the individual switching circuit (for example, the individual switching circuits 111 to 117) and the transmission switching circuit 110 including the individual switching circuit are configured to switch a transmission path of the drive signal between the driving potential line (for example, the driving potential line TSVCOM) and the drive electrode COML. The individual switching circuit 114 coupled to the drive electrode COML2 including a plurality of subdivided electrodes SCOML is configured to be switched between the first mode and the second mode. The first mode is a mode in which the drive signal Vcom is transmitted to the subdivided electrodes SCOML at a time to cause the subdivided electrodes SCOML to function as one drive electrode COML, and the second mode is a mode in which the drive signal Vcom is individually transmitted to the subdivided electrodes SCOML. In the first mode, the first touch detection can be performed. In the second mode, the second touch detection can be performed.

Figure 20:
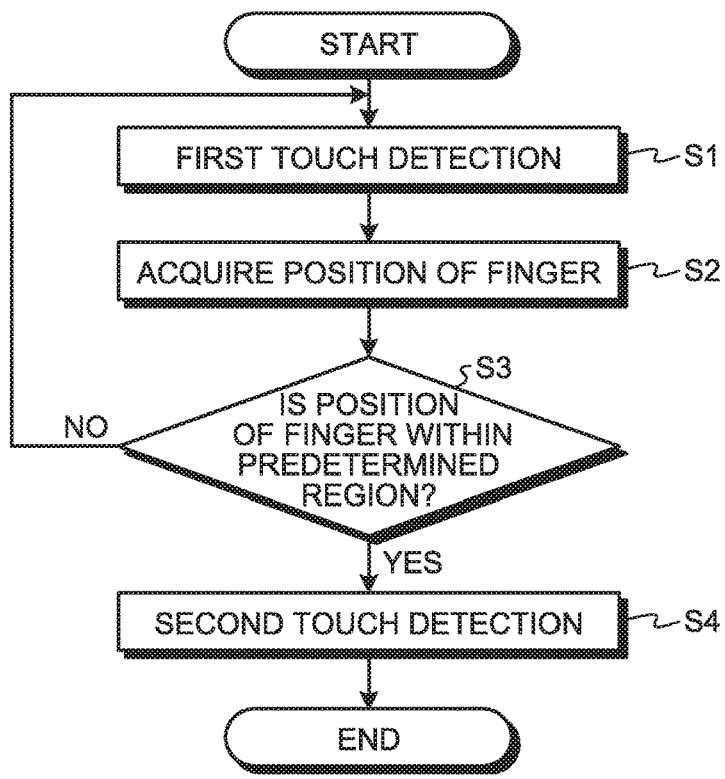
FIG. 20 is a flowchart illustrating an example of a procedure of switching between a first mode and a second mode to switch between first touch detection and second touch detection.

FIG. 20 is a flowchart illustrating an example of a procedure of switching between the first mode and the second mode to switch between the first touch detection and the second touch detection. For example, the DDIC 80 operates in the first mode, performs the first touch detection with the display apparatus 1 with a touch detection function (Step S1), and acquires information indicating a position of a finger with respect to a detection region (Step S2). If the position of the finger is within a predetermined region (Yes at Step S3), the DDIC 80 proceeds to the second mode, and performs the second touch detection with the display apparatus 1 with a touch detection function (Step S4) to obtain a fingerprint (refer to FIG. 9). The predetermined region means a region the position of which is covered in the Y-direction by the first touch detection electrode TDL closest to the second touch detection electrode STDL, that is, a touch detection region of the first touch detection electrode TDL closest to the second touch detection electrode STDL. In other words, at Step S3, whether the position of the finger specified at Step S2 in the Y-direction is within the predetermined region, that is, the touch detection region of the first touch detection electrode TDL closest to the second touch detection electrode STDL, but the predetermined region is not limited thereto and can be appropriately changed. Determination at Step S3 is performed by, for example, an external control device coupled to the display apparatus 1 with a touch detection function. Alternatively, a configuration included in the display apparatus 1 with a touch detection function such as the DDIC 80 may have a function of performing the determination. Unless the position of the finger is within the predetermined region (No at Step S3), the first touch detection may be continued (Step S1).

Figure 21:
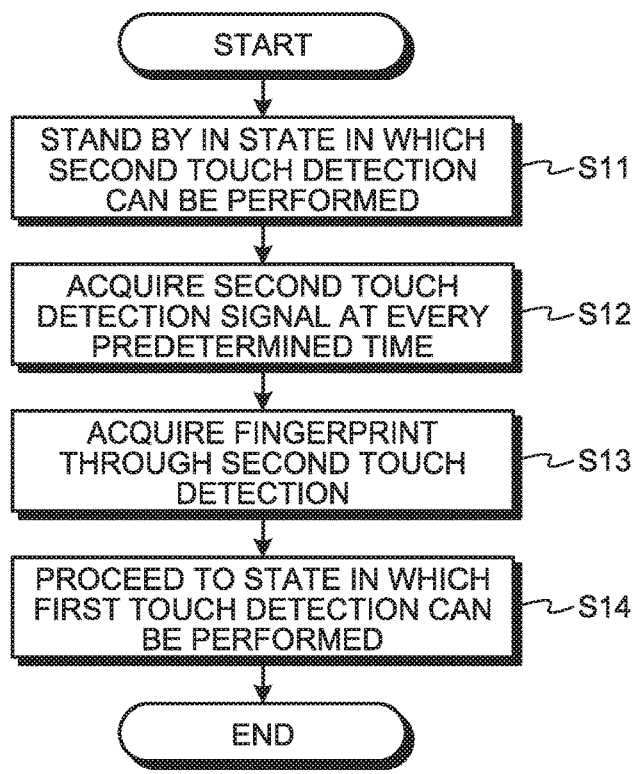
FIG. 21 is a flowchart illustrating another example of the procedure of switching between the first mode and the second mode to switch between the first touch detection and the second touch detection.

FIG. 21 is a flowchart illustrating another example of the procedure of switching between the first mode and the second mode to switch between the first touch detection and the second touch detection. The DDIC 80 causes the display apparatus 1 with a touch detection function to be in a stand-by state while keeping a state in which the second touch detection can be performed (Step S11). When a sweep operation of a finger is started on the second touch detection electrode STDL in this state, the second touch detection signal Vdet2 indicating proximity or contact of the finger is output from the second touch detection electrode STDL. When the second touch detection signal Vdet2 is acquired at every predetermined time (Step S12), roughness of the fingerprint indicated by a second touch detection result (for example, refer to FIG. 9) can be obtained (Step S13). Subsequently, the DDIC 80 causes the display apparatus 1 with a touch detection function to be in a state in which the first touch detection can be performed (Step S14).

Hereinafter, the system of the shift signal output circuits SR used for transmitting the drive signal Vcom to the corresponding drive electrodes COML arranged in units of regions A1, A2, A3, A4, . . . may be referred to as the first system, such as a system in which the shift signal output circuits $SR_1$, $SR_2$, $SR_3$, $SR_4$, . . . are coupled to one another. The system of the shift signal output circuits SR used for transmitting the drive signal Vcom to the corresponding subdivided electrodes SCOML may be referred to as the second system, such as a system in which the shift signal output circuits $SR_a$, $SR_b$, $SR_c$, and $SR_d$ are coupled to one another. The first system functions as a first shift register circuit in which a plurality of shift signal output circuits (for example, the shift signal output circuits $SR_1$, $SR_2$, $SR_3$, $SR_4$, . . . ) that generate signals for sequentially driving a plurality of drive electrodes COML are sequentially coupled to one another. The second system functions as a second shift register circuit in which a plurality of shift signal output circuits (for example, the shift signal output circuits $SR_a$, $SR_b$, $SR_c$, and $SR_d$) that generate signals for sequentially driving a plurality of subdivided electrodes SCOML are sequentially coupled to one another. The transmission switching circuit 110 according to the present embodiment functions as a selection circuit that supplies the signals of the first shift register circuit to a plurality of drive electrodes COML in the first mode in which the drive electrodes COML are sequentially driven, and supplies the signals of the second shift register circuit to a plurality of subdivided electrodes SCOML in the second mode in which the subdivided electrodes SCOML are sequentially driven.

As exemplified in FIG. 15, the individual switching circuit 114 in the region of the drive electrode COML2 is coupled to the shift signal output circuits $SR_4$, $SR_a$, $SR_b$, $SR_c$, and $SR_d$ via the OR circuits the number of which corresponds to the number of the subdivided electrodes SCOML. The output from one OR circuit causes one first switch $SW_1$ and one second switch $SW_2$ to operate for switching a coupling of one subdivided electrode SCOML with the driving potential line TSVCOM and the potential line TPL ON and OFF. To an input side of one OR circuit, one shift signal output circuit $SR_4$ coupled to the first system and one shift signal output circuit (any one of the shift signal output circuits $SR_a$, $SR_b$, $SR_c$, and $SR_d$) coupled to the second system are coupled. In the present embodiment, the drive electrode COML including the subdivided electrode SCOML is configured to be switched between a mode of collective driving of all the subdivided electrodes SCOML using the first system and a mode of individual driving of a plurality of subdivided electrodes SCOML using the second system through coupling via the OR circuit.

With the configuration described above, the touch panel 30 of the display apparatus 1 with a touch detection function is configured to properly perform the first touch detection and the second touch detection by properly using the start signal. Specifically, to perform the first touch detection, that is, to perform touch detection on a drive electrode COML basis, the start signal (ST) is input to the most upstream side of the first system. On the other hand, to perform the second touch detection, that is, to perform touch detection using the subdivided electrodes SCOML and the second touch detection electrode STDL like fingerprint detection, the start signal (ST_FP) is input to the most upstream side of the second system. For example, the DDIC 80 outputs the start signal related to such touch detection to be performed. The drive electrode driver 14 in the present embodiment is provided as a configuration of outputting the drive signal Vcom to the drive electrode COML by causing the driving potential line TSVCOM and the drive electrode COML to be in a coupled state through the operations of the shift signal output circuit SR and the transmission switching circuit 110 under control of the DDIC 80.

Specifically, as illustrated in FIG. 10 for example, a flexible printed circuit (FPC) 70 is coupled to the pixel substrate 2. The first touch detector 40, the second touch detector 60, and the DDIC 80 are formed on the FPC 70. Functions related to the controller 11, the gate driver 12, and the source driver 13 are implemented in the DDIC 80, for example. An external signal (such as the video signal Vdisp or a fingerprint detection implementation signal Vtouch) is transmitted to the DDIC 80 via the FPC 70. The fingerprint detection implementation signal Vtouch is input from the outside when a signal as a trigger related to implementation of the second touch detection through the operation in the second mode is obtained, for example. As a specific example, when the DDIC 80 transmits the first touch detection signal Vdet1 to an external device to which the display apparatus 1 with a touch detection function is coupled, the determination at Step S3 and the like described above are performed based on the touch detection result indicated by the first touch detection signal Vdet1, and the external device outputs the fingerprint detection implementation signal Vtouch to the display apparatus 1 with a touch detection function in accordance with the determination result. Accordingly, the second touch detection is performed.

In the present embodiment, the DDIC 80 performs various control operations related to touch detection. Specifically, the DDIC 80 outputs the start signal (ST) in performing the first touch detection to cause the first touch detector 40 to be operated. The first touch detection is performed alternately with update of display output content, for example. The DDIC 80 outputs the start signal (ST_FP) in performing the second touch detection to cause the second touch detector 60 to be operated. The second touch detection is performed in accordance with the fingerprint detection implementation signal Vtouch, for example.

In the present embodiment, as illustrated in FIG. 10 for example, the first touch detector 40, the second touch detector 60, and the DDIC 80 are arranged on the FPC 70 using what is called a chip on flexible (COF) method. However, this is merely a specific arrangement example of various integrated circuits included in the display apparatus 1 with a touch detection function, and the embodiment is not limited thereto and can be appropriately modified.

The display apparatus 1 with a touch detection function according to the present embodiment includes a selector switch circuit 150. The selector switch circuit 150 switches an electrical coupling of the FPC 70 with the pixel substrate 2 ON and OFF. Specifically, for example, the selector switch circuit 150 includes a switch between wiring on the pixel substrate 2 and wiring included in the FPC 70. The selector switch circuit 150 operates to switch between coupling (ON) and decoupling (OFF) between the pixel substrate 2 and the FPC 70 in accordance with an ON and OFF operation of the switch. The selector switch circuit 150 performs ON and OFF operation according to a signal for switching output from the DDIC 80, for example, but this is merely an example of operation control of the selector switch circuit 150. The embodiment is not limited thereto, and can be appropriately modified.

The number of the subdivided electrodes SCOML included in the drive electrode COML2 illustrated in FIG. 15 is four. However, the number of the subdivided electrodes SCOML is not limited thereto. The FIG. 15 only illustrates an example for clarifying a relation between the individual switching circuit (especially, the individual switching circuit 114) and the shift signal output circuit SR coupled to the individual switching circuit in the region in which the first system and the second system are mixedly arranged, and an actual number of the subdivided electrodes SCOML is not limited thereto. The number of the drive electrodes COML1, the number of the drive electrodes COML2, and the total number of the drive electrodes COML illustrated in FIGS. 10 and 14, for example, are also schematic examples, and actual numbers of the components are not limited thereto.

As described above, according to the present embodiment, the drive electrode COML2 is provided in the detection region of the first touch detection performed in the first mode, and includes a plurality of subdivided electrodes SCOML that can be driven in the second mode. That is, the subdivided electrodes SCOML used for the second touch detection can be used as the drive electrodes COML used for the first touch detection. The first touch detection is performed for specifying a position of a human finger in the detection region, for example. The second touch detection is performed for fingerprint detection and the like with higher resolution than that of the first touch detection. Accordingly, the detection region with higher resolution used for fingerprint detection and the like can be also used as the detection region of the touch operation.

The unit to which the drive signal Vcom is transmitted (a unit of the drive electrode COML or a unit of the subdivided electrode SCOML) is shifted one by one from one end toward the other end of the arrangement direction of the drive electrode COML, so that the detection region can be scanned by performing simpler control.

The following describes a modification and other embodiments of the present embodiment. In the following description, individual switching circuits in regions n−1, n, and n+1 may be denoted by the reference numerals $11_{n-1}$, $11_n$, and $11_{n+1}$, respectively. The shift signal output circuits SR of the first system may be denoted by the reference numerals $SR_1$, $SR_2$, $SR_3$, $SR_4$, $SR_5$, ..., $SR_{n-1}$, $SR_n$, $SR_{n+1}$, ..., $SR_{MAX-2}$, $SR_{MAX-1}$, and $SR_{MAX}$. The modification and the other embodiments have the same configuration as that of the first embodiment unless specifically described.

Modification

Figure 22:
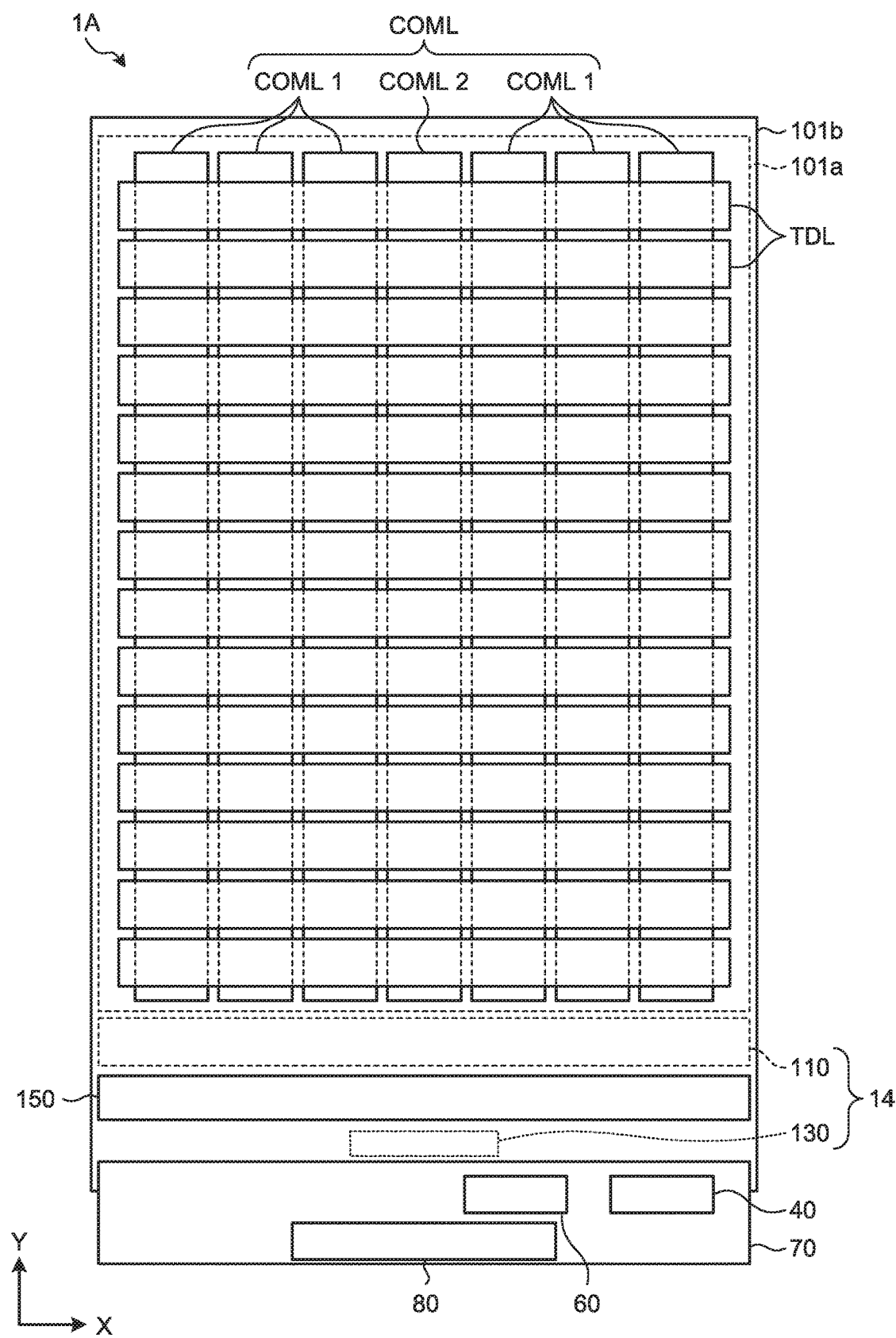
FIG. 22 is a plan view schematically illustrating a configuration especially related to touch detection in a display apparatus with a touch detection function according to a modification of the present invention.
Figure 23:
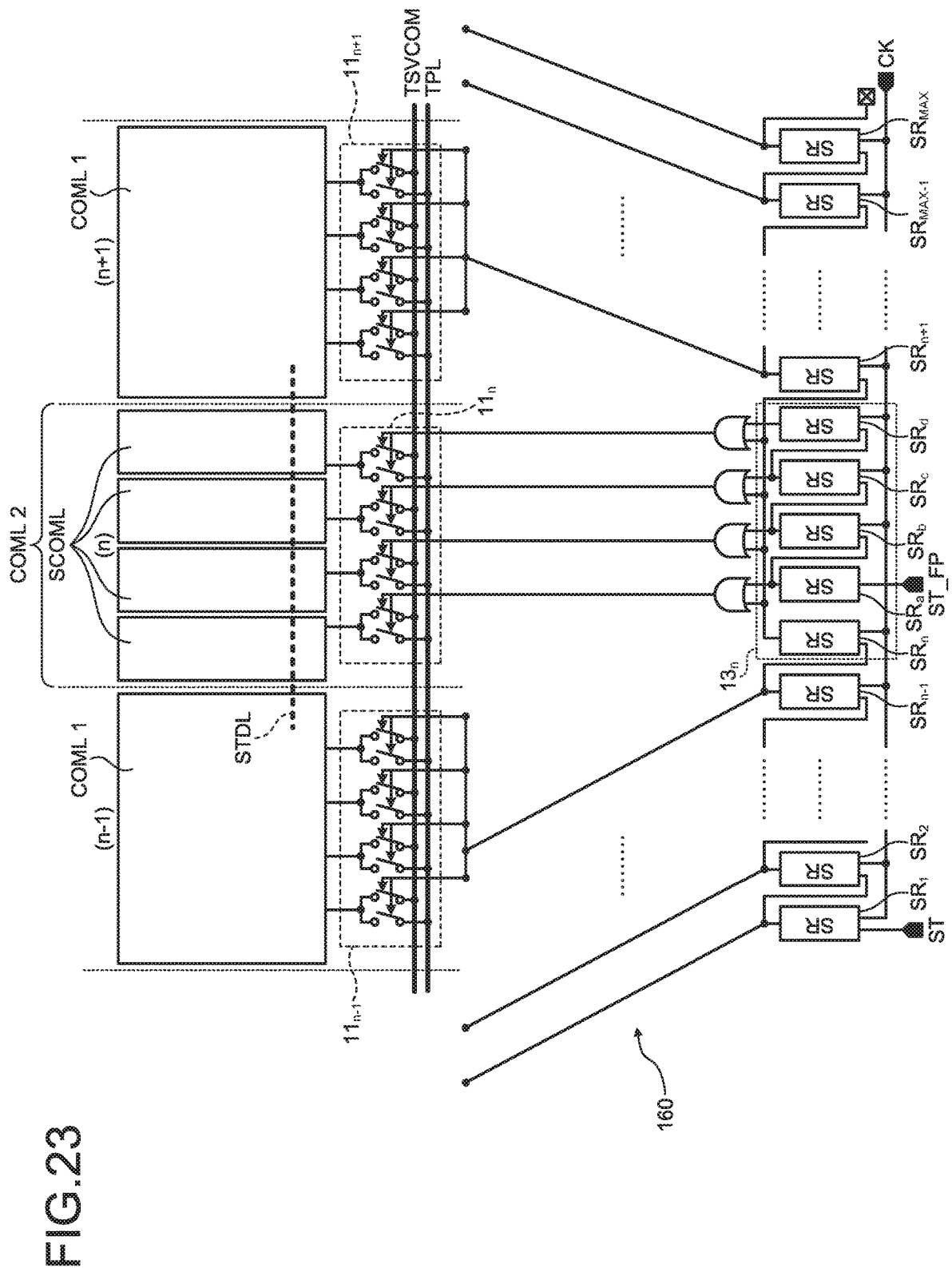
FIG. 23 is a schematic diagram illustrating an example of a coupling relation between the drive electrode, the transmission switching circuit, and the shift drive circuit according to the modification.

FIG. 22 is a plan view schematically illustrating a configuration especially related to touch detection in a display apparatus 1A with a touch detection function according to the modification. FIG. 23 is a schematic diagram illustrating an example of a coupling relation between the drive electrode COML, the transmission switching circuit 110, and the shift drive circuit 130 according to the modification. In the first embodiment, as illustrated in FIG. 10, the shift drive circuit 130 is arranged between the transmission switching circuit 110 and the selector switch circuit 150, but this is merely a specific arrangement example of the shift drive circuit 130. The embodiment is not limited thereto, and can be appropriately modified. For example, as illustrated in FIG. 22, the transmission switching circuit 110, the selector switch circuit 150, and the shift drive circuit 130 may be arranged in this order from the display region 101a side toward the FPC 70. In this case, as illustrated in FIG. 23 for example, the shift signal output circuits of the shift drive circuit 130 are coupled to individual switching circuits $11_{n-1}$, $11_n$, and $11_{n+1}$ of the transmission switching circuit 110 via pieces of relay wiring 160 that are individually arranged. An electrical coupling relation between the shift signal output circuits $SR_{n-1}$, $SR_n$, and $SR_{n+1}$ of the shift drive circuit 130 and the individual switching circuits $11_{n-1}$, $11_n$, and $11_{n+1}$ of the transmission switching circuit 110 according to the modification is the same as that in the first embodiment. The configuration according to the modification is the same as that in the first embodiment except that the arrangement of the selector switch circuit 150 and the shift drive circuit 130 is changed.

Second Embodiment

Figure 24:
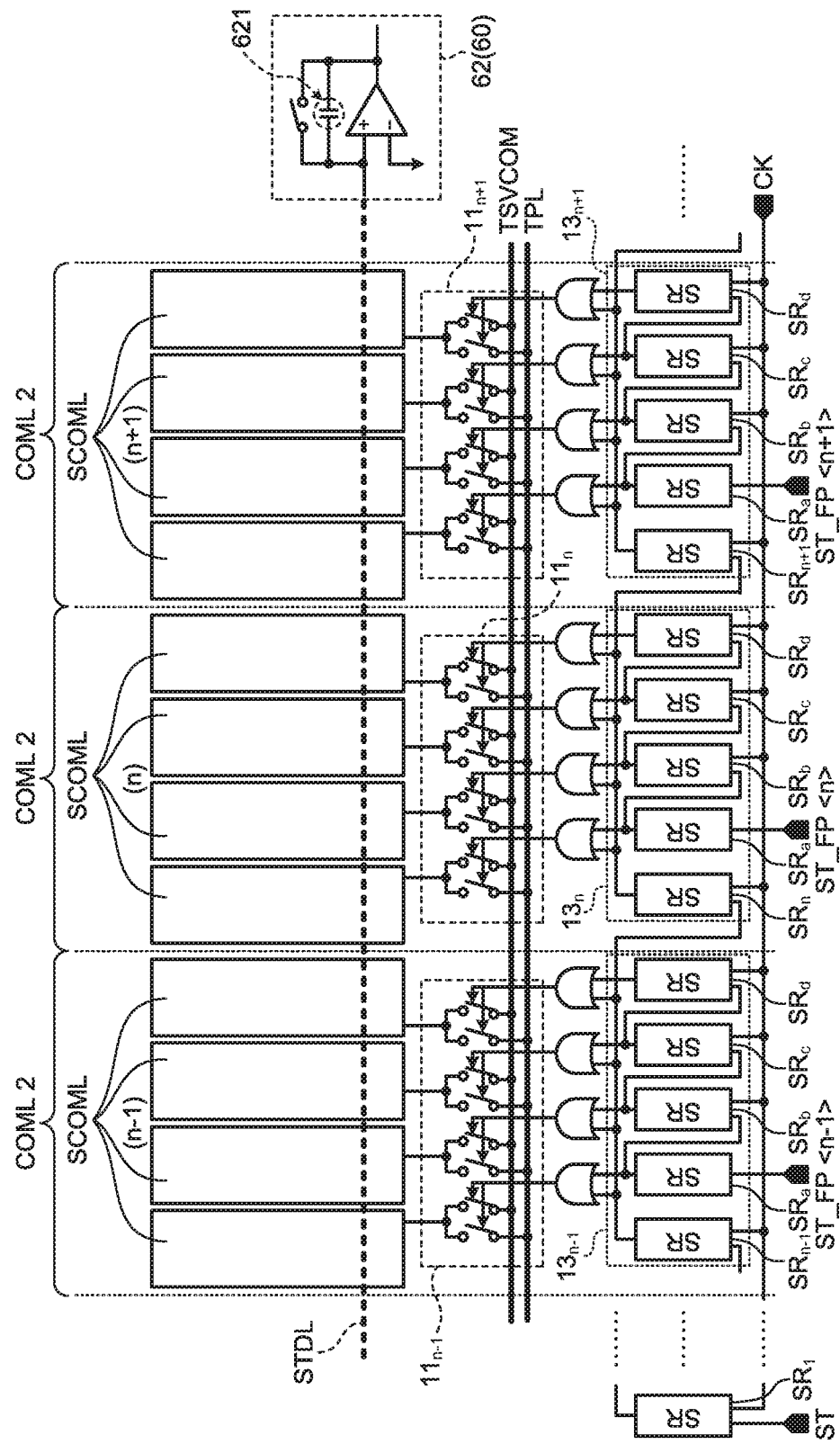
FIG. 24 is a schematic diagram illustrating an example of a coupling relation between a drive electrode, a transmission switching circuit, and a shift drive circuit according to a second embodiment.

As an embodiment different from the first embodiment, the following describes the embodiment (second embodiment) in which a plurality of drive electrodes COML (drive electrodes COML2) each include a plurality of subdivided electrodes SCOML. FIG. 24 is a schematic diagram illustrating an example of the coupling relation between the drive electrode COML, the transmission switching circuit 110, and the shift drive circuit 130 according to the second embodiment. As illustrated in FIG. 24, each of the drive electrodes COML (drive electrodes COML2) may have a plurality of subdivided electrodes SCOML.

A relation between the subdivided electrodes SCOML included in one drive electrode COML2 in one region, the individual switching circuit $11_n$ coupled to the subdivided electrodes SCOML, and the shift signal output circuits $SR_n$, $SR_a$, $SR_b$, $SR_c$, and $SR_d$ coupled to the individual switching circuit $11_n$ in the second embodiment is the same as that in the first embodiment. That is, the individual switching circuit $11_n$ coupled to the drive electrode COML2 is coupled to the first system and the second system via the OR circuits the number of which corresponds to the number of the subdivided electrodes SCOML.

Each of the drive electrodes COML2 is driven based on an individual start signal in the second touch detection. That is, the second system individually provided for each of the drive electrodes COML2 includes an input terminal for an individual start signal. In FIG. 24, for example, start signals corresponding to the regions n−1, n, and n+1 are denoted by the reference numerals ST_FP<n−1>, ST_FP<n>, and ST_FP<n+1>, respectively.

FIG. 24 exemplifies a case in which the drive electrodes COML2 are arranged in three regions n−1, n, and n+1. However, this is merely an example schematically illustrating the embodiment in which each of a plurality of drive electrodes COML2 includes a plurality of subdivided electrodes SCOML, and the embodiment is not limited thereto. The number of the drive electrodes COML2 each including a plurality of subdivided electrodes SCOML may be two, or four or more. All of the drive electrodes COML included in the display apparatus with a touch detection function may be the drive electrodes COML2 each including a plurality of subdivided electrodes SCOML. In this case, the second touch detection electrode STDL is arranged to cover all of the drive electrodes COML. Such a second touch detection electrode STDL can also be used for the first touch detection. That is, the second touch detection electrode STDL arranged to cover all of the drive electrodes COML may be used as one of the first touch detection electrodes TDL.

When the second touch detection electrode STDL is used as one of the first touch detection electrodes TDL, the second touch detector 60 is configured to be used for both of the first touch detection and the second touch detection. Specifically, for example, the amplifier 62 includes a configuration of an integrating circuit (voltage detector DET), and the configuration of an integrating circuit includes a capacitor 621. With this configuration, the capacitance (standard capacitance) held by the capacitor 621 is properly used as capacitance for the first touch detection and capacitance for the second touch detection. Accordingly, the second touch detector 60 can be used for both of the first touch detection and the second touch detection. More specifically, the second touch detector 60 in this case has a configuration in which a capacitor for the first touch detection and a capacitor for the second touch detection are separately arranged, for example. In the first touch detection, the voltage detector DET to which the capacitor for the first touch detection is coupled operates. In the second touch detection, the voltage detector DET to which the capacitor for the second touch detection is coupled operates.

As described above, according to the second embodiment, each of a plurality of drive electrodes COML2 includes a plurality of subdivided electrodes SCOML, so that the region in which the second touch detection can be performed can be easily widened.

Third Embodiment

Figure 25:
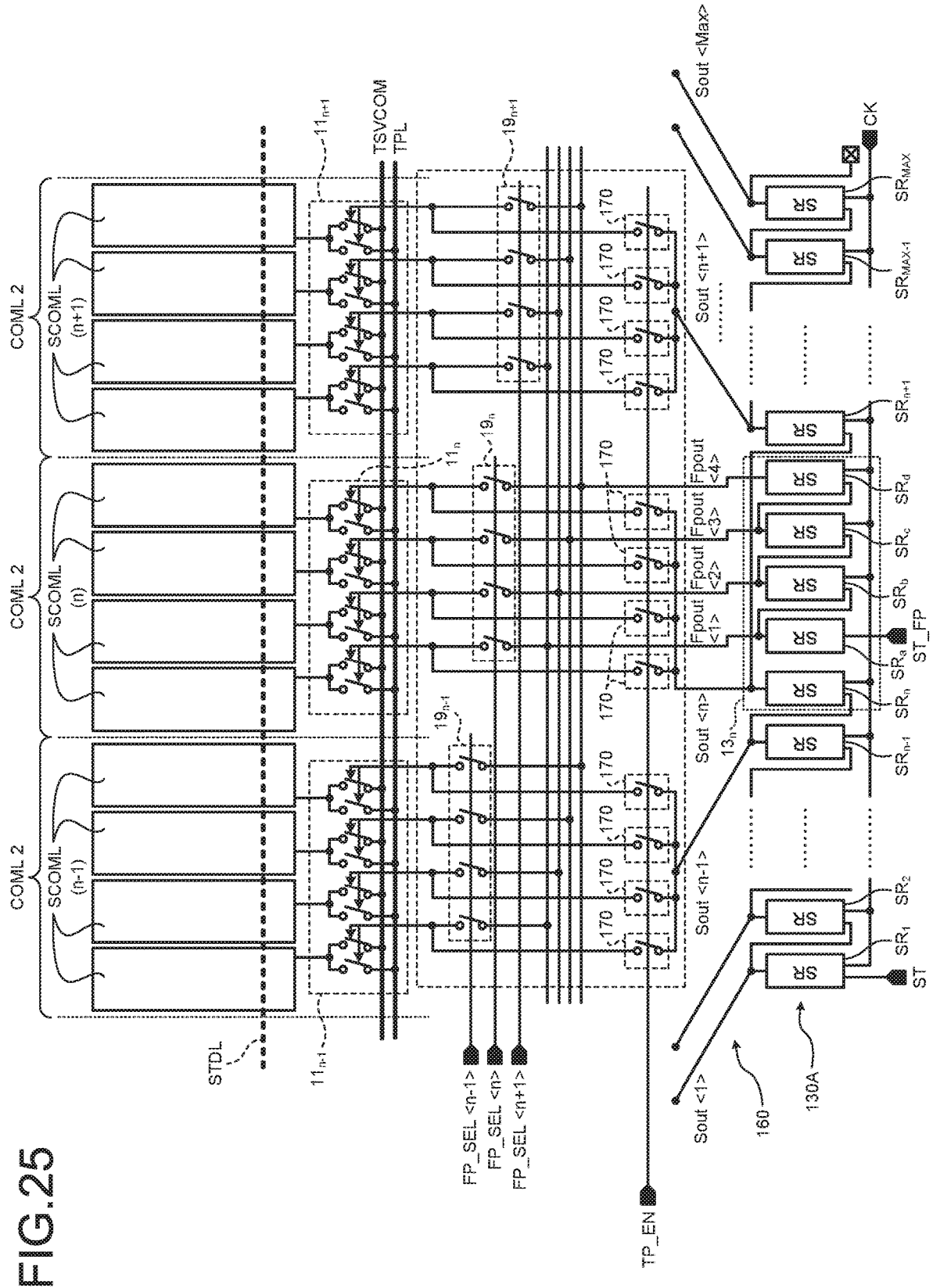
FIG. 25 is a schematic diagram illustrating an example of a coupling relation between a drive electrode, a transmission switching circuit, and a shift drive circuit according to a third embodiment.

FIG. 25 is a schematic diagram illustrating an example of a coupling relation between the drive electrode COML, the transmission switching circuit 110, and the shift drive circuit (for example, a shift drive circuit 130A) according to a third embodiment. A plurality of drive electrodes COML2 each including a plurality of subdivided electrodes SCOML may share one second system. Specifically, as illustrated in FIG. 25 for example, each of the drive electrodes COML2 may be configured to be individually coupled to a corresponding one of the shift signal output circuits SR (any one of the shift signal output circuits $SR_{n-1}$, $SR_n$, and $SR_{n+1}$) of the first system each of which is individually provided. Also, each of the drive electrodes COML2 may be configured to be coupled to the shift signal output circuits SR (the shift signal output circuits $SR_a$, $SR_b$, $SR_c$, and $SR_d$) that are provided as one second system. In the third embodiment, the drive electrodes COML2 sharing the second system each have the same number of the subdivided electrodes SCOML.

Specifically, the drive electrodes COML2 according to the third embodiment are coupled to the shift signal output circuits $SR_{n-1}$, $SR_n$, and $SR_{n+1}$ of the first system via first selectors 170. Each of the shift signal output circuits $SR_{n-1}$, $SR_n$, and $SR_{n+1}$ is individually provided for a corresponding one of the drive electrodes COML2. The first selectors 170 switches between coupling and decoupling of output lines (Sout<n−1>, Sout<n>, and Sout<n+1>) of the shift signal output circuits $SR_{n-1}$, $SR_n$, and $SR_{n+1}$ of the first system with and from the individual switching circuits $11_{n-1}$, $11_n$, and $11_{n+1}$ depending on whether a first selector operation signal (TP_EN) is output in the first touch detection.

Figure 26:
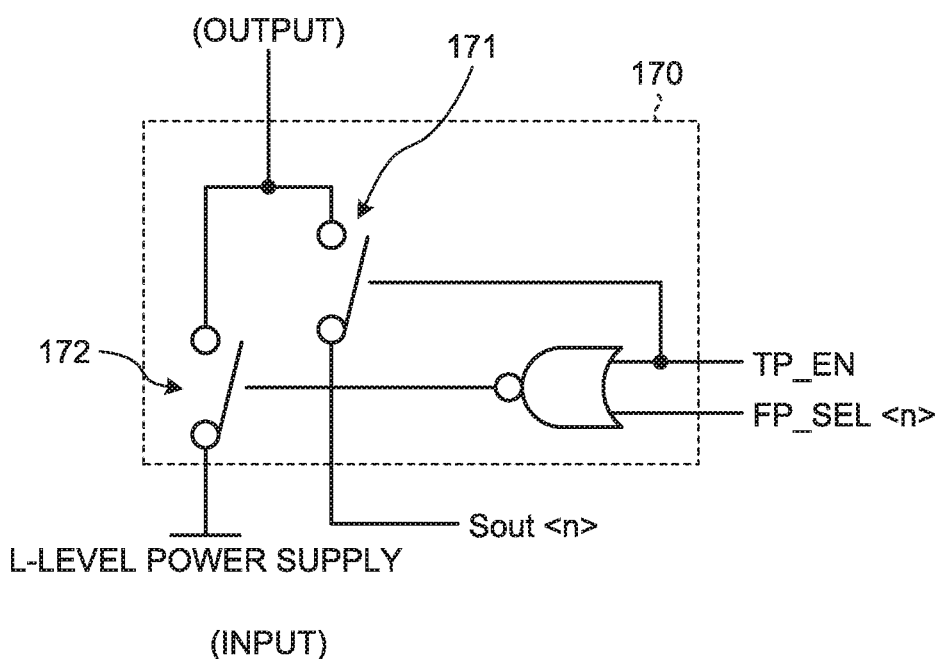
FIG. 26 is a diagram illustrating a specific configuration example of a first selector.

FIG. 26 is a diagram illustrating a specific configuration example of the first selector 170. FIG. 26 exemplifies a configuration of the first selector 170 of a region n. The first selector 170 of another region has substantially the same configuration. However, <n> indicates that the signal is related to the region n. When the configuration of the first selector 170 corresponding to the region n+1 or n−1 is exemplified, the signal to which <n> is added in FIG. 26 is replaced with a signal to which<n−1> or <n+1> is added. For example, as illustrated in FIG. 26, the first selector 170 in the region n includes one output system coupled to the individual switching circuit $11_n$ and two input systems coupled to the output line (Sout<n>) of the shift signal output circuit $SR_n$ of the first system and a low-level power supply.

In one of the two input systems included in the first selector 170 to which the output line (Sout<n>) of the shift signal output circuit $SR_n$ of the first system is coupled, a third switch 171 is arranged for switching between coupling and decoupling between the input system and the output system. The third switch 171 couples the input system with the output system in accordance with the first selector operation signal (TP_EN). Specifically, the third switch 171 causes the input system and the output system to be in a coupled state (ON) when the first selector operation signal (TP_EN) is in a high state, for example, and causes the input system and the output system to be in a decoupled state (OFF) when the first selector operation signal (TP_EN) is in a low state.

In the other of the two input systems included in the first selector 170 to which the low-level power supply is coupled, a fourth switch 172 is arranged for switching between coupling and decoupling between the input system and the output system. The fourth switch 172 is coupled to wiring for transmitting the first selector operation signal (TP_EN) and wiring for transmitting a second selector operation signal (FP_SEL<n>) via the NOR circuit, for example. The second selector operation signal (FP_SEL<n>) is a signal output in the second touch detection. That is, the fourth switch 172 causes the input system and the output system to be in a decoupled state (OFF) when any one of the first selector operation signal (TP_EN) and the second selector operation signal (FP_SEL<n>) is in a high state, and causes the input system and the output system to be in a coupled state (ON) when both of the first selector operation signal (TP_EN) and the second selector operation signal (FP_SEL<n>) are in a low state.

In the third embodiment, the second selector operation signal (FP_SEL<n>) is in a low state in the first touch detection. In this state, when the first selector operation signal (TP_EN) is caused to be in a high state, the shift signal output circuit $SR_n$ of the first system is coupled to the individual switching circuit $11_n$. Accordingly, in the first touch detection, one shift signal output circuit $SR_n$ included in the first system is coupled to one individual switching circuit $11_n$ that is coupled to the drive electrode COML2 in one region. That is, all the subdivided electrodes SCOML included in one drive electrode COML2 are enabled to be collectively driven.

In FIG. 25, the number of arranged first selectors 170 corresponds to the number of the subdivided electrodes SCOML. However, this is merely an arrangement example of the first selector 170, and the embodiment is not limited thereto. For example, one first selector 170 may be arranged on the relay wiring 160.

A display apparatus 1B with a touch detection function according to the third embodiment (refer to FIG. 28) includes a plurality of second selectors $19_{n-1}$, $19_n$, and $19_{n+1}$. Each of the second selectors $19_{n-1}$, $19_n$, and $19_{n+1}$ is individually provided for a corresponding one of the drive electrodes COML2 and operates with an individual signal. Specifically, as illustrated in FIG. 25 for example, the display apparatus 1B with a touch detection function according to the third embodiment includes the second selector $19_{n-1}$ that switches between coupling and decoupling of the individual switching circuit $11_{n-1}$ coupled to the drive electrode COML2 in the region n−1 with and from the shift signal output circuits $SR_a$, $SR_b$, $SR_c$, and $SR_d$ of the second system. The display apparatus 1B with a touch detection function according to the third embodiment also includes the second selector $19_n$ that switches between coupling and decoupling between the individual switching circuit $11_n$ coupled to the drive electrode COML2 in the region n with and from the shift signal output circuits $SR_a$, $SR_b$, $SR_c$, and $SR_d$ of the second system. The display apparatus 1B with a touch detection function according to the third embodiment also includes the second selector $19_{n+1}$ that switches between coupling and decoupling of the individual switching circuit $11_{n+1}$ coupled to the drive electrode COML2 in the region n+1 with and from the shift signal output circuits $SR_a$, $SR_b$, $SR_c$, and $SR_d$ of the second system.

Each of the second selectors $19_{n-1}$, $19_n$, and $19_{n+1}$ switches between a coupled state and a decoupled state depending on whether there is an individual signal (for example, FP_SEL<n−1>, FP_SEL<n>, and FP_SEL<n+1>) output in the second touch detection. Specifically, for example, the second selector $19_{n-1}$ causes the individual switching circuit $11_{n-1}$ coupled to the drive electrode COML2 in the region n−1 and the shift signal output circuits $SR_a$, $SR_b$, $SR_c$, and $SR_d$ of the second system to be in a coupled state (ON) when FP_SEL<n−1> is in a high state, and causes the individual switching circuit $11_n$ coupled to the drive electrode COML2 in the region n−1 and the shift signal output circuits $SR_a$, $SR_b$, $SR_c$, and $SR_d$ of the second system to be in a decoupled state (OFF) when FP_SEL<n−1> is in a low state. A relation between the second selector $19_n$ and FP_SEL<n>, and a relation between the second selector $19_{n-1}$ and FP_SEL<n+1> are the same as the relation between the second selector $19_{n-1}$ and FP_SEL<n−1>.

Figure 27:
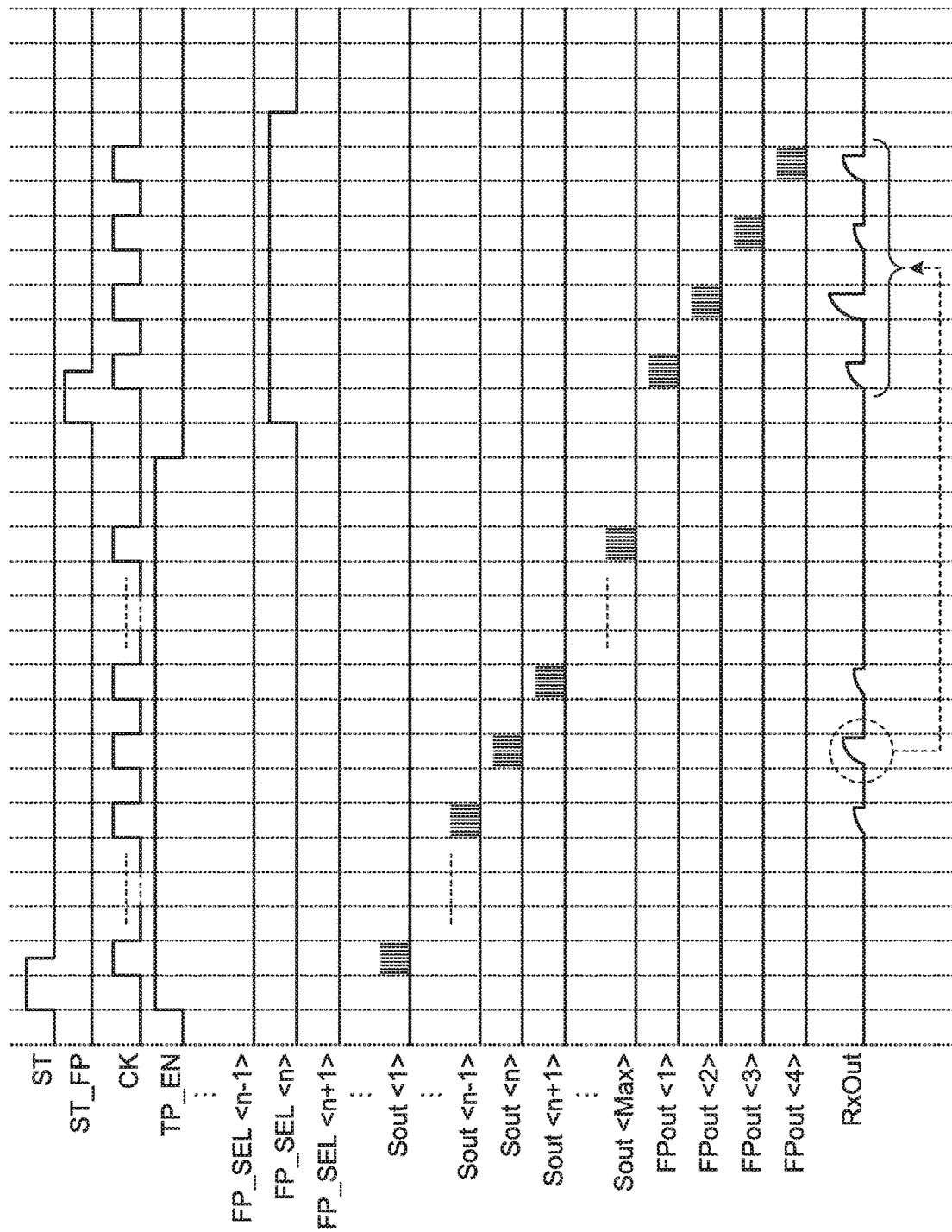
FIG. 27 is a timing chart illustrating an example of a relation between various signals that are output when touch detection according to the third embodiment is performed.

Respective timings at which FP_SEL<n−1>, FP_SEL<n>, and FP_SEL<n+1> are caused to be in a high state are different from each other (refer to FIG. 27). That is, two or more individual switching circuits are not coupled to the shift signal output circuits $SR_a$, $SR_b$, $SR_c$, and $SR_d$ of the second system at the same time. In this way, each of the second selectors $19_{n-1}$, $19_n$ and $19_{n+1}$ functions as a selection switching circuit that selectively transmits the drive signal Vcom to the subdivided electrode SCOML included in a corresponding one of the drive electrodes COML2 each including the subdivided electrodes SCOML.

In the third embodiment, output lines of the shift signal output circuits $SR_a$, $SR_b$, $SR_c$, and $SR_d$ of the second system are branched corresponding to the number of individual switching circuits to be coupled. For example, in FIG. 25 illustrating three drive electrodes COML2, the output lines of the shift signal output circuits $SR_a$, $SR_b$, $SR_c$, and $SR_d$ of the second system are branched into three parts. Branched ends of the output lines are coupled to different individual switching circuits $11_{n-1}$, $11_n$, and $11_{n+1}$ via different second selectors $19_{n-1}$, $19_n$, and $19_{n+1}$, respectively.

In the third embodiment, an upstream and downstream relation between the shift signal output circuits $SR_a$, $SR_b$, $SR_c$, and $SR_d$ of the second system corresponds to an upstream and downstream relation between the subdivided electrodes SCOML included in each of the drive electrodes COML2. Specifically, depending on whether there is an output from the shift signal output circuit $SR_a$ on the most upstream side in the second system, for example, states of the first switch $SW_1$ and the second switch $SW_2$ are changed, the first switch $SW_1$ and the second switch $SW_2$ being coupled to one subdivided electrode SCOML arranged on the most upstream side among the subdivided electrodes SCOML included in each of the drive electrodes COML2. The first switch $SW_1$ and the second switch $SW_2$ are coupled to the shift signal output circuit $SR_a$ via the second selector in a coupled state among the second selectors $19_{n-1}$, $19_n$ and $19_{n+1}$. The same applies to a relation between the shift signal output circuits $SR_b$, $SR_c$, and $SR_d$ that are the second and subsequent circuits from the upstream side included in the second system, and the subdivided electrodes SCOML that are the second and subsequent electrodes from the upstream side among the subdivided electrodes SCOML included in each of the drive electrodes COML2.

FIG. 27 is a timing chart illustrating an example of a relation between various signals that are output when touch detection according to the third embodiment is performed. FIG. 27 illustrates an example of a relation between various signals in a case in which the first touch detection is performed, and the second touch detection is performed using the drive electrode COML2 arranged at a position corresponding to a position of a human finger detected in the first touch detection.

Specifically, the first touch detection is started in response to the start signal (ST) for the first touch detection. During a period in which the first touch detection is performed, the first selector operation signal (TP_EN) is in a high state. When the first touch detection is ended, the first selector operation signal (TP_EN) is caused to be in a low state.

The transmission of the drive signal Vcom is performed on a drive electrode COML basis in accordance with a clock timing of the clock signal (CK). Specifically, after the start signal (ST) for the first touch detection is input, the shift signal output circuit $SR_1$ on the most upstream side among the shift signal output circuits SR included in the first system generates an output (Sout<1>), and thereafter, the shift signal output circuit $SR_2$ on the downstream side thereof sequentially generates an output at an individual timing. Such transition of output continues until when the shift signal output circuit $SR_{MAX}$ on the most downstream side generates an output (Sout<MAX>).

The second touch detection is started in response to the start signal (ST_FP) for the second touch detection. During a period in which the second touch detection is performed, the first selector operation signal (TP_EN) is in a low state.

The transmission of the drive signal Vcom is performed on a subdivided electrode SCOML basis in accordance with the clock timing of the clock signal (CK). Specifically, after the start signal (ST_FP) for the second touch detection is input, the shift signal output circuit $SR_a$ on the most upstream side among the shift signal output circuits $SR_a$, $SR_b$, $SR_c$, and $SR_d$ included in the second system generates an output (Fpout<1>), and thereafter, the shift signal output circuit $SR_b$ on the downstream side thereof sequentially generates an output at an individual timing. Such transition of output continues until when the shift signal output circuit $SR_d$ on the most downstream side generates an output (for example, Fpout<4>).

In the second touch detection, a signal indicating the drive electrode COML2 that includes the subdivided electrode SCOML to be used for touch detection is output. In the example illustrated in FIG. 27, FP SEL<n> is in a high state, and FP_SEL<n−1> and FP_SEL<n+1> are in a low state. This example indicates that touch detection is performed using the subdivided electrode SCOML included in the drive electrode COML2 in the region n.

FIG. 27 schematically illustrates touch detection results of the first touch detection and the second touch detection denoted by RxOut. RxOut indicates that, during the first touch detection, and touch detection intensity at a timing corresponding to the output of Sout<n> is higher than touch detection intensity at other timings. Thus, in the second touch detection, touch detection is performed using the subdivided electrodes SCOML included in the drive electrode COML2 in the region n used at the timing corresponding to the output of Sout<n>.

Figure 28:
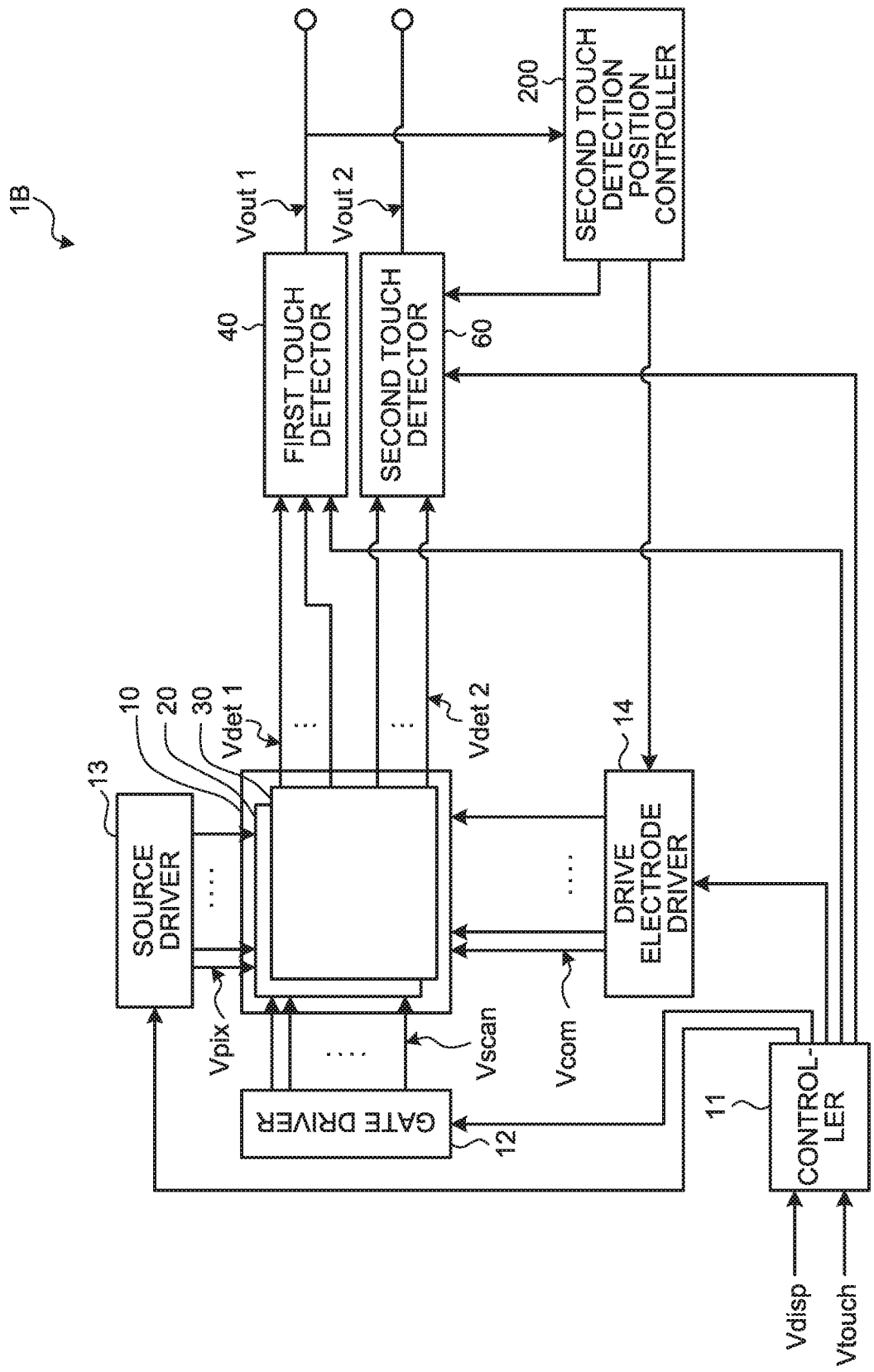
FIG. 28 is a block diagram illustrating a configuration example of the display apparatus with a touch detection function having a configuration of determining a subdivided electrode to be used in the second touch detection based on a result of the first touch detection.

The display apparatus 1B with a touch detection function according to the third embodiment may have a configuration of determining the subdivided electrode SCOML to be used in the second touch detection based on a result of the first touch detection. FIG. 28 is a block diagram illustrating a configuration example of the display apparatus 1B with a touch detection function having a configuration of determining the subdivided electrode SCOML to be used in the second touch detection based on the result of the first touch detection. The display apparatus 1B with a touch detection function includes, for example, a second touch detection position controller 200. The second touch detection position controller 200 is a circuit for determining the subdivided electrode SCOML to be used in the second touch detection based on the result of the first touch detection. In performing the second touch detection when the fingerprint detection implementation signal Vtouch is input, for example, the second touch detection position controller 200 causes the drive electrode driver 14 and the first touch detector 40 to be operated to perform the first touch detection first. The second touch detection position controller 200 specifies the drive electrode COML2 including the subdivided electrode SCOML to be used in the second touch detection based on the detection signal output Vout1 from the first touch detector 40, and causes the drive electrode driver 14 and the second touch detector 60 to be operated to perform the second touch detection using the subdivided electrodes SCOML included in the specified drive electrode COML2.

In this way, according to the third embodiment, the drive signal Vcom can be transmitted in the second mode to the subdivided electrodes SCOML included in the drive electrode COML2 arranged at the position corresponding to a position of a finger that is specified based on the first touch detection signal output at a transmission timing of the drive signal Vcom in the first mode. According to the third embodiment, the region in which the second touch detection is performed can be easily limited, and a cycle time for application of the drive signal Vcom related to the second touch detection such as fingerprint detection can be easily shortened. That is, the cycle time of one period for applying the drive signal Vcom once to the subdivided electrode SCOML used for the second touch detection can be easily shortened as the number of the subdivided electrodes SCOML is reduced, so that the cycle time of one period can be easily shortened by limiting the region in which the second touch detection is performed. When a time during which the second touch detection is performed is a predetermined time, accuracy in touch detection can be easily improved as the cycle time of one period is shorter, the accuracy in touch detection being improved by applying the drive signal Vcom multiple times to each of the subdivided electrodes SCOML within the predetermined time to perform touch detection multiple times.

Fourth Embodiment

Figure 29:
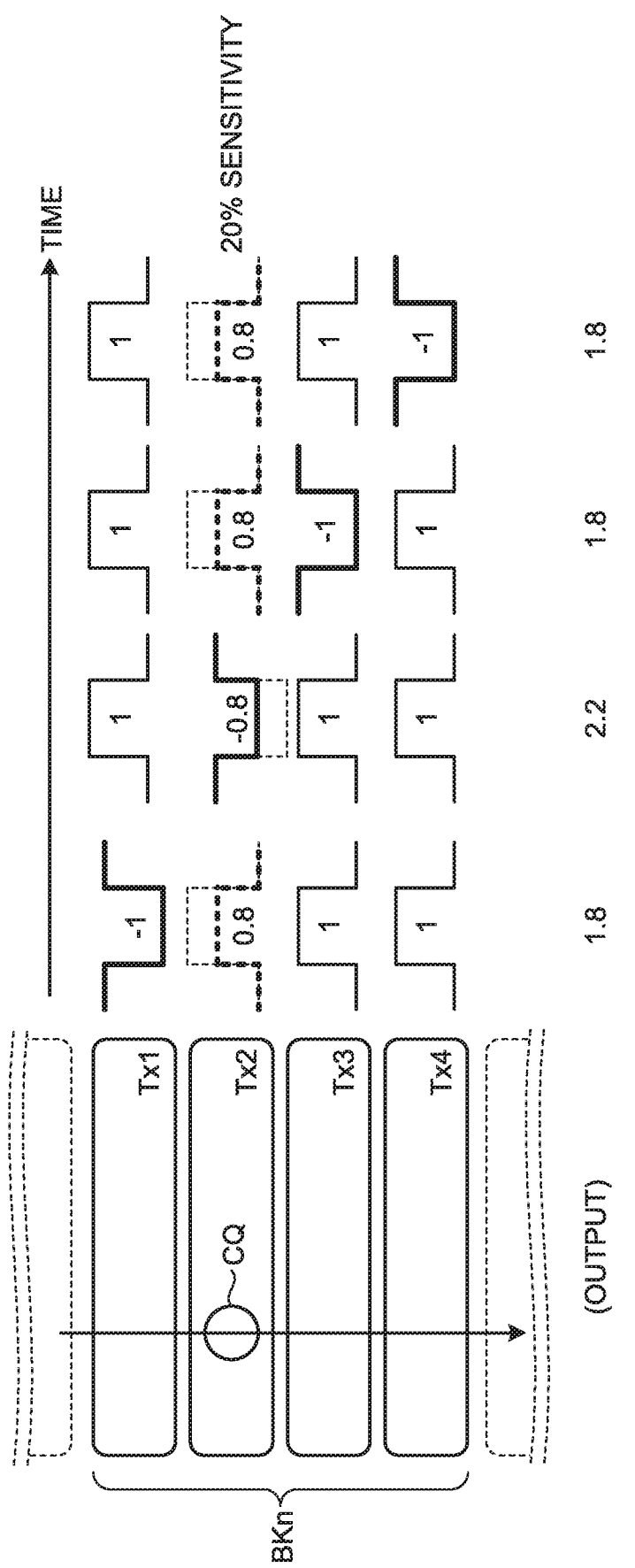
FIG. 29 is an explanatory diagram for explaining an example of driving in a code division multiplex system.

FIG. 29 is an explanatory diagram for explaining an example of driving in a code division multiplex system. In the first embodiment described above, for example, exemplified is a case in which the subdivided electrode SCOML is individually driven. However, a method for driving the subdivided electrode SCOML is not limited thereto. Specifically, as illustrated in FIG. 29 for example, in the display apparatus with a touch detection function, the drive electrode driver 14 selects a plurality of (in the example of FIG. 29, four) subdivided electrode blocks Tx1, Tx2, Tx3, and Tx4 in a selected subdivided electrode block Bkn at the same time to supply the drive signal Vcom, the phase of the drive signal Vcom being determined based on a predetermined code. In FIG. 29, waveforms illustrated on the right side of the subdivided electrode blocks Tx1, Tx2, Tx3, and Tx4 each exemplify the phase of the drive signal Vcom. For example, the predetermined code is defined with a square matrix represented by the following expression (1). A degree of the square matrix of the expression (1) is four, which is the number of the subdivided electrode blocks Tx1, Tx2, Tx3, and Tx4 in the selected subdivided electrode block Bkn. A diagonal component "−1" in the square matrix of the expression (1) is different from a component "1" other than the diagonal component in the square matrix. The code "−1" is a code for supplying the drive signal Vcom the phase of which is determined to be different from the code "1". The drive electrode driver 14 and the like transmit the drive signal Vcom based on the square matrix in the expression (1) so that a first phase and a second phase are reversed. The first phase is a phase of the AC rectangular wave Sg described above corresponding to the component "1" other than the diagonal component in the square matrix, and the second phase is a phase of the AC rectangular wave Sg described above corresponding to the diagonal component "−1" in the square matrix. Each of the subdivided electrode blocks Tx1, Tx2, Tx3, and Tx4 includes a predetermined number of subdivided electrodes SCOML.

$$\begin{pmatrix} -1 & 1 & 1 & 1 \\ 1 & -1 & 1 & 1 \\ 1 & 1 & -1 & 1 \\ 1 & 1 & 1 & -1 \end{pmatrix} \begin{pmatrix} 1.8 \\ 2.2 \\ 1.8 \\ 1.8 \end{pmatrix} = \begin{pmatrix} 4.0 \\ 3.2 \\ 4.0 \\ 4.0 \end{pmatrix} \quad (1)$$

In the fourth embodiment, a plurality of subdivided electrodes SCOML are driven at the same time like the selected subdivided electrode block BKn exemplified above, and detection is performed using a code division multiplex (CDM) system.

For example, when an external proximity object CQ such as a finger is present at the subdivided electrode block Tx2, which is the second position from an upstream side of scanning in the subdivided electrode blocks Tx1, Tx2, Tx3, and Tx4 in the selected subdivided electrode block Bkn, a difference voltage is caused by the external proximity object CQ due to mutual induction (for example, the difference voltage is assumed to be 20%). In such an example, the second touch detection signal Vdet2 (sensor output signal) detected by the second touch detector 60 at the first timing (first time zone) is represented as (−1)+(0.8)+(1)+(1)=1.8. In the expression, "1.8" is signal intensity based on the signal intensity of the drive signal Vcom of the code "1". The second touch detection signal Vdet2 detected by the second touch detector 60 at a timing subsequent to the first time zone (second time zone) is represented as (1)+(−0.8)+(1)+(1)=2.2. The second touch detection signal Vdet2 detected by the second touch detector 60 at a timing subsequent to the second time zone (third time zone) is represented as (1)+(0.8)+(−1)+(1)=1.8. The second touch detection signal Vdet2 detected by the second touch detector 60 at a timing subsequent to the third time zone (fourth time zone) is represented as (1)+(0.8)+(1)+(−1)=1.8.

The coordinate extractor 65 according to the fourth embodiment multiplies the second touch detection signals Vdet2 (sensor output signals) detected by the signal processor 64 using the square matrix of the expression (1). The coordinate extractor 65 detects that there is the external proximity object CQ such as a finger at the position of the drive electrode block Tx2 in the selected drive electrode block Bkn with detection sensitivity having higher accuracy (for example, four times) than that of time division multiplex (TDM) driving without increasing the voltage of the signal output as the drive signal Vcom.

Figure 30:
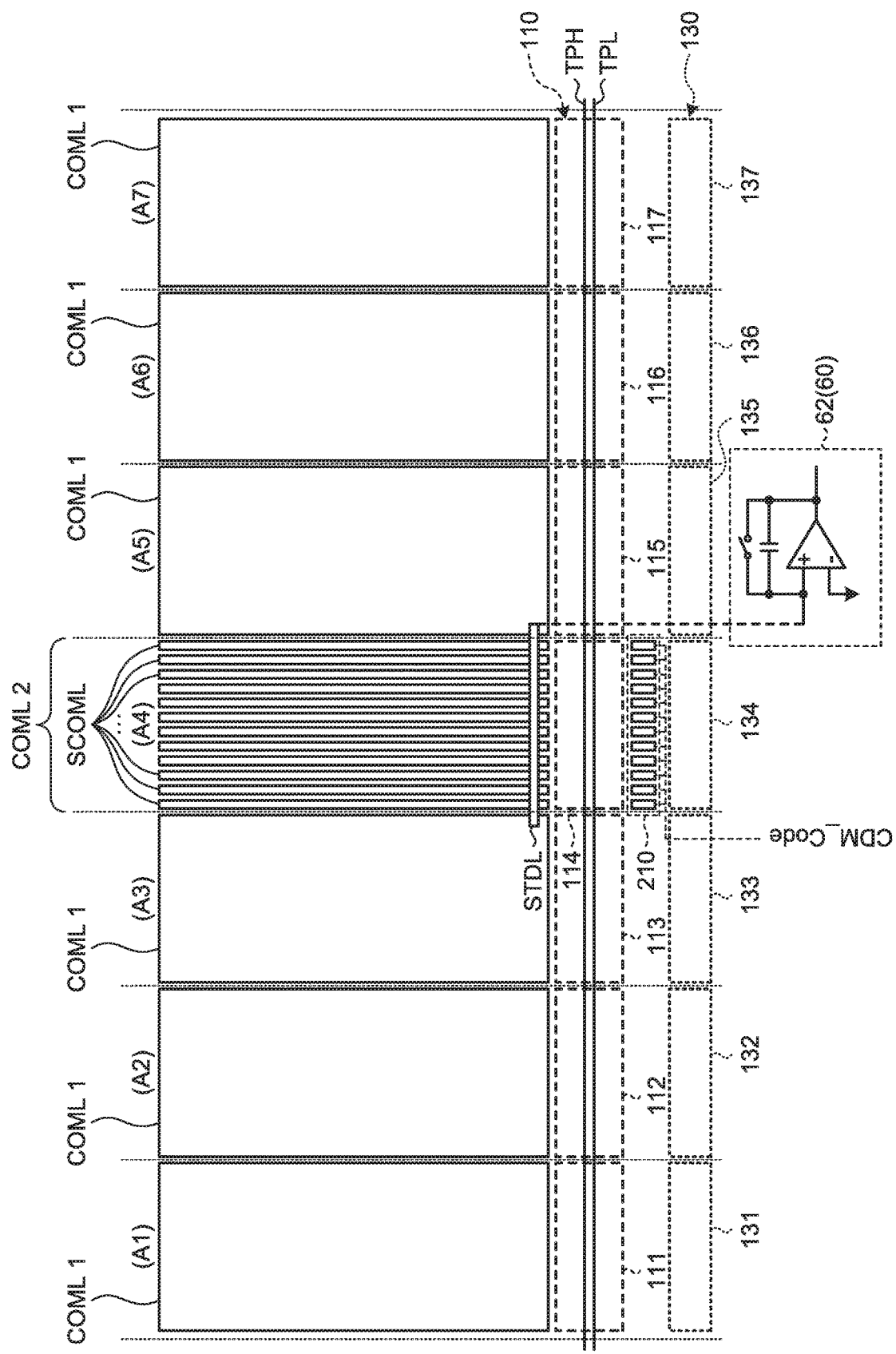
FIG. 30 is a schematic diagram illustrating a configuration related to touch detection according to a fourth embodiment.

FIG. 30 is a schematic diagram illustrating a configuration related to touch detection according to the fourth embodiment. The touch panel according to the fourth embodiment includes a code division multiplex (CDM) controller 210. The CDM controller 210 is arranged on a coupling route between the shift signal output circuits $SR_a$, $SR_b$, $SR_c$, and $SR_d$ of the second system and the individual switching circuit (for example, the individual switching circuit 114) coupled to the drive electrode COML2 including the subdivided electrodes SCOML. The CDM controller 210 operates in accordance with various control signals (CDM_CODE) used for the second touch detection performed by the CDM system. In the fourth embodiment, individual signals VCOMSEL, CODE, and OE are used as the control signals (CDM_CODE).

Figure 31:
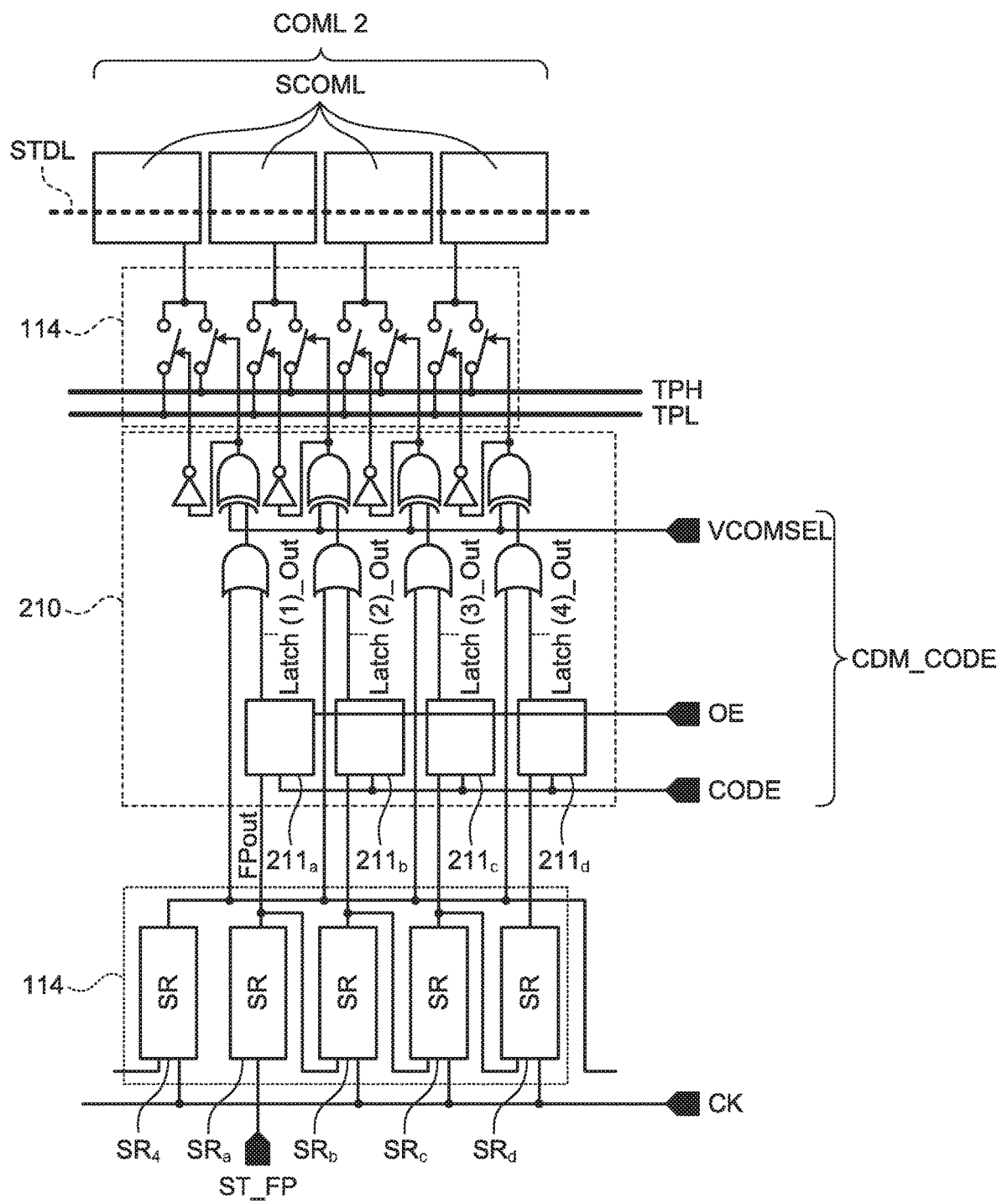
FIG. 31 is a diagram illustrating an example of a coupling route between the shift signal output circuit and the individual switching circuit in a case in which a CDM controller is interposed therebetween.

FIG. 31 is a diagram illustrating an example of the coupling route between the shift signal output circuits $SR_a$, $SR_b$, $SR_c$, and $SR_d$ and the individual switching circuit 114 in a case in which the CDM controller 210 is interposed therebetween. The CDM controller 210 includes a latch circuit 211 (for example, $211_a$, $211_b$, $211_c$, and $211_d$), an XOR circuit, and the NOT circuit. The number of the latch circuit 211, the XOR circuit, and the NOT circuit corresponds to the number of the subdivided electrodes SCOML included in the drive electrode COML2 to which the individual switching circuit 114 is coupled. The OR circuit in the CDM controller 210 in FIG. 31 is substantially equivalent to the OR circuit arranged on the coupling route between the second system and the individual switching circuit 114 in the first embodiment.

In the fourth embodiment, due to the CDM controller 210, the latch circuits $211_a$, $211_b$, $211_c$, and $211_d$ are arranged on coupling routes of the shift signal output circuits $SR_a$, $SR_b$, $SR_c$, and $SR_d$ of the second system among coupling routes of the shift signal output circuits $SR_4$, $SR_a$, $SR_b$, $SR_c$, and $SR_d$ of the two systems (the first system and the second system) on the input side coupled to the OR circuit between the shift signal output circuits $SR_a$, $SR_b$, $SR_c$, and $SR_d$ and the individual switching circuit 114. The latch circuits $211_a$, $211_b$, $211_c$, and $211_d$ operate in accordance with outputs (FPout) of the shift signal output circuits $SR_a$, $SR_b$, $SR_c$, and $SR_d$ of the second system, CODE, and OE. The latch circuits $211_a$, $211_b$, $211_c$, and $211_d$ have a similar configuration. To collectively describe the latch circuits $211_a$, $211_b$, $211_c$, and $211_d$, they may be referred to as the latch circuit 211.

Figure 32:
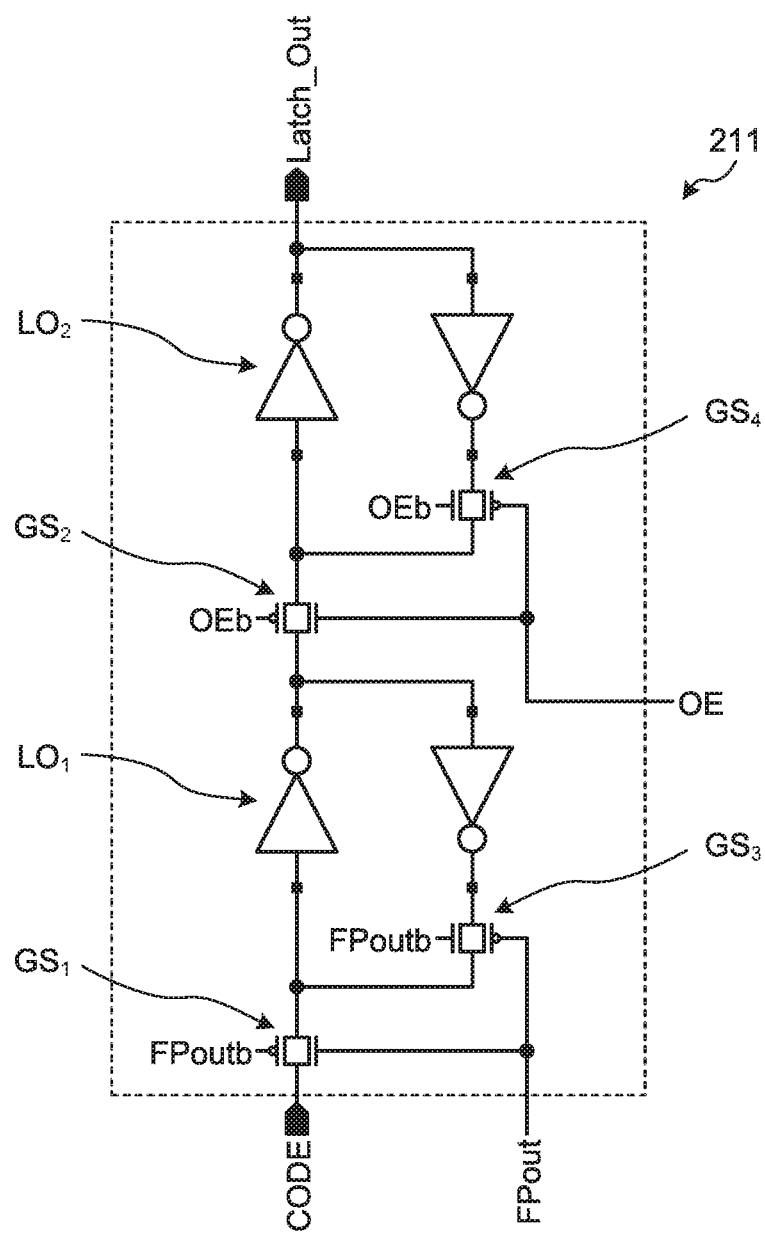
FIG. 32 is a diagram illustrating an example of a specific configuration of a latch circuit.

FIG. 32 is a diagram illustrating an example of a specific configuration of the latch circuit 211. The latch circuit 211 includes, for example, four gate switches (a first gate switch $GS_1$, a second gate switch $GS_2$, a third gate switch $GS_3$, and a fourth gate switch $GS_4$) and four NOT circuits. In the latch circuit 211, the first gate switch $GS_1$, a first loop $LO_1$, the second gate switch $GS_2$, and a second loop $LO_2$ are coupled to one another in series in this order from an input side of CODE toward an output side (Latch_Out). Each of the first loop $LO_1$ and the second loop $LO_2$ has a data loop structure in which two NOT circuits are coupled to each other in parallel and an input/output relation of the NOT circuits coupled to each other in parallel is reversed to each other.

The data loop structure holds a value input from the input side. Each of the first loop $LO_1$ and the second loop $LO_2$ has one gate switch on a parallel line, which is on the data loop structure and not on a serial coupling line from the input side of CODE toward the output (Latch_Out). In this case, the gate switch included in the first loop $LO_1$ is assumed to be the third gate switch $GS_3$, and the gate switch included in the second loop $LO_2$ is assumed to be the fourth gate switch $GS_4$.

In the following description, for convenience, exemplified is the latch circuit 211 related to control for transmitting the drive signal Vcom to the m-th subdivided electrode SCOML from the upstream side (hereinafter, simply referred to as the m-th subdivided electrode SCOML) among the subdivided electrodes SCOML included in one drive electrode COML2. If both of the first gate switch $GS_1$ and the second gate switch $GS_2$ are opened and both of the third gate switch $GS_3$ and the fourth gate switch $GS_4$ are closed, CODE input to the latch circuit 211 is reversed two times through the two NOT circuits to be output (Latch_Out), and the value is not held. If the first gate switch $GS_1$ is closed, the value is not input to the latch circuit 211.

When the first gate switch $GS_1$ is opened, the value can be input to the latch circuit 211. In this case, when the third gate switch $GS_3$ is opened, the value is held by the first loop $LO_1$. If the second gate switch $GS_2$ is opened, the value held by the first loop $LO_1$ is transmitted to the second loop $LO_2$. When the third gate switch $GS_3$ is closed, holding of the value by the first loop $LO_1$ is ended. When the second gate switch $GS_2$ is closed, transmission of the value from the first loop $LO_1$ to the second loop $LO_2$ is ended. During a period in which the fourth gate switch $GS_4$ is opened, holding of the value by the second loop $LO_2$ and the output (Latch_Out) by the latch circuit 211 are continued. When the fourth gate switch $GS_4$ is closed, holding of the value by the second loop $LO_2$ is ended, and the output (Latch_Out) by the latch circuit 211 is ended accordingly.

The first gate switch $GS_1$ operates in accordance with the reverse of the output (FPoutb) of the m−1-th shift signal output circuit SR of the second system and the output (FPout) of the m-th shift signal output circuit SR. The second gate switch $GS_2$ operates in accordance with reverse of an output of OE (OEb) for the m−1-th shift signal output circuit SR and an output of OE for the m-th shift signal output circuit SR. The third gate switch $GS_3$ operates in accordance with the output of the m−1-th shift signal output circuit SR of the second system and reverse of the output of the m-th shift signal output circuit SR. The fourth gate switch $GS_4$ operates in accordance with the output of OE (OEb) for the m−1-th shift signal output circuit SR and reverse of the output of OE for the m-th shift signal output circuit SR.

The output of the OR circuit is based on at least one of the output of the shift signal output circuit $SR_4$ of the first system and the output of the latch circuit 211. The output side of the OR circuit is coupled to one of the coupling routes of the two systems on the input side included in the XOR circuit. Wiring for inputting VCOMSEL is coupled to the other one of the coupling routes of the two systems on the input side included in the XOR circuit. The output of the XOR circuit is supplied to the first switch $SW_1$, and reversed through the NOT circuit to be supplied to the second switch $SW_2$.

In the fourth embodiment, VCOMSEL is not output in the first touch detection. Accordingly, the display apparatus with a touch detection function according to the fourth embodiment can perform the first touch detection with a mechanism similar to that of the first embodiment.

Figure 33:
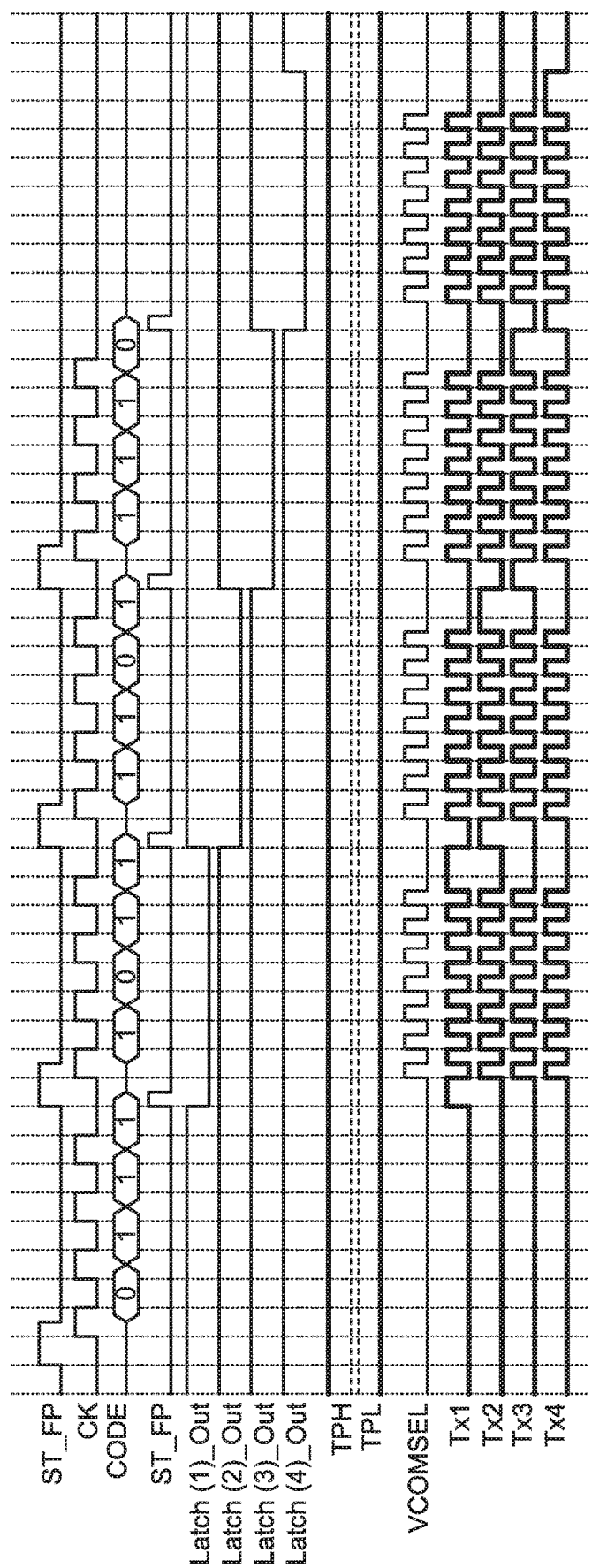
FIG. 33 is a timing chart illustrating an example of a relation between various signals in a CDM system.

FIG. 33 is a timing chart illustrating an example of a relation between various signals in the CDM system. The electrodes are driven by the CDM controller 210 in accordance with CODE. Specifically, as illustrated in FIG. 33 for example, driving states of the subdivided electrode blocks Tx1, Tx2, Tx3, and Tx4 after the second start signal are controlled in accordance with CODE "0, 1, 1, 1" output between the first start signal (ST_FP) and the second start signal. Specifically, in accordance with CODE "0, 1, 1, 1", an output (Latch(1)_Out) of the latch circuit 211$_a$ on the most upstream side is caused to be in a low state. Due to this, a transmission timing of the drive signal Vcom to the subdivided electrode block Tx1 on the most upstream side becomes a timing obtained by reversing the clock timing of VCOMSEL. On the other hand, the transmission timing of the drive signal Vcom to the other subdivided electrode blocks Tx2, Tx3, and Tx4 is synchronized with the clock timing of VCOMSEL. The second touch detection signal Vdet2 employed in the fourth embodiment is a signal at the clock timing of VCOMSEL. Thus, in this case, the subdivided electrode block Tx1 on the most upstream side is not used for touch detection, and the other subdivided electrode blocks Tx2, Tx3, and Tx4 are used for touch detection.

With a similar mechanism, the driving states of the subdivided electrode blocks Tx1, Tx2, Tx3, and Tx4 after the third start signal are controlled in accordance with CODE "1, 0, 1, 1" output between the second start signal (ST_FP) and the third start signal. In this case, an output (Latch(2)_Out) of the latch circuit 211$_b$ at the second position from the upstream side is caused to be in a low state, and the transmission timing of the drive signal Vcom to the subdivided electrode block Tx1 at the second position from the upstream side becomes a timing obtained by reversing the clock timing of VCOMSEL. Thus, in this case, the subdivided electrode block Tx2 at the second position from the upstream side is not used for touch detection, and the other subdivided electrode blocks Tx1, Tx3, and Tx4 are used for touch detection. Similarly, due to transmission control of the drive signal Vcom in accordance with CODE "1, 1, 0, 1", the subdivided electrode block Tx3 at the third position from the upstream side is not used for touch detection, and the other subdivided electrode blocks Tx1, Tx2, and Tx4 are used for touch detection. Due to transmission control of the drive signal Vcom in accordance with CODE "1, 1, 1, 0", the subdivided electrode block Tx4 at the fourth position from the upstream side is not used for touch detection, and the other subdivided electrode blocks Tx1, Tx2, and Tx3 are used for touch detection.

In this way, the CDM controller 210 functions as a combining circuit that changes the number and a combination of the subdivided electrodes SCOML to which the drive signal Vcom is transmitted at the same timing.

In the fourth embodiment, a potential line TPH is provided in place of the driving potential line TSVCOM. Although the driving potential line TSVCOM transmits a digital signal to be switched between a high level and a low level, the potential line TPH supplies electric potential fixed at a high level. The electric potential of the potential line TPH and the electric potential of the potential line TPL, which is fixed at a low level, are alternately applied using a switch. Thus, by switching the potential between high and low, a rectangular wave can be output in a similar manner to a case of using TSVCOM.

In the example with reference to FIGS. 29, 31, and 33, described is the CDM system using four subdivided electrode blocks Tx1, Tx2, Tx3, and Tx4 for convenience. However, the number of the subdivided electrode blocks driven at the same time in the CDM system is arbitrary.

As described above, according to the fourth embodiment, sensitivity of touch detection in the second mode is further enhanced. In particular, the arrangement pitch of the subdivided electrodes SCOML is finer than that of the drive electrodes COML, so that a degree of electrical change based on capacitance generated in accordance with the drive signal Vcom with respect to one subdivided electrode SCOML, that is, a degree of change in capacitance corresponding to presence/absence of a touch operation is likely to be smaller. Thus, difficulty in securing sensitivity of touch detection is increased in the second touch detection. Under such a condition, by employing the CDM system for the second touch detection, sufficient sensitivity can be easily secured.

Fifth Embodiment

Figure 34:
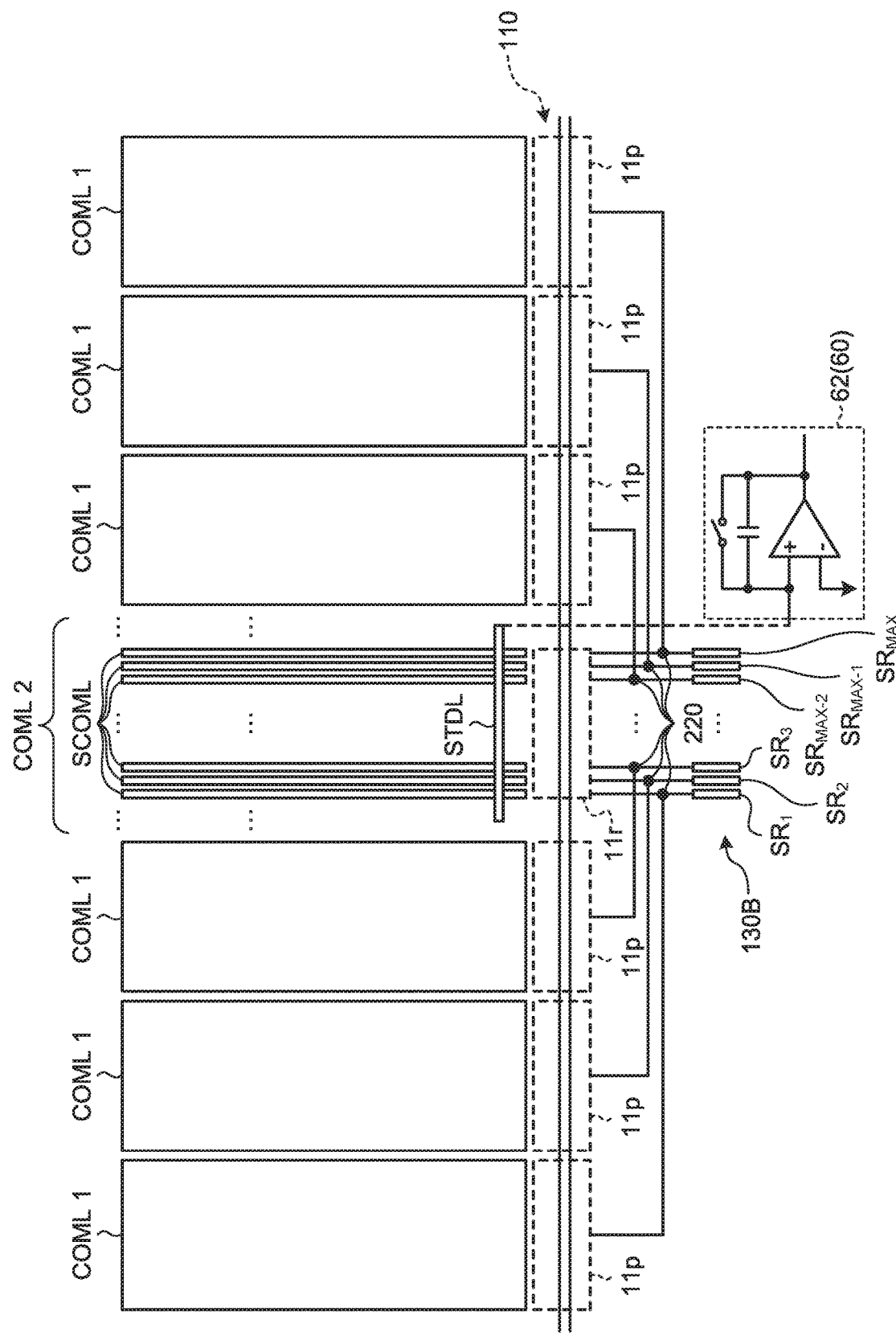
FIG. 34 is a schematic diagram illustrating a configuration related to touch detection according to a fifth embodiment.

FIG. 34 is a schematic diagram illustrating a configuration related to touch detection according to a fifth embodiment. Each of the shift signal output circuits SR$_1$, SR$_2$, SR$_3$, . . . , SR$_{MAX-2}$, SR$_{MAX-1}$, and SR$_{MAX}$ may be selectable for transmitting the drive signal Vcom to one of the drive electrodes COML1 or one of the subdivided electrodes included in the drive electrode COML2. In this case, a system of the shift signal output circuits SR$_1$, SR$_2$, SR$_3$, . . . , SR$_{MAX-2}$, SR$_{MAX-1}$, and SR$_{MAX}$ in a shift drive circuit 130B is functions as one system serving as both of the first system and the second system.

Specifically, as illustrated in FIG. 34 for example, the output line of each of the shift signal output circuits SR$_1$, SR$_2$, SR$_3$, . . . , SR$_{MAX-2}$, SR$_{MAX-1}$, and SR$_{MAX}$ is coupled to one set of the first switch SW$_1$ and the second switch SW$_2$. The first switch SW$_1$ and the second switch SW$_2$ are included in a selection switching circuit 11$_p$ coupled to a corresponding one of the drive electrodes COML1 and a selection switching circuit 11$_r$ coupled to the subdivided electrode SCOML via a combination circuit 220. The combination circuit 220 switchably couples any one of the drive electrodes COML1 and the subdivided electrode SCOML to the signal output circuit SR (for example, any of the shift signal output circuits SR$_1$, SR$_2$, SR$_3$, . . . , SR$_{MAX-2}$, SR$_{MAX-1}$, and SR$_{MAX}$) that outputs a signal for operating the switch (the first switch SW$_1$ and the second switch SW$_2$) included in the switching circuit (individual switching circuit).

Figure 35:
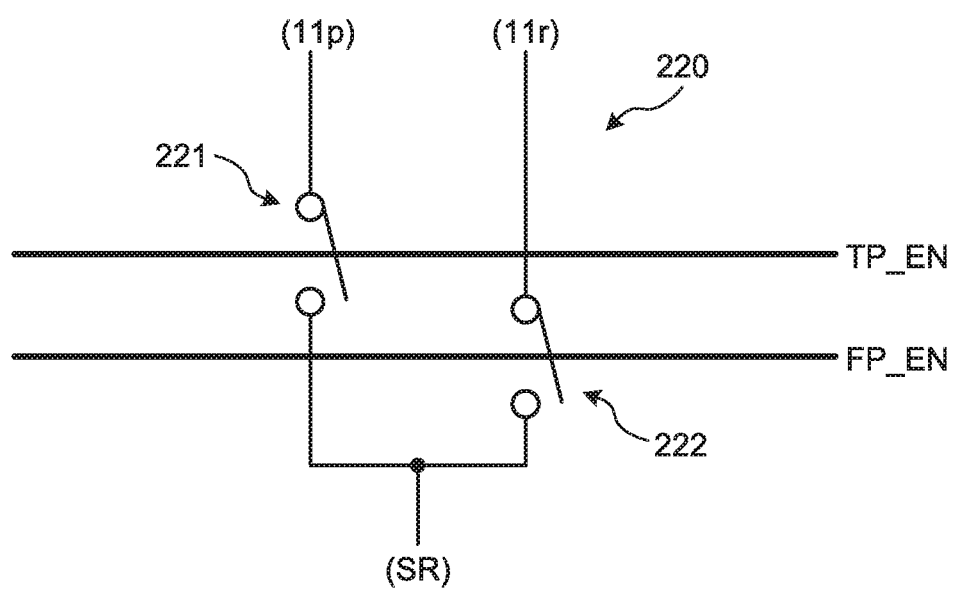
FIG. 35 is a diagram illustrating an example of a specific configuration of a combination circuit.

FIG. 35 is a diagram illustrating an example of a specific configuration of the combination circuit 220. The combination circuit 220 includes a first mode switch 221 that switches between coupling and decoupling of the output line of the shift signal output circuit SR with and from the selection switching circuit coupled to the drive electrode COML1. The combination circuit 220 includes a second mode switch 222 that switches between coupling and decoupling of the output line of the shift signal output circuit SR with and from a set of the first switch SW$_1$ and the second switch SW$_2$ coupled to the subdivided electrode SCOML. The first mode switch 221 and the second switch SW$_2$ each switch between a coupled state (ON) and a decoupled state (OFF) in accordance with different signals. Specifically, the first mode switch 221 is switched between ON and OFF depending on a high/low state of a signal for the first mode (TP_EN) that is output in the first touch detection and is not output in the second touch detection. The second mode switch 222 is switched between ON and OFF depending on a high/low state of a signal for the second mode (FP_EN) that is output in the second touch detection and is not output in the first touch detection. That is, the output of the shift signal output circuit SR in the fifth embodiment causes the selection switching circuit coupled to the drive electrode COML1 via the combination circuit 220 to be operated in the first touch detection. The output of the shift signal output circuit SR in the fifth embodiment causes one set of the first switch $SW_1$ and the second switch $SW_2$ coupled to the subdivided electrode SCOML via the combination circuit 220 to be operated in the second touch detection. The signal for the first mode (TP_EN) and the signal for the second mode (FP_EN) are output, for example, by the DDIC 80, but a configuration of outputting these signals can be appropriately modified.

As described above, according to the fifth embodiment, the subdivided electrode SCOML and the drive electrode COML1 not including a plurality of subdivided electrodes SCOML can share the signal output circuit (shift signal output circuit SR), so that a circuit scale of the shift drive circuit 130B can be reduced more easily.

The characteristics of configurations described in the embodiments and modification can be applied to each other only in a range in which they do not contradict each other. The preferred embodiments of the present invention and the modification thereof (embodiments and the like) have been described above. However, the present invention is not limited thereto. Content disclosed in the embodiments and the like is merely an example, and various modifications can be made without departing from the gist of the invention. The present invention naturally encompasses an appropriate modification maintaining the gist of the invention.

In the above embodiments and the like, basically, the first detector (first touch detector 40) and the second detector (second touch detector 60) are separately provided. Alternatively, one circuit may have a function of such two circuits.

In the above embodiments and the like, the first touch detection electrode TDL and the second touch detection electrode STDL are separately arranged. Alternatively, the arrangement pitch of the first touch detection electrodes TDL may be the same as that of the second touch detection electrodes STDL, and the first touch detection electrodes TDL and the second touch detection electrodes STDL may be electrodes to be used in the same manner. Also in this case, with the configuration including such electrodes, resolution related to detection is differentiated between the first mode and the second mode, so that an operation corresponding to a purpose, such as detection of a position of a finger and detection of a fingerprint, can be performed.

Numerical values such as the number of the drive electrodes COML, the number of the subdivided electrodes SCOML included in one drive electrode COML2, the number of the first touch detection electrodes TDL, and the number of the second touch detection electrodes STLD exemplified in the embodiments and illustrated in the drawings are merely an example, and can be appropriately modified.

What is claimed is:

1. A touch detection apparatus comprising:
   a plurality of drive electrodes arranged in a first direction, the drive electrodes including at least one drive electrode that has a plurality of subdivided electrodes arranged at a finer pitch than an arrangement pitch of the drive electrodes;
   a detection electrode that extends in a first direction intersecting with the subdivided electrodes and outputs a detection signal, wherein the detection electrode partially covers a combined length of all of the drive electrodes in the first direction;
   a first shift register circuit for driving the drive electrodes;
   a second shift register circuit for driving the subdivided electrodes; and
   a selection circuit that supplies:
      a signal of the first shift register circuit to the drive electrode in a first mode in which the drive electrodes including the at least one drive electrode are sequentially driven and the signal of the first shift register circuit is transmitted to the subdivided electrodes included in the at least one drive electrode at a time to cause the subdivided electrodes to function as a respective drive electrode, and
      a signal of the second shift register circuit to the subdivided electrode in a second mode in which the subdivided electrodes are sequentially driven such that a respective subdivided electrode to which the signal of the second shift register circuit is transmitted is shifted one by one from a first end toward a second end of an arrangement direction of the respective subdivided electrode.

2. The touch detection apparatus according to claim 1, wherein
   the detection electrodes are arranged at positions not in contact with the drive electrodes and the subdivided electrodes,
   a first touch detection signal is a signal based on a capacitance of the drive electrodes to which a first drive signal is transmitted, and
   a second touch detection signal is the detection signal based on a capacitance of the subdivided electrodes to which a second drive signal is transmitted.

3. The touch detection apparatus according to claim 1, wherein the drive electrodes include the subdivided electrodes.

4. The touch detection apparatus according to claim 2, further comprising a combining circuit that changes a number and a combination of subdivided electrodes to which the second drive signal is transmitted at the same timing.

5. The touch detection apparatus according to claim 1, further comprising:
   a signal output circuit that outputs a signal for operating a switch included in the selection circuit; and
   a combination circuit that switchably couples, to the signal output circuit, one of a drive electrode not including the subdivided electrodes and the respective subdivided electrode.

6. The touch detection apparatus according to claim 1, further comprising a driving potential line that indicates an electric potential functioning as the drive signal to be applied to the drive electrodes.

7. A display apparatus with a touch detection function, the display apparatus comprising:
   a display device that displays an image;
   a plurality of drive electrodes arranged in a first direction, the drive electrodes including at least one drive electrode that has a plurality of subdivided electrodes arranged at a finer pitch than an arrangement pitch of the drive electrodes;
   a detection electrode that extends in a first direction intersecting with the subdivided electrodes and outputs a detection signal, wherein the detection electrode partially covers a combined length of all of the drive electrodes in the first direction;
   a first shift register circuit for driving the drive electrodes;

a second shift register circuit for driving the subdivided electrodes; and a selection circuit that supplies:
- a signal of the first shift register circuit to the drive electrode in a first mode in which the drive electrodes including the at least one drive electrode are sequentially driven and the signal of the first shift register circuit is transmitted to the subdivided electrodes included in the at least one drive electrode at a time to cause the subdivided electrodes to function as a respective drive electrode, and
- a signal of the second shift register circuit to the subdivided electrode in a second mode in which the subdivided electrodes are sequentially driven such that a respective subdivided electrode to which the signal of the second shift register circuit is transmitted is shifted one by one from a first end toward a second end of an arrangement direction of the respective subdivided electrode.

8. The display apparatus according to claim 7, wherein detection electrodes are arranged at positions not in contact with the drive electrodes and the subdivided electrodes,
a first touch detection signal is a signal based on a capacitance of the drive electrodes to which a first drive signal is transmitted, and
a second touch detection signal is the detection signal based on a capacitance of the subdivided electrodes to which a second drive signal is transmitted.

9. The display apparatus according to claim 7, wherein the drive electrodes include the subdivided electrodes.

10. The display apparatus according to claim 8, further comprising a combining circuit that changes a number and a combination of subdivided electrodes to which the second drive signal is transmitted at the same timing.

11. The display apparatus according to claim 7, further comprising:
a signal output circuit that outputs a signal for operating a switch included in the selection circuit; and
a combination circuit that switchably couples, to the signal output circuit, one of a drive electrode not including the subdivided electrodes and the respective subdivided electrode.

12. The display apparatus according to claim 7, further comprising a driving potential line that indicates an electric potential functioning as the drive signal to be applied to the drive electrodes.

13. A display apparatus with a touch detection function, the display apparatus comprising:
a plurality of drive electrodes arranged in a first direction, the drive electrodes including at least one drive electrode that has a plurality of subdivided electrodes arranged at a finer pitch than an arrangement pitch of the drive electrodes;
a detection electrode that extends in a first direction intersecting with the subdivided electrodes and outputs a detection signal, a first shift register for driving the drive electrodes;
a second shift register circuit for driving the subdivided electrodes; and
a selection circuit that supplies:
- a signal of the first shift register circuit to the drive electrode in a first mode in which the drive electrodes are sequentially driven and the signal of the first shift register circuit is transmitted to the subdivided electrodes to cause the subdivided electrodes to function as at least one of the drive electrodes, and
- a signal of the second shift register circuit to a respective subdivided electrode in a second mode in which the subdivided electrodes are sequentially driven.

14. The display apparatus according to claim 13, wherein detection electrodes are arranged at positions not in contact with the drive electrodes and the subdivided electrodes,
a first touch detection signal is a signal based on a capacitance of the drive electrodes to which a first drive signal is transmitted, and
a second touch detection signal is the detection signal based on a capacitance of the subdivided electrodes to which a second drive signal is transmitted.

15. The display apparatus according to claim 13, wherein the drive electrodes include the subdivided electrodes.

16. The display apparatus according to claim 14, further comprising a combining circuit that changes a number and a combination of subdivided electrodes to which the second drive signal is transmitted at the same timing.

17. The display apparatus according to claim 13, further comprising:
a signal output circuit that outputs a signal for operating a switch included in the selection circuit; and
a combination circuit that switchably couples, to the signal output circuit, one of a drive electrode not including the subdivided electrodes and the respective subdivided electrode.

18. The display apparatus according to claim 13, further comprising a driving potential line that indicates electric potential functioning as the drive signal to be applied to the drive electrodes.

* * * * *